United States Patent
Somiya et al.

(10) Patent No.: US 6,438,107 B1
(45) Date of Patent: Aug. 20, 2002

(54) CELL TRANSFER RATE CONTROL APPARATUS AND METHOD

(75) Inventors: Toshio Somiya; Koji Nakamichi, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/221,455

(22) Filed: Dec. 28, 1998

(30) Foreign Application Priority Data

Mar. 20, 1998 (JP) .......................................... 10-072834

(51) Int. Cl.[7] ............................................. H04L 12/00
(52) U.S. Cl. ..................... 370/233; 370/234; 370/236.1; 370/395.1
(58) Field of Search ............................... 370/229, 230, 370/231, 232, 233, 234, 235, 236, 236.1, 236.2, 252, 253, 395.1, 395.2, 395.43, 412, 428, 429, 465, 468

(56) References Cited

U.S. PATENT DOCUMENTS

| | | | | |
|---|---|---|---|---|
| 5,946,297 A | * | 8/1999 | Calvignac et al. | 370/230 |
| 5,959,973 A | * | 9/1999 | Meurisse et al. | 370/232 |
| 6,178,159 B1 | * | 1/2001 | He et al. | 370/234 |
| 6,212,162 B1 | * | 4/2001 | Horlin | 370/229 |

FOREIGN PATENT DOCUMENTS

| JP | 4-178044 | 6/1992 |
|---|---|---|
| JP | 9-121210 | 5/1997 |

OTHER PUBLICATIONS

A. Arulamgbalam et al, "Allocation Fair Rates For Available Bit Rate Service in ATM Networks", IEEE Communications Magazine, vol. 34, No. 11, Nov. 1, 1996.

J. Leibeherr et al, "A Multi–Level Explicit Rate Control Scheme for ABR Traffic with Heterogeneous Service Requirements", Proceedings of the International Conference on Distributed Computing Systems, IEEE Comp. Soc. Press, vol. Conf. 16. May 27, 1996..

\* cited by examiner

Primary Examiner—Ricky Ngo
(74) Attorney, Agent, or Firm—Katten Muchin Zavis Rosenman

(57) ABSTRACT

A load observation unit observes a load using each quality class buffer and the link (address management unit) accommodating quality class buffers. An ER computation unit computes an ER (explicit cell rate) for each quality class buffer. The ER can also be computed by the entire link. The ER computation unit defines the ER computed for the quality class buffer or the ER computed for the entire link, whichever is larger, as a first ER. Then, it compares the first ER with the MCR (minimum cell rate) set in the connection of the quality class buffer, and defines one of them whichever is larger as a second ER. Then, the value of the ER set in the ER field of the RM (resource management) cell arriving at the quality class buffer with the above described second ER, and the value whichever is smaller is set in the ER field of the RM cell.

74 Claims, 26 Drawing Sheets

| FIELD | OCTET | BIT | CONTENTS | INITIAL VALUE | |
|---|---|---|---|---|---|
| | | | | SOURCE-GENERATED RM CELL | SWITCH-GENERATED RM CELL OR DESTINATION-GENERATED RM CELL |
| Header | 1-5 | all | ATM HEADER | RM-VPC: VCI=6 and PTI=110 RM-VCC: PTI=110 | |
| ID | 6 | all | PROTOCOL IDENTIFIER | | 1 |
| DIR | 7 | 8 | DIRECTION INDICATION BIT | 0 | 1 |
| BN | 7 | 7 | BECN CELL INDICATION | 0 | 1 |
| CI | 7 | 6 | CONGESTION INDICATION BIT | 0 | BOTH OR ONE OF CI = 1 AND NI = 1 |
| NI | 7 | 5 | No Increase | 0 or 1 | 0 OR 1.371 |
| RA | 7 | 4 | Request/ Acknowledge | 0 | 0 |
| Reserved | 7 | 3-1 | Reserved | 0 | 0 |
| ER | 8-9 | all | Explicit Cell Rate | RATE EQUAL TO OR LOWER THAN PCR | any rate value |
| CCR | 10-11 | all | Current Cell Rate | ACR | 0 |
| MCR | 12-13 | all | Minimum Cell Rate | MCR | 0 |
| QL | 14-17 | all | Queue Length | 0 OR 1.371 | 0 OR 1.371 |
| SN | 18-21 | all | Sequence Number | 0 OR 1.371 | 0 OR 1.371 |
| Reserved | 22-51 | all | Reserved | EACH OCTET IS 6A (hex) | |
| Reserved | 52 | 8-3 | Reserved | 0 | 0 |
| CRC-10 | 52 53 | 2-1 all | CRC-10 | | |

FIG. 1C    PRIOR ART

· EXAMPLE OF BWI_ALL SELECTION TABLE

| QUALITY CLASS 1 | QUALITY CLASS 2 | QUALITY CLASS 3 | QUALITY CLASS 4 | QUALITY CLASS 5 |
|---|---|---|---|---|
| 1 | 1 | 0 | 0 | 1 |

0: CELL IS NOT COUNTED AS LOAD OF BWI_ALL
1: CELL IS COUNTED AS LOAD OF BWI_ALL

FIG. 19

CELL TRANSFER RATE CONTROL APPARATUS AND METHOD

BACKGROUND OF THE INVENTION

1. Field of the Invention

The present invention relates to a communications network which transmits packets and contains a plurality of services, and more specifically to an apparatus and method of controlling the cell transfer rate in an ATM (asynchronous transfer mode) network containing a plurality of services such as an ABR (available bit rate) service, a UBR (unspecified bit rate) service, and so on.

2. Description of the Related Art

Currently, in an ATM forum and the ITU-T (International Telecommunication Union-Telecommunication Standardization Sector), an ABR service is considered a method of applying the data switch technology in the ATM to a high-speed data communications network such as a LAN (local area network), a WAN (wide area network), and so on.

To easily accommodate a conventional LAN, a UBR service in which the quality is not defined is also considered.

Described below is the ABR service considered in the ATM forum and the ITU-T.

In the communications using the ABR service, a resource management cell (RM cell) is used to notify a terminal of the information about a network resource. A source terminal transmits an RM cell each time it transmits the predetermined number of user data cells. The RM cell reaches a destination terminal through a network, and is looped back to the source terminal.

On the other hand, an ATM switch in the network notifies the source terminal of the information in the network by writing the resource information (band information and congestion information) in the ATM switch to an RM cell passing through the ATM switch. Upon receipt of the RM cell to which the band information and the congestion information, the source terminal re-computes the allowed cell rate (ACR) according to the information, and transmits the cell at a rate equal to or lower than the ACR.

When the source terminal establishes an ABR connection at the start of the communications, it declares through the network the peak cell rate (PCR), which is the highest transmission rate, and the minimum cell rate (MCR), which is the lowest request rate, and negotiates for their values. As a result of the negotiation, the source terminal cannot transmit a cell at a rate higher than the determined PCR. On the other hand, the network guarantees the source terminal a cell transmission rate equal to or higher than the MCR determined as a result of the negotiation. Accordingly, in the ABR service, the ACR of the source terminal is variable in the range from the MCR to the PCR (MCR≦ACR≦PCR).

Using the ABR service in the above described operation, the network can avoid congestion or recover from the congestion, and the terminal units can transmit cells at a high transmission rate when the resources of the network are available.

Recently, the operations of the source terminal and the destination terminal communicating with each other through the ABR service are considered targets to be standardized in the ATM forum. Described below is the outline of the operations.

FIG. 1A is a chart showing the concept of the flow control in the ABR service.

In FIG. 1A, according to the arrow indicating the forward flow A, an ABR source terminal 101 transmits a cell forward (from source to destination) at a rate equal to or lower than the ACR at each point. At this time, the ABR source terminal 101 transmits one RM cell 114 to a switch (ATM switch) 102 each time a predetermined number of user data cells 112 are transmitted. Upon receipt of an RM cell 114F from the switch 102, the ABR source terminal 101 adds a predetermined value to the value of the ACR if the congestion indicator (CI) bit (not shown in FIG. 1A) in the RM cell 114B is set to 0 (non-congestion), and if the no-increase (NI) bit is set to 0 (not specified). On the other hand, if the above described CI bit is set to 1 (congestion), then the ABR source terminal 101 subtracts the predetermined value from the ACR value. Furthermore, the ABR source terminal 101 compares the value of the explicit cell rate (ER) written in the RM cell with the ACR value obtained in the above described computation after the above described operations, and defines a smaller value as a new ACR. At this time, the ACR value should satisfy MCR≦ACR≦PCR.

In FIG. 1A, according to the arrow indicating the backward flow B, an ABR destination terminal 103 terminates the user data cell 112 transmitted from the source terminal, loops back the received RM cell 114F, and transmits it as the backward (from destination to source) RM cell 114B to the ABR source terminal 101. In this case, if the explicit forward congestion indication (EFCI) bit indicating the congestion in the user data cell 112A received immediately before receiving the RM cell 114F is set to 1, then the ABR destination terminal 103 sets the CI bit in the looped-back RM cell 114F to 1, and the RM cell 114 is transmitted as a backward RM cell 114B after the setting.

Described below is the function of the ATM switch in the ABR service.

The operations of the network for realizing the ABR service, that is, the ATM switch, can be performed in an EFCI mode and an ER mode.

In the EFCI mode, the ATM switch sets the EFCI bit in the user data cell passing through the ATM switch to 1 when congestion exists, and passes the cell.

In the ER mode, the ATM switch computes the ER explicitly indicating the transmission rate to the source terminal based on the resources and the congestion state in the ATM switch, and writes the obtained value to the forward or backward RM cell passing through the ATM switch. At this time, the ATM switch compares the ER value in the RM cell with the ER value computed by the ATM switch itself, and writes a smaller ER value to the RM cell.

In addition to the RM cell transmitted from the source terminal, the ATM switch or the destination terminal can generate an RM cell, and transmit it to the source terminal.

In addition to the above described mode function, the functions referred to as ABR VS/VD (virtual source/virtual destination) are assumed as operations of the ATM switch for realizing the ABR service. When the VS/VD functions are realized, a VD function 122a of looping back upstream the forward RM cell transferred from upstream as a backward RM cell is provided at the upstream of an ATM switch 122 as shown in FIG. 1B. At the downstream of the ATM switch 122 (ABR destination terminal 123), a VS function 122b for generating and terminating an RM cell is provided.

Thus, in the VS/VD functions, when the ATM switch 122 having the VS/VD functions loops back, generates, and terminates an RM cell for an ABR connection, the control loop of the ABR connection is divided (segmented) into a plurality of control loops as shown in FIG. 1B, not a simple loop of an ABR source terminal 121, an ATM switch network, an ABR destination terminal 123, an ATM switch network, and an ABR source terminal 121.

In this case, the VD function 122a provided in the ATM switch 122 virtually simulates the function of a destination terminal. Similarly, the VS function 122b provided in the ATM switch 122 virtually simulates the function of a source terminal.

Thus, the control loop between the ABR source terminal 121 and the ABR destination terminal 123 is divided into a plurality of control loops by the ATM switch 122. In each control loop, the feedback control of the transfer rate using an ER value is performed in parallel so that the response of the feedback can be improved. As a result, the network can more quickly avoid and recover from congestion, and the terminal can communicate cells at a higher rate when the resources of the network are available.

The following functions are required to realize the above described VS/VD functions.

(1) ABR Source/Destination operations prescribed by the ATM forum traffic management 4.0 (essential functions).
  a) generating and terminating an RM cell (function to be realized by the VS).
  b) computing ACR according to the information set in the received backward RM cell (function to be realized by the VS).
  c) transmitting a user data cell from the ACR (function to be realized by the VS).
  d) looping back an RM cell, and scheduling an out-rate RM cell (function to be realized by the VD). An out-rate cell refers to a cell to be transmitted with the CLP set to 1 (CLP=1) when the available band of a looped-back line is set to 0 by the ABR control. The out-rate RM cell has a stronger probability that it is discarded in the network than an RM cell whose CLP is set to 0 (CLP=0).
  e) setting the CI bit in the looped-back RM cell to 1 when a user data cell whose EFCI bit is set to 1 is received (function to be realized by the VD).
  f) generating a backward explicit congestion indicator RM cell (BECN RM cell) (function to be realized by the VD).

(2) transmitting an MCR (essential function)
  a) transmitting an MCR in the RM cell received by the VS from downstream (destination terminal) to the upstream (source terminal) VD.
  b) transmitting an MCR in the RM cell received by the VD from upstream to the upstream VS.

(3) controlling VS-VD in the same switch (implementation specific).
  a) transmitting an ER in the RM cell terminated by the VS to an upstream VD in the switch accommodating the VS.
  b) setting ABR parameter for a segment to be supported.
  c) computing an ER at a point where congestion arises in the switch.

The above described operations are to be standardized in the ATM forum. However, a concrete control system and implementation method is not to be standardized. For example, the congestion detecting method in the ATM switch or the ER computation algorithm required to realize the function of the above described (c) in (3) are not targets to be standardized.

The RM cell is normally generated by a source terminal, but can be generated by a switch or a destination terminal. In this case, the initial value set in the field in the RM cell may be different from the initial value of the RM cell generated by the source terminal.

FIG. 1C shows the format of an RM cell.

Described below is the outline of each field of the RM cell.

Header

In the RM VCC (virtual channel connection), the PTI (payload type identifier)=110. In the RM VPC (virtual pass connection), PTI=110 and VCI=6.

A payload contains the following fields.

ID: protocol ID

In the ABR, the ID is set to 1.

The seventh octet in the RM cell is referred to as a message type field, and contains the following DIR, BN, CI, NI, RA, and Reserved.

DIR: direction

DIR is set to 0 for forward, and 1 for backward. The 'forward' refers to the direction of the RM cell flow which is the same as the direction of the user data cell flow. The source terminal transmits the RM cell with the DIR set to 0. The destination terminal transmits the RM cell with the DIR set to 1.

BN: backward explicit congestion notification

BN is used to distinguish a BECN RM cell from the RM cell generated by the source terminal. A switch unit or a destination terminal sets BN to 1, and generates a BECN RM cell. The source terminal sets the BN to 0 and generates an RM cell.

CI: congestion indication

CI is set to 1 for congestion, and 0 for non-congestion. When the CI is set to 1, the source terminal reduces the ACR.

NI: no increase

NI is used to suppress an increase of the ACR value at the source terminal. Unlike the CI, the NI is not used to reduce the ACR.

The NI is used when the switch detects a sign of congestion. Normally, the source terminal sets the NI to 0 and transmits an RM cell. However, the RM cell can be transmitted with the NI set to 1 to indicate that there is no need of increasing the value of the ACR.

RA: request acknowledge

RA is not used at an ABR regulated in the ATM forum. The RA is set to 0 or set according to the ITU-T Recommendation I.371.

ER:

An ER field is set to a value of the ER. The ER is used to limit the ACR of the source terminal to a specific value. The value of the ER is, for example, a value of the PCR requested by the source terminal, etc. as an initial value, and is reduced by a network element such as a switch, and so on.

CCR: current cell rate

A CCR field is set to the value of the ACR of a source terminal when the source terminal transmits a forward RM cell. The value of the ACR set in the CCR field can be used when a switch computes the ER.

MCR: minimum cell rate

An MCR field is set to the value of the MCR negotiated and determined when a call is established. The value set for the MCR field can be used when the switch computes the band. If the value set for the MCR field is different from the MCR determined when a call is established, then the switch can be rewritten to the MCR determined when the call is established.

QL: queue length

A QL field is not used at the ABR regulated in the ATM forum. The QL field is set to 0 or set according to the ITU-T Recommendation I.371.

SN: sequence number

An SN field is not used at the ABR regulated in the ATM forum. The SN field is set to 0 or set according to the ITU-T Recommendation I.371.

CRC-10: cyclic redundancy check—10

The value of the CRC set in the CRC-10 field is the same as the value of the CRC set in the OAM (operation, administration, and maintenance) cell.

Described next is a method of expressing the rate in each of the above described ER, CCR, and MCR fields in the RM cell.

$$R=2^e(1+m/512)\times nz (\text{cell/seconds})$$

As represented by the equation above, the rate of each of the ER, CCR, and MCR fields is expressed by the floating point number representation in binary data specified by a 5-bit exponent (e), a 9-bit mantissa (m), and a 1-bit nonzero flag (nz).

In each of the ER, CCR, and MCR fields, a mantissa is set in the 0 through 8th bits, an exponent is set in the 9th through 13th bits, and a nonzero flag is set in the 14th bit as shown in FIG. 1D. The 15th bit is unused.

The ABR service has been described above. The logical concept of an ATM switch system 130 accommodating a plurality of services such as an ABR service, a UBR service, and so on, is described below by referring to FIG. 1E.

As shown in FIG. 1E, various services such as the CBR (constant bit rate), the rt-VBR (real time variable bit rate), the UBR (unspecified bit rate), and so on, are accommodated in the quality control path. The QCP is a path for guarantee the quality of a group of connections having the same qualities in the ATM switch system 130.

The ATM switch system 130 includes a VPI/VCI conversion unit not shown in FIG. 1E, and a buffer not shown in FIG. 1E provided for each QCP class number which is an identification number used to know which service (QCP class) a cell belongs to. A band assigned to each QCP class is preliminarily assigned based on the physical communications speed of an output line. The descriptions other than the above described components are omitted here.

A cell of each of the above described services is transmitted from a source terminal with a self-routing tag in the ATM switch system 130 assigned by the VCI/VPI conversion unit. A QCP class number is set in the tag. The cell is written to a corresponding buffer according to the QCP class number. The cell written to the buffer is read from the buffer based on the above described band assigned to a corresponding QCP class.

When feedback control is performed in the above described ER mode on the ABR service, the UBR service, and so on, and when the feedback control is performed in the ER mode on a plurality of ABR services in different qualities using the quality controlling function such as the above described QCP, the following problem occurs.

If each of the ABR service, the UBR service, and so on, is accommodated in the control path such as the QCP, and so on, for each quality class, and the ER value of the cell accommodated in the control path is obtained by the ER computation closed in the control path, then an available band for other services cannot be used even if the services are rarely used. As a result, there arises the problem that the entire network resources are not efficiently utilized in some time periods.

On the other hand, if the ER computation is performed on the entire band of the link (internal link) in the ATM switch with the control path such as the QCP, and so on, ignored, then the allowed bands (ER value) for all quality services accommodated in the link are equal, thereby causing the problem that the communications quality of each service cannot be guaranteed.

SUMMARY OF THE INVENTION

The present invention aims at providing a cell transfer rate control apparatus and method for efficiently utilizing network resources and guaranteeing the communications quality of each service.

The cell transfer control apparatus according to the first aspect of the present invention which is mentioned in claim 1, includes a quality class buffer, a congestion determination unit, an input rate observation unit, a first load factor computation unit, a second load factor computation unit, a average cell rate computation unit, and an ER computation unit.

In the first phase of the present invention, a plurality of quality class buffers QCP(i) are provided for each quality class i (i=1, 2, . . . , n) to guarantee the communications quality declared by the user. The congestion determination unit determines whether the above described quality class buffer QCP(i) is in the congestion state or in the non-congestion state based on the predetermined first threshold set in the quality class buffer QCP(i). The input rate observation unit observes the input cell rate (BWI_QCP(i)) of each quality class buffer QCP(i), and the input cell rate (BWI_ALL) of the link accommodating the above described quality class buffer QCP(i) in each predetermined observation period. Depending on the determination result from the congestion determination unit, the first load factor computation unit computes the load factor (OLF1_QCP(i)) of the above described quality class buffer QCP(i) in the non-congestion state based on the OLF1_QCP(i)=BWI_QCP(i)/BWO1_QCP(i), which is the ratio of the BWI_QCP(i) of the above described quality class buffer QCP(i) observed by the input rate observation unit to the target output band (BWO1_QCP(i)) in the non-congestion state predetermined for the above described quality class buffer QCP(i), when the quality class buffer QCP(i) is in the non-congestion state. The first load factor computation unit computes the load factor (OLF2_QCP(i)) of the above described quality class buffer QCP(i) in the congestion state based on the OLF2_QCP(i)=BWI_QCP(i)/BWO2_QCP(i), which is the input cell rate (BWI_QCP(i)) of the above described quality class buffer QCP(i) observed by the input rate observation unit to the target output band (BWO2_QCP(i)) in the congestion state predetermined for the above described quality class buffer QCP(i) when the quality class buffer QCP(i) is in the congestion state. Depending on the determination result from the congestion determination unit, the second load factor computation unit computes the load factor (OLF1_ALL) of the link accommodating the above described quality class buffer QCP(i) in the non-congestion state based on the OLF1_ALL=BWI_ALL/BWO1_ALL, which is the ratio of the input cell rate (BWI_ALL) of the above described link observed by the input rate observation unit to the target output band (BWO1_ALL) in the non-congestion state predetermined for the above described link, when the quality class buffer QCP(i) is in the non-congestion state. The second load factor computation unit computes the load factor (OLF2_ALL) of the above described link in the congestion state based on the OLF2_ALL=BWI_ALL/BWO2_ALL, which is the input cell rate (BWI_ALL) of the above described link observed by the input rate observation unit to the target output band (BWO2_ALL) in the congestion state predetermined for the above described link when the quality class buffer QCP(i) is in the congestion state. When a forward RM cell arrives, the average cell rate computation unit computes a new average value (MACR_QCP(i)_NEW) of the CCR of the above described quality class buffer QCP(i) using the CCR_QCP(i) and the MACR_QCP(i)_OLD when the quality class buffer QCP(i) is in the congestion state, and the CCR value (CCR_QCP(i)) set in the CCR field of the above described forward RM cell is smaller than MACR_QCP(i)_OLD, which is an average value of the CCR computed through a predetermined algorithm set in the CCR field of the forward RM cell which previously arrived at the above described quality class buffer QCP(i), or when the quality class buffer QCP(i) is in the non-congestion state, and the CCR value set in the CCR field of the forward RM cell is larger than the MACR_QCP(i)_OLD. The average cell rate computation unit also computes a new average value (MACR_QCP(i)_NEW) of the CCR of the link accommodating the above described quality class buffer QCP(i) based on the CCR value (CCR_ALL) set in the CCR field of the forward RM cell which arrives at the above described link, and the MACR_ALL_OLD, which is an average value of the CCR computed through a predetermined algorithm set in the CCR field of the forward RM cell which previously arrived at the above described link. Depending on the determination result of the above described congestion determination unit, the ER computation unit sets the first explicit cell rate (ER1) to a value obtained by dividing the MACR_QCP(i)_NEW obtained by the above described average cell rate computation unit by the OLF1_QCP(i) obtained by the above described first load factor computation unit, or to a value obtained by dividing the MACR_ALL_NEW obtained by the above described average cell rate computation unit by the OLF_ALL obtained by the second load factor computation unit whichever is larger when the quality class buffer QCP(i) is in the non-congestion state. When the quality class buffer QCP(i) is in the congestion state, the ER computation unit sets the first explicit cell rate (ER1) to a value obtained by dividing the MACR_QCP(i)_NEW obtained by the above described average cell rate computation unit by the OLF2_QCP(i) obtained by the above described first load factor computation unit, or to a value obtained by dividing the MACR_ALL_New obtained by the above described average cell rate computation unit by the OLF_ALL obtained by the second load factor computation unit whichever is larger when the quality class buffer QCP(i) is in the non-congestion state. Furthermore, the ER computation unit sets the second explicit cell rate (ER2) to the above described first explicit cell rate (ER1) or the minimum cell rate set in the connection of the above described quality class buffer QCP(i), whichever is larger.

The cell transfer control apparatus according to the second aspect of the present invention which is mentioned in claim 2, includes a quality class buffer, a congestion determination unit, a target output band computation unit, an input rate observation unit, a load factor computation unit, an average cell rate computation unit, and an ER computation unit.

In the second phase of the present invention, a plurality of quality class buffers QCP(i) are provided for each quality class i (i=1, 2, . . . , n) to guarantee the communications quality declared by the user. The congestion determination unit determines whether the above described quality class buffer QCP(i) is in the congestion state or in the non-congestion state based on the predetermined first threshold set in the quality class buffer QCP(i). Depending on the determination result from the above described congestion determination unit, a target output band computation unit computes a new target output band (BWO_QCP(i)_NEW) of the above described quality class buffer QCP(i) by increasing the current target output band (BWO_QCP(i)_OLD) of the above described quality class buffer QCP(i) when the quality class buffer QCP(i) is in the non-congestion state. The target output band computation unit computes a new target output band (BWO_QCP(i)_NEW) of the above described quality class buffer QCP(i) by decreasing the current target output band (BWO_QCP(i)_OLD) of the above described quality class buffer QCP(i) when the quality class buffer QCP(i) is in the congestion state. The input rate observation unit observes the input cell rate (BWI_QCP(i)) of each quality class buffer QCP(i) for each predetermined observation period. The load factor computation unit computes, for the quality class buffer QCP(i), the load factor (OFL_QCP(i)) of the quality class buffer QCP(i) based on the OLF_QCP(i)=BWI_QCP(i)/BWO_QCP(i)_NEW, which is the ratio of the input cell rate (BWI_QCP(i)) of the quality class buffer QCP(i) observed by the above described input rate observation unit to the target output band (BWO_QCP(i)_NEW) obtained by the target output band computation unit. When a forward RM cell arrives, the average cell rate computation unit computes a new average value (MACR_QCP(i)_NEW) of the CCR of the above described quality class buffer QCP(i) using the CCR_QCP(i) and the MACR_QCP(i)_OLD when the quality class buffer QCP(i) is in the congestion state, and the CCR value (CCR_QCP(i)) set in the CCR field of the above described forward RM cell is smaller than MACR_QCP(i)_OLD, which is an average value of the CCR computed through a predetermined algorithm set in the CCR field of the forward RM cell which previously arrived at the above described quality class buffer QCP(i), or when the quality class buffer QCP(i) is in the non-congestion state, and the CCR value set in the CCR field of the forward RM cell is larger than the MACR_QCP(i)_OLD. The ER computation unit computes the first explicit cell rate (ER1) of the quality class buffer QCP(i) as a ratio of the MACR_QCP(i)_NEW of the above described quality class buffer QCP(i) obtained by the average cell rate computation unit to the OLF_QCP(i) of the quality class buffer QCP(i) obtained by the load factor computation unit, and sets the second explicit cell rate (ER2) to the above described first explicit cell rate (ER1) or the minimum cell rate set for the connection of the quality class buffer QCP(i), whichever is larger.

The cell transfer rate control apparatus according to the third aspect of the present invention which is mentioned in claim 67, includes a storage unit, a determination unit, a observation unit, a load factor computation unit, a link load factor computation unit, an average cell rate computation unit, and an explicit cell rate computation unit.

In the third phase of the present invention, a plurality of storage units store cells. The determination unit determines a congestion state if the number of cells stored in the storage unit is equal to or larger than a predetermined value, or a non-congestion state if it is smaller than the predetermined threshold. The observation unit observes the input cell rate of the storage unit and the link input cell rate in the ATM switch accommodating the storage unit. The load factor computation unit computes the load factor of the storage unit, which is the ratio of the input cell rate of the storage unit observed by the observation unit to the target output band of the storage unit, in each of the congestion state and the non-congestion state determined by the determination unit. The link load factor computation unit computes the link load factor of the above described link, which is the ratio of the link input cell rate of the link observed by the observation unit to the link target output band of the above described link, in each of the congestion state and the non-congestion state determined by the determination unit. The average cell rate computation unit computes an average value of the current cell rate of a resource management cell in the storage unit and the link if the determination unit determines a congestion state when a forward resource management cell arrives, and the current cell rate of the resource management cell is smaller than an average value, or if the determination unit determines a non-congestion state, and the current cell rate of the resource management cell is larger than the average value. When the determination unit determines a non-congestion, the explicit cell rate computation unit computes, as the first explicit cell rate, the value by dividing the average value of the current cell rate computed by the average cell rate computation unit and stored in the storage unit by the above described load factor computed by the load factor computation unit, or the value obtained by dividing the average value of the above described current cell rate computed by the average cell rate computation unit and stored in the link by the link load factor computed by the link load factor computation unit, whichever is larger.

The cell transfer rate control apparatus according to the fourth aspect of the present invention which is mentioned in claim 68, includes the storage unit, the determination unit, the target output band computation unit, the observation unit, the load factor computation unit, the average cell rate computation unit, and the explicit cell rate computation unit.

In the fourth phase of the present invention, a plurality of storage units store cells. The determination unit determines a congestion state if the number of cells stored in the storage unit is equal to or larger than a predetermined value, or a non-congestion state if it is smaller than the predetermined threshold. The target output band computation unit computes a target output band by increasing the target output band of the storage unit when the determination unit determines a non-congestion state, or the target output band by decreasing the target output band of the storage unit when the determination unit determines a congestion state. The observation unit observes the input cell rate of the storage unit. The load factor computation unit computes the load factor of the storage unit, which is the ratio of the above described input cell rate observed by the observation unit and stored in the storage unit to the above described target output band computed by the target output band computation unit. The average cell rate computation unit computes the average value of the current cell rate of a resource management cell when the determination unit determines a congestion state and the current cell rate of the resource management cell is smaller than an average value, or when the determination unit determines a non-congestion state and the current cell rate of the resource management cell is larger than the average value. The explicit cell rate computation unit computes, as the first explicit cell rate, a value by dividing the average value of the current cell rate computed by the average cell rate computation unit by the above described load factor computed by the load factor computation unit, and computes, as the second explicit cell rate, the first explicit cell rate or the minimum cell rate in the storage unit, whichever is larger.

BRIEF DESCRIPTION OF THE DRAWINGS

FIG. 1C shows the RM cell format;
FIG. 19 shows an example showing the BWI_ALL selection table.

DESCRIPTION OF THE PREFERRED EMBODIMENTS

Figure 1A:
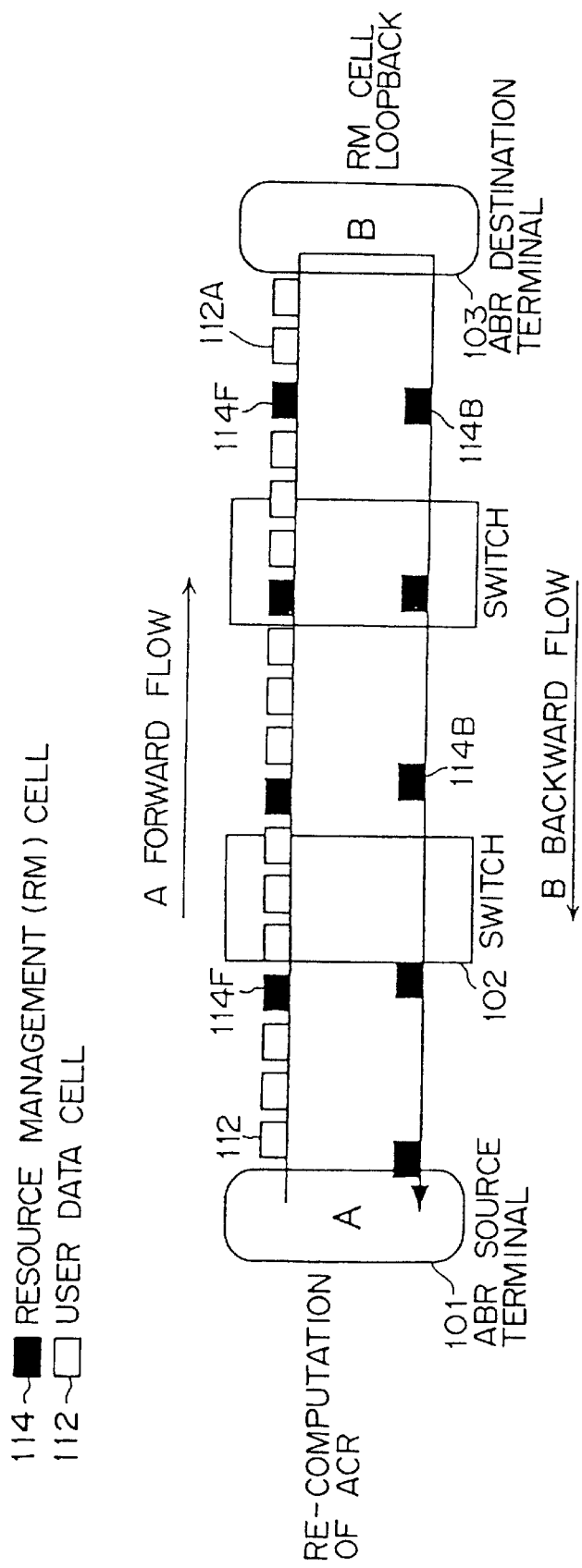
FIG. 1A explains the ABR flow control.
Figure 1B:
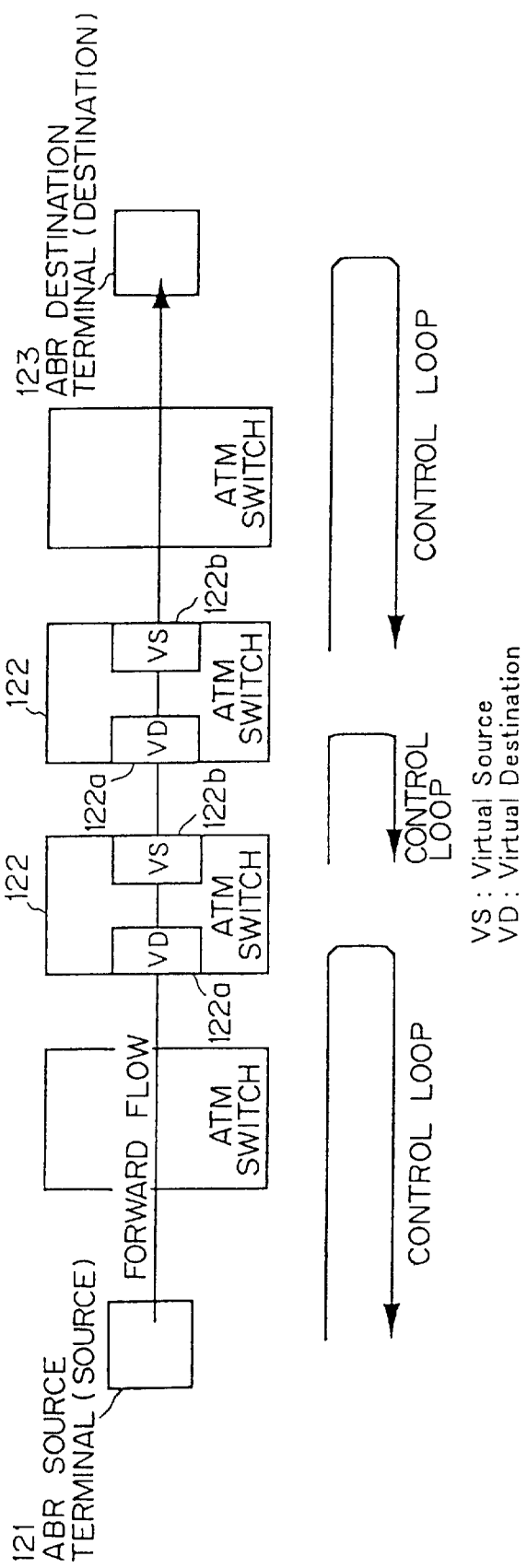
FIG. 1B shows the VS/VD systems.
Figure 1D:
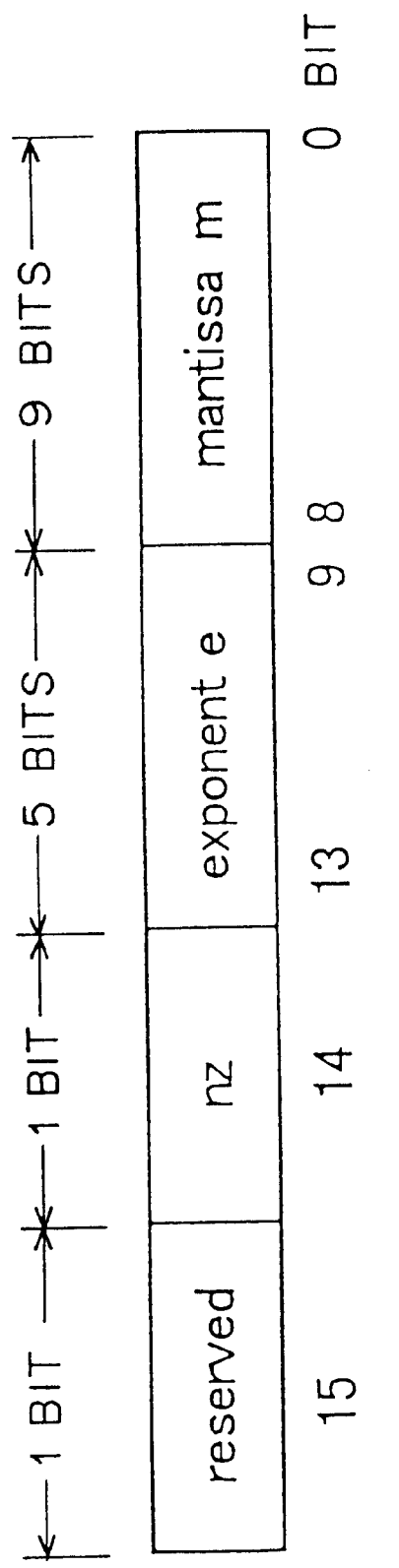
FIG. 1D shows the rate display format.
Figure 1E:
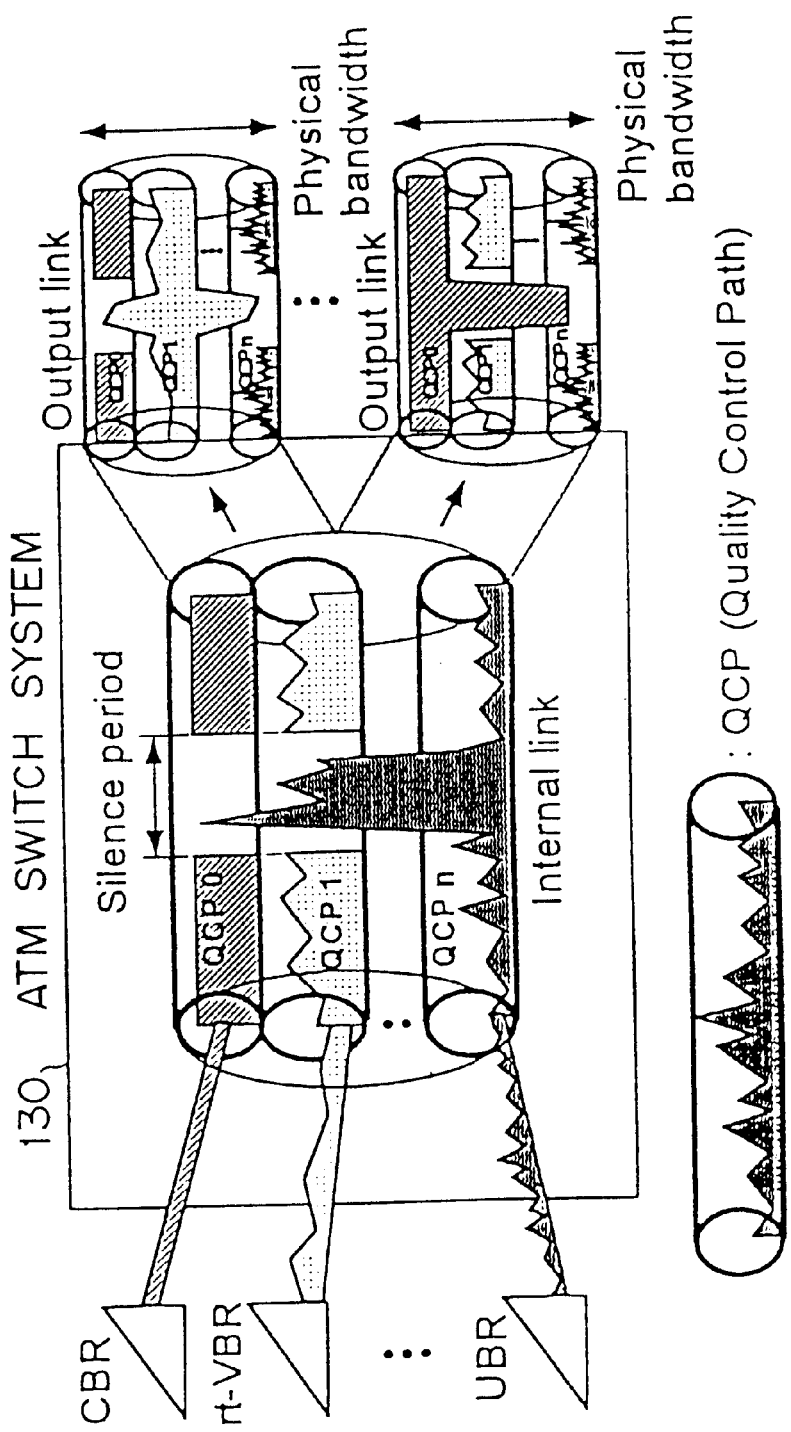
FIG. 1E shows the quality control path.

The present invention is described below in detail by referring to the attached drawings.

The cell transfer rate control apparatus according to the present invention includes: a plurality of quality class buffers QCP(i) provided for each quality class i (i=1, 2, ..., n) to guarantee the communications quality declared by the user; the congestion determination unit for determining whether the above described quality class buffer QCP(i) is in the congestion state or in the non-congestion state based on the predetermined first threshold set in the quality class buffer QCP(i); the input rate observation unit for observing the input cell rate (BWI_QCP(i)) of each quality class buffer QCP(i), and the input cell rate (BWI_ALL) of the link accommodating the above described quality class buffer QCP(i) in each predetermined observation period; the first load factor computation unit for computing, depending on the determination result from the congestion determination unit, the load factor (OLF1_QCP(i)) of the above described quality class buffer QCP(i) in the non-congestion state based on the OLF1_QCP(i)=BWI_QCP(i)/BWO1_QCP(i), which is the ratio of the BWI_QCP(i) of the above described quality class buffer QCP(i) observed by the input rate observation unit to the target output band (BWO1_QCP(i)) in the non-congestion state predetermined for the above described quality class buffer QCP(i), when the quality class buffer QCP(i) is in the non-congestion state, and for computing the load factor (OLF2_QCP(i)) of the above described quality class buffer QCP(i) in the congestion state based on the OLF2_QCP(i)=BWI_QCP(i)/BWO2_QCP(i), which is the input cell rate (BWI_QCP(i)) of the above described quality class buffer QCP(i) observed by the input rate observation unit to the target output band (BWO2_QCP(i)) in the congestion state predetermined for the above described quality class buffer QCP(i) when the quality class buffer QCP(i) is in the congestion state; the second load factor computation unit for computing, depending on the determination result from the congestion determination unit, the load factor (OLF1_ALL) of the link accommodating the above described quality class buffer QCP(i) in the non-congestion state based on the OLF1_ALL=BWI_ALL/BWO1_ALL, which is the ratio of the input cell rate (BWI_ALL) of the above described link observed by the input rate observation unit to the target output band (BWO1_ALL) in the non-congestion state predetermined for the above described link, when the quality class buffer QCP(i) is in the non-congestion state, and for computing the load factor (OLF2_ALL) of the above described link in the congestion state based on the OLF2_ALL=BWI_ALL/BWO2_ALL, which is the input cell rate (BWI_ALL) of the above described link observed by the input rate observation unit to the target output band (BWO2_ALL) in the congestion state predetermined for the above described link when the quality class buffer QCP(i) is in the congestion state; the average cell rate computation unit for computing, when a forward RM cell arrives, a new average value (MACR_QCP(i)_NEW) of the CCR of the above described quality class buffer QCP(i) using the CCR_QCP(i) and the MACR_QCP(i)_OLD when the quality class buffer QCP(i) is in the congestion state, and the CCR value (CCR_QCP(i)) set in the CCR field of the above described forward RM cell is smaller than MACR_QCP(i)_OLD, which is an average value of the CCR computed through a predetermined algorithm set in the CCR field of the forward RM cell which previously arrived at the above described quality class buffer QCP(i), or when the quality class buffer QCP(i) is in the non-congestion state, and the CCR value set in the CCR field of the forward RM cell is larger than the MACR_QCP(i)_OLD, and for computing a new average value (MACR_QCP(i)_NEW) of the CCR of the link accommodating the above described quality class buffer QCP(i) based on the CCR value (CCR_ALL) set in the CCR field of the forward RM cell which arrives at the above described link, and the MACR_ALL_OLD, which is an average value of the CCR computed through a predetermined algorithm set in the CCR field of the forward RM cell which previously arrived at the above described link; the ER computation unit for setting, depending on the determination result of the above described congestion determination unit, the first explicit cell rate (ER1) to a value obtained by dividing the MACR_QCP(i)_NEW obtained by the above described average cell rate computation unit by the OLF1_QCP(i) obtained by the above described first load factor computation unit, or to a value obtained by dividing the MACR_ALL_NEW obtained by the above described average cell rate computation unit by the OLF_ALL obtained by the second load factor computation unit whichever is larger when the quality class buffer QCP(i) is in the non-congestion state, for setting, when the quality class buffer QCP(i) is in the congestion state, the first explicit cell rate (ER1) to a value obtained by dividing the MACR_QCP(i)_NEW obtained by the above described average cell rate computation unit by the OLF2_QCP(i) obtained by the above described first load factor computation unit, or to a value obtained by dividing the MACR_ALL_NEW obtained by the above described average cell rate computation unit by the OLF_ALL obtained by the second load factor computation unit whichever is larger when the quality class buffer QCP(i) is in the non-congestion state, and for setting the second explicit cell rate (ER2) to the above described first explicit cell rate (ER1) or the minimum cell rate set in the connection of the above described quality class buffer QCP(i), whichever is larger.

The cell transfer rate control apparatus according to the present invention includes: a plurality of quality class buffers QCP(i) provided for each quality class i (i=1, 2, . . . , n) to guarantee the communications quality declared by the user; the congestion determination unit for determining whether the above described quality class buffer QCP(i) is in the congestion state or in the non-congestion state based on the predetermined first threshold set in the quality class buffer QCP(i); a target output band computation unit for computing, depending on the determination result from the above described congestion determination unit, a new target output band (BWO_QCP(i)_NEW) of the above described quality class buffer QCP(i) by increasing the current target output band (BWO QCP(i) OLD) of the above described quality class buffer QCP(i) when the quality class buffer QCP(i) is in the non-congestion state, and for computing a new target output band (BWO_QCP(i)_NEW) of the above described quality class buffer QCP(i) by decreasing the current target output band (BWO_QCP(i)_OLD) of the above described quality class buffer QCP(i) when the quality class buffer QCP(i) is in the congestion state; the input rate observation unit for observing the input cell rate (BWI_QCP(i)) of each quality class buffer QCP(i) for each predetermined observation period; the load factor computation unit for computing, for the quality class buffer QCP(i), the load factor (OFL_QCP(i)) of the quality class buffer QCP(i) based on the OLF_QCP(i)=BWI_QCP(i)/BWO_QCP(i)_NEW, which is the ratio of the input cell rate (BWI_QCP(i)) of the quality class buffer QCP(i) observed by the above described input rate observation unit to the target output band (BWO_QCP(i)_NEW) obtained by the target output band computation unit; the average cell rate computation unit for computing, when a forward RM cell arrives, a new average value (MACR_QCP(i)_NEW) of the CCR of the above described quality class buffer QCP(i) using the CCR_QCP(i) and the MACR_QCP(i)_OLD when the quality class buffer QCP(i) is in the congestion state, and the CCR value (CCR_QCP(i)) set in the CCR field of the above described forward RM cell is smaller than the MACR_QCP(i)_OLD, which is an average value of the CCR computed through a predetermined algorithm set in the CCR field of the forward RM cell which previously arrived at the above described quality class buffer QCP(i), or when the quality class buffer QCP(i) is in the non-congestion state, and the CCR value set in the CCR field of the forward RM cell is larger than the MACR_QCP(i)_OLD; and the ER computation unit for computing the first explicit cell rate (ER1) of the quality class buffer QCP(i) as a ratio of the MACR_QCP(i)_NEW of the above described quality class buffer QCP(i) obtained by the average cell rate computation unit to the OLF_QCP(i) of the quality class buffer QCP(i) obtained by the load factor computation unit, and for setting the second explicit cell rate (ER2) to the above described first explicit cell rate (ER1) or the minimum cell rate set for the connection of the quality class buffer QCP(i), whichever is larger.

The above described cell transfer rate control apparatuses further include an ER setting unit for comparing the value of the second explicit cell rate (ER2) obtained by the above described ER computation unit with the value of the third explicit cell rate (ER) set in the ER field of the forward and backward RM cell in the quality class i of the above described quality class buffer QCP(i), and for setting the smaller value in the ER field of the RM cell.

According to the above described present invention, an available band for a service of the quality class i can be used depending on the use state of the services of other quality classes i. As a result, the network resources can be efficiently used, and the communications quality of the service i of each quality class i can be guaranteed.

Figure 2:
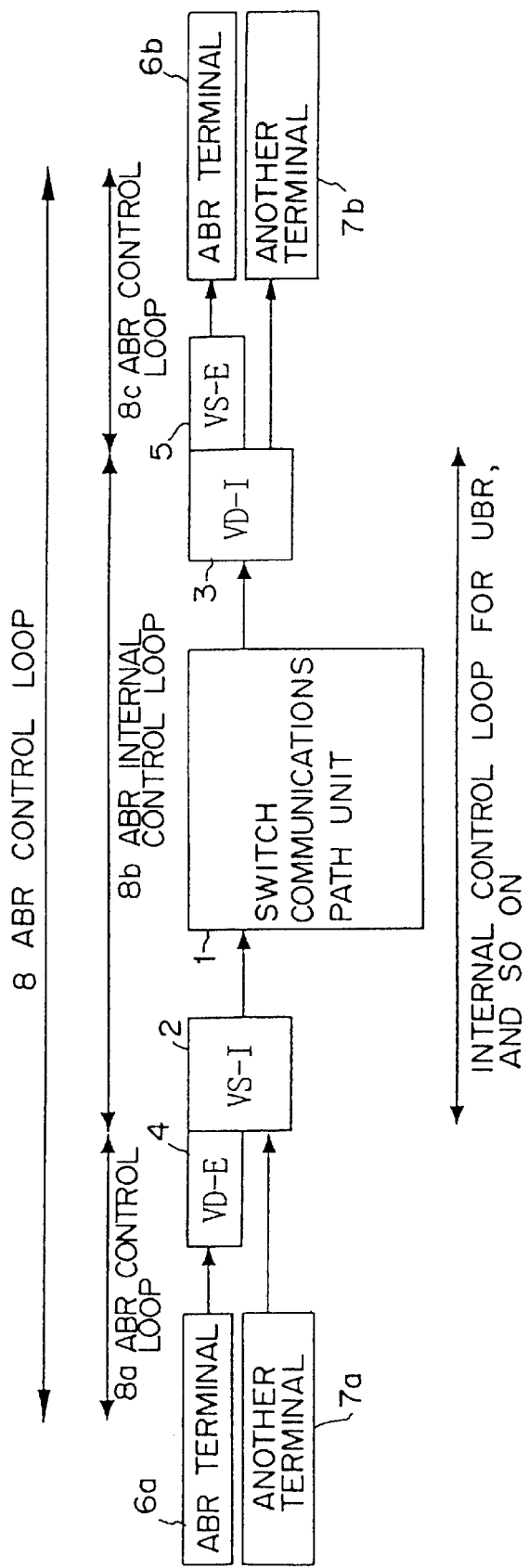
FIG. 2 shows the configuration of the system according to the embodiment of the present invention.

FIG. 2 shows the configuration of the system according to the embodiment of the present invention.

A switch communications path unit 1 obtains an ER in consideration of the load state of the QCP (quality control path) provided for each quality class (service), the load of the internal link which is a physical link accommodating a plurality of QCPs, and the congestion state of the QCP in the feedback control system using the RM cell in an ABR internal control loop 8b.

A VS-I (virtual source for internal) 2 is a virtual source terminal for controlling the flow according to the resource state in the switch communications path unit 1.

A VD-I (virtual destination for internal) 3 is a virtual destination terminal for controlling the flow with the VS-I 2.

A VD-E (virtual destination for external) 4 is a virtual ABR destination terminal for communicating with the source ABR terminal 6a, and performs an ABR connection control loop 8a with the ABR terminal 6a.

The VS-I 2 and the VD-I 3 are provided to embody the internal VS/VD system, and executes an ABR internal control loop 8b.

In this example, the internal VS/VD system refers to a closed VS/VD system in a switch. The VS-I 2 temporarily buffers a cell, and performs a dynamic shaping for each VC connection. Simultaneously, the VS-I 2 generates a specific RM cell to be used only in the switch communications path unit 1, and terminates and loopbacks the specific RM cell. The ER value is obtained corresponding to the congestion state at a point where congestion has arisen in the switch communications path unit 1, and the ER value is written to the specific RM cell. The written specific RM cell is looped back by the VD-I 3, and is returned to the VS-I 2. The VS-I 2 performs a shaping process for each connection according to the ER value written to the returned RM cell, and transmits the buffered cell to the switch communications path unit 1.

A VS-E (virtual source for external) 5 is a virtual ABR source terminal for communicating with a destination ABR terminal 6b, and performs an ABR connection control loop 8c with the ABR terminal 6b.

The above described switch communications path unit 1, the VS-I 2, the VD-I 3, the VD-E 4, and the VS-E 5 are components of an ATM switch for realizing the internal VS/VD system. An ABR connection control loop 8 between the ABR terminal 6a and the ABR terminal 6b is divided into the above described three control loops 8a, 8b, and 8c.

A cell transmitted from the ABR terminal 6a is input to the VS-I 2 through the VD-E 4, and the cell transmitted through another terminal 7a other than the ABR terminal such as the UBR terminal, and so on, is input directly to the VS-I 2 without VD-E 4. The ABR terminal 6b receives a cell transmitted from the ABR terminal 6a from the VS-E 5 through the VD-I 3. Another terminal 7b other than the ABR terminals such as a UBR terminal, etc. receives a cell transmitted from the other terminal 7a directly from the VD-I 3 without the VS-E 5.

Figure 3A:
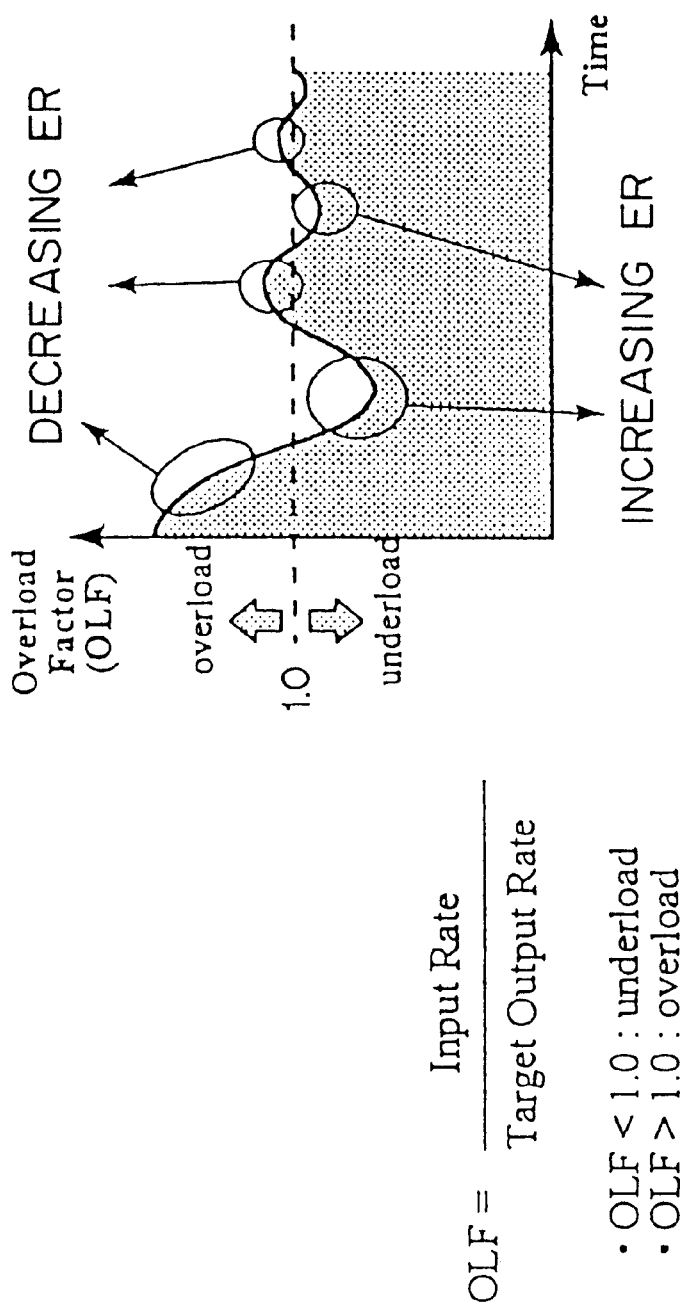
FIG. 3A is a chart (1) showing the outline of the LBERC system.
Figure 3B:
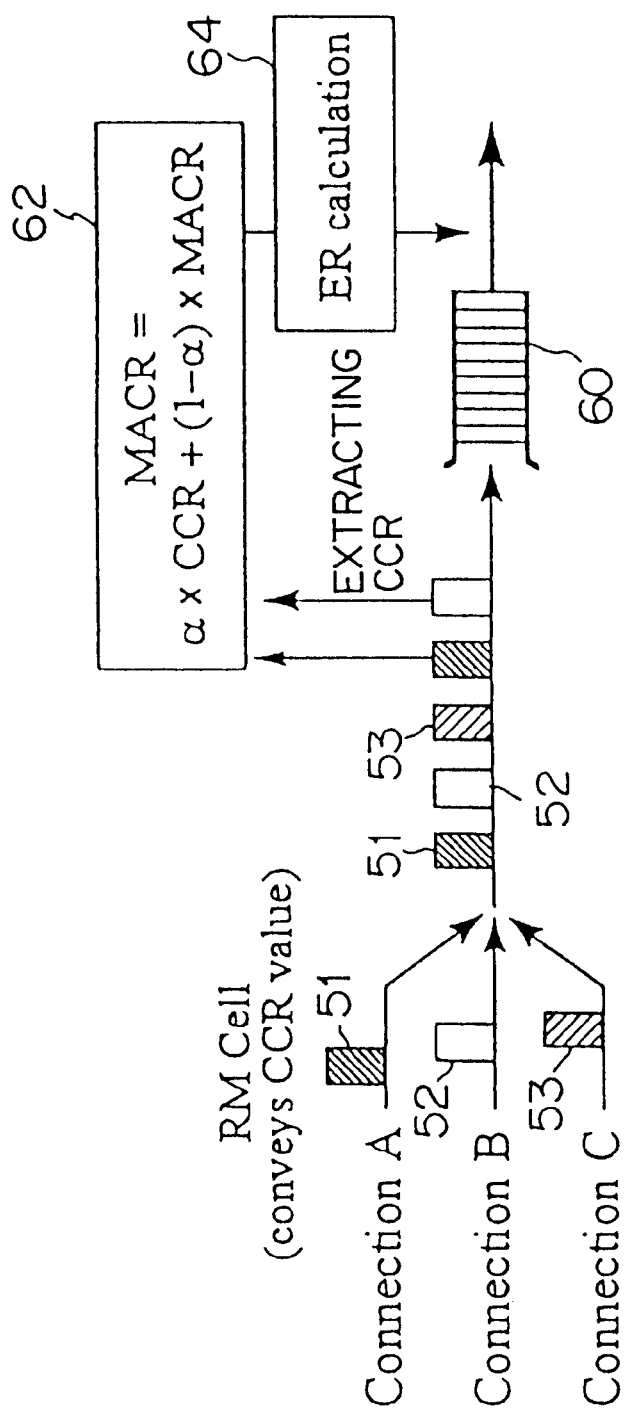
FIG. 3B is a chart (2) showing the outline of the LBERC system.

The outline of the system of computing the embodiment ER according to the present invention executed in the switch communications path unit 1 is described below by referring to FIGS. 3A and 3B. FIGS. 3A and 3B show the LBERC (load based ER control) system.

The LBERC system is based on the load observation. The actual load during the observation period is measured by the hardware, and the result is reflected on the computation of the ER value. The load is actually observed by counting the cell arriving at each quality class buffer. The target output rate is preliminarily set by the software, and the load factor, which is the ratio of the input rate to the set target output rate, is set as an OLF (overload factor). The OLF is computed by the following equation (1). The computation of the OLF is performed for each quality class buffer or each link (path).

$$\text{OLF} = \text{input rate/target output rate} \quad (1)$$

Furthermore, each time an RM cell arrives, an average exponent value is computed based on the MACR (mean allowed cell rate) by the following equation (2) using the value of the CCR set in the CCR field of the RM cell. The MACR_NEW indicates a new average exponent value, and MACR_OLD indicates a current average exponent value, and a indicates an averaging factor. The MACR is computed for each quality class buffer, or each link (path).

$$\text{MACR\_NEW} = \alpha \times \text{CCR} + (1-\alpha) \times \text{MACR\_OLD} \quad (2)$$

where $\alpha$ can be set to a fixed value, or can be determined using a genetic algorithm or a neural network.

In the LBERC system, as shown in FIG. 3A, when the OLF exceeds a reference value (1.0 in FIG. 3A) indicated by broken lines in FIG. 3A, it is determined that there is an overload, and control is performed such that the ER value can be decreased. When the OLF is smaller than the reference value, control is performed such that the ER value can be increased.

FIG. 3B shows the concept of the LBERC according to the present invention.

In the LBERC system according to the present invention, as shown in FIG. 3B, the CCR is extracted from the CCR fields of RM cells 51, 52, and 53 of the connections A, B, and C stored in the same quality class buffer 60 in the switch communications path unit 1. A first computation unit 62 computes the MACR of the quality class buffer 60 using the CCR value by the above described equation (2). Next, a second computation unit 64 computes the ER for a source terminal (not shown in FIG. 3B) according to the algorithm described later using the MACR value obtained by the first computation unit 62. When the ER value is smaller than the ER value set in the RM cells 51, 52, and 53, the computed ER value is written to the RM cells 51, 52, and 53.

Described below in detail is the embodiment of practically computing the ER by the LEBRC system in the switch communications path unit 1.

[1] Non-congestion is determined when the number of stored cells in the quality class buffer QCP(i) for storing the cells of the ABR connection of the quality class i is smaller than the threshold THA. Congestion is determined when the number of stored cells is equal to or larger than THA. The 'i' indicates the identifier for identifying the quality class as in the following cases.

[2] The input cell rate to the quality class buffer QCP(i) observed at each predetermined observation period is computed as the first observation input rate (BWI_QCP(i)). In the non-congestion state, the load factor (OLF1_QCP(i)) in the non-congestion state, which is the ratio of the BWI_QCP(i) to the predetermined target output band (BWO1_QCP(i)) of the quality class buffer QCP(i) in the non-congestion state, is computed by the following equation (3). In the congestion state, the load factor (OLF2_QCP(i)) in the congestion state, which is the ratio of the BWI_QCP(i) to the predetermined target output band (BWO2_QCP(i)) of the quality class buffer QCP(i) in the congestion state, is computed by the following equation (4).

$$OLF1\_QCP(i)=BWI\_QCP(i)/BWO1\_QCP(i) \quad (3)$$

$$OLF2\_QCP(i)=BWI\_QCP(i)/BWO2\_QCP(i) \quad (4)$$

[3] The input cell rate to the link containing the quality class buffer QCP(i) observed at each predetermined observation period is computed as the second observation input rate (BWI_ALL). In the non-congestion state, the load factor (OLF1_ALL) in the non-congestion state, which is the ratio of the BWI_ALL to the predetermined target output band (BWO1_ALL) of the link in the non-congestion state, is computed by the following equation (5). In the congestion state, the load factor (OLF2_ALL) in the congestion state, which is the ratio of the BWI_ALL to the predetermined target output band (BWO2_ALL) of the link in the congestion state, is computed by the following equation (6).

$$OLF1\_ALL=BWI\_ALL/BWO1\_ALL \quad (5)$$

$$OLF2\_ALL=BWI\_ALL/BWO2\_ALL \quad (6)$$

[4] When a forward RM cell arrives, a new average value (MACR_QCP(i)_NEW) of the CCR of the quality class buffer QCP(i) is computed using the following equation (7) when the quality class buffer QCP(i) is in the congestion state, and the CCR value (CCR_QCP(i)) set in the CCR field of the forward RM cell is smaller than the current average value MACR_QCP(i)_OLD of the CCR of the quality class buffer QCP(i), or when the quality class buffer QCP(i) is in the non-congestion state, and the CCR value set in the CCR field of the forward RM cell is larger than the MACR_QCP(i)_OLD. Then, a new average value (MACR_ALL_NEW) of the CCR of the link accommodating the quality class buffer QCP(i) is computed by the following equation (8) using the current average value (MACR_ALL_OLD) of the CCR of the link and the CCR value (CCR_ALL) set in the forward RM cell. The a(i) indicates an averaging factor of the quality class i, and α indicates an averaging factor of a link. The α (i) and α are values equal to or larger than 0, and equal to or smaller than 1, for example, 1/128. This holds true with the other embodiments described later.

$$MACR\_QCP(i)\_NEW=\alpha(i)\times CCR\_QCP(i)+(1-\alpha(i))\times MACR\_QCP(i)\_OLD \quad (7)$$

$$MACR\_ALL\_NEW=\alpha\times CCR\_ALL+(1-\alpha)\times MACR\_ALL\_OLD \quad (8)$$

[5.1] When the quality class buffer QCP(i) is in the non-congestion state, the ER1 is computed by operating the following function (9). Then, the ER2 is computed by operating the following function (10). The MCR(i) indicates the minimum cell rate (MCR) set in the connection corresponding to the quality class buffer QCP(i). This holds true with the subsequent embodiments.

$$ER1=max(MACR\_QCP(i)\_NEW/OLF1\_QCP(i), MACR\_ALL\_NEW/OLF1\_ALL) \quad (9)$$

$$ER2=max(ER1, MCR(i)) \quad (10)$$

where C=max(A,B) indicates a function which defines A or B, whichever is larger, as C. This holds true with the subsequent embodiments.

[5.2] When the quality class buffer QCP(i) is in the congestion state, the ER1 is computed by operating the following function (11). Then, the ER2 is computed by operating the following function (12).

$$ER1=max(MACR\_QCP(i)\_NEW/OLF2\_QCP(i), MACR\_ALL\_NEW/OLF2\_ALL) \quad (11)$$

$$ER2=max(ER1, MCR(i)) \quad (12)$$

[6] Based on the following function (13), the value of the ER2 obtained in the above described [5.1] or [5.2] is compared with the ER set in the ER field of the forward and backward RM cell in the above described quality class i. The ER2 or the ER whichever is smaller is selected. The selected value is set in the ER field of the RM cell.

$$ER=min(ER2, ER\ value\ in\ RM\ cell) \quad (13)$$

where C=min(A,B) indicates a function which defines A or B, whichever is smaller, as C. This holds true with the subsequent embodiments.

Figure 4:
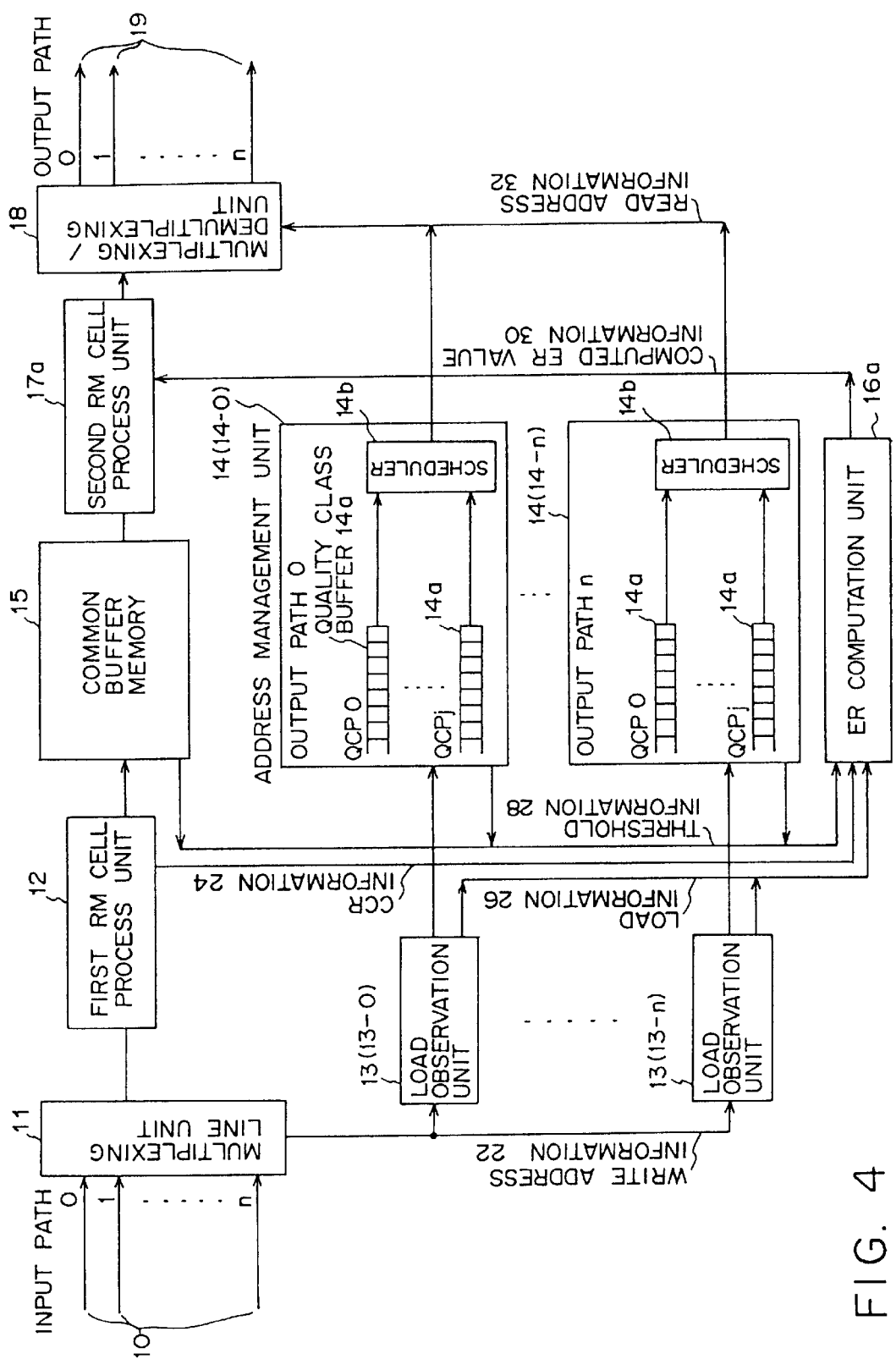
FIG. 4 shows an example of the switch communications path embodying the LBERC system.
Figure 5:
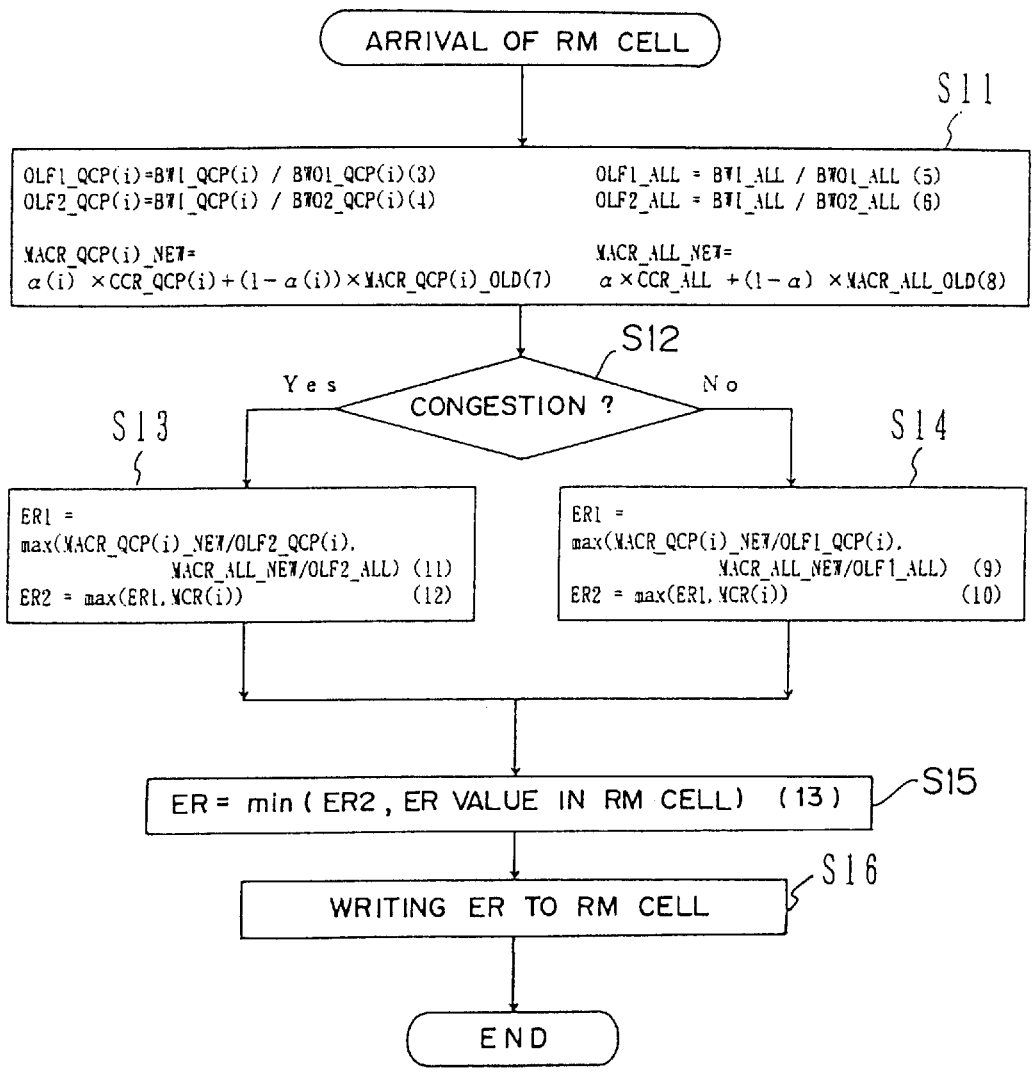
FIG. 5 is a flowchart showing the operations of the switch communications path shown in FIG. 4.

The hardware configuration and the operation flowchart embodying the LBERC system according to the first embodiment of the present invention is described below by referring to FIGS. 4 and 5. FIG. 4 shows an example of the hardware provided in the switch communications path unit 1 in the above described LBERC system. FIG. 5 is a flowchart showing the operations of the hardware in the switch communications path unit 1 shown in FIG. 4.

A multiplexing line unit 11 multiplexes a cell input through (n+1) input paths 10, and output to a first RM cell process unit 12. Before the multiplexing, a VPI/VCI conversion is made, and the VPI/VCI information of the header of the cell is rewritten into a routing tag. The routing tag contains the number of a routed-to output path 19 (output path information), the number of the QCP class of the corresponding QCP class buffer 14a, and so on. The multiplexing line unit 11 outputs the output path information set in the above described routing tag of the cell and write address information 22 having a QCP class number and common buffer memory 15 of the cell to a load observation unit 13 corresponding the output path information.

The first RM cell process unit 12 extracts an RM cell from the cells input from the multiplexing line unit 11, and outputs the CCR value set as CCR information 24 in the CCR field of the RM cell to a ER computation unit 16a.

The load observation unit 13 is provided corresponding one to one to each of the (n+1) output paths 19. The multiplexing line unit 11 and each of the load observation units 13 (13-0, 13-1, . . . , 13-n) are individual signals, and are connected through common signal lines. The load observation unit 13 outputs the write address information 22 to an address management unit 14 corresponding to the output path information by referring to the output path information contained in the write address information 22 input from the multiplexing line unit 11. The load observation unit 13 observes (computes) the BWI_QCP(i) and BWI_ALL for each predetermined observation period according to the input write address information 22, and outputs the BWI_QCP(i) and BWI_ALL as load information 26 to the ER computation unit 16a.

The address management unit 14 (14-0, 14-1, . . . 14-n) is provided for every (n+1) output paths 19. Each address management unit 14 comprises a quality class buffer 14a (QCP(i)) provided for each quality class i (i=0, 1, . . . , j), and a scheduler 14b. Using a control unit not shown in FIG. 4, the address management unit 14 writes the write address information to the quality class buffer 14a (QCP(i)) corresponding to the QCP class number by referring to the QCP class number contained in the write address information input from the load observation unit 13. The scheduler 14b reads the write address information from each of the quality class buffers 14a (QCP(i)) at a rate assigned to each quality class i by, for example, the FIFO (first in first out) method, and outputs the read information as read address information 32 to a multiplexing/demultiplexing unit 18. Furthermore, through the control unit, the address management unit 14 outputs to the ER computation unit 16a the number of pieces of the address information as threshold information 28 (equal to the number of cells for connection of the quality class i stored in the common buffer memory 15) buffered in the quality class buffer 14a (QCP(i)), which is equal to the number of cells of the quality class i of each quality class buffer 14a (QCP(i)) buffered in the common buffer memory 15.

A cell input from the first RM cell process unit 12 is written to the common buffer memory 15 by the memory control circuit not shown in FIG. 4. The memory control circuit reads a cell from the common buffer memory 15, and outputs it to a second RM cell process unit 17a. The memory control circuit outputs the information indicating the number of cells stored in the common buffer memory 15 as threshold information to the ER computation unit 16a.

The ER computation unit 16a computes the OLF1_QCP (i) by the equation (3) based on the BWI_QCP(i) contained in the load information 26 input from the load observation unit 13 and the predetermined BWO1_QCP(i), and also computes the value of the OLF2_QCP(i) by the equation (4) based on the BWI_QCP(i) and the predetermined BWO2_QCP(i). Furthermore, the ER computation unit 16a computes the OLF1_ALL by the equation (5) based on the BWI_ALL contained in the load information 26 input from the load observation unit 13 and the predetermined BWI_ALL, and also computes the value of the OLF2_ALL by the equation (6) based on the BWI_ALL and the predetermined BWO2_ALL. The ER computation unit 16a obtains the CCR_QCP(i) from the CCR value set in the CCR field in the RM cell indicated by the CCR information 24, and obtains the CCR_ALL of the address management unit 14 (link) accommodating the quality class buffer 14a (QCP(i)) from the CCR value set in the CCR field of the RM cell. The ER computation unit 16a computes the value of the MACR_QCP(i)_NEW by the equation (7) based on the CCR_QCP(i) and the MACR_QCP(i)_OLD previously computed (in the previous observation), and computes the value of the MACR_ALL_NEW by the equation (8) based on the CCR_ALL and the MACR_ALL_OLD previously computed (in the previous observation). In the ER computation unit 16a, a threshold (THA) of each quality class buffer QCP(i) is preliminarily set. The ER computation unit 16a determines that the quality class buffer 14a (QCP(i)) is in the non-congestion state if the number of stored cells informed by the threshold information 28 of the quality class buffer 14a (QCP(i)) input through the address management unit 14 is smaller than the THA, the value of the ER1 of the quality class buffer 14a (QCP(i)) is computed for each address management unit 14 using the function (9), and then the ER2 of the quality class buffer 14a (QCP(i)) is computed using the function (10). On the other hand, if the number of stored cells is equal to or larger than the THA, then it is determined that the quality class buffer 14a (QCP(i)) is in the congestion state, the value of the ER1 of the quality class buffer 14a (QCP(i)) is computed for each address management unit 14 through the function (11), and then the ER2 of the quality class buffer 14a (QCP(i)) is computed through the function (12). Furthermore, the ER computation unit 16a outputs computed ER value information 30 indicating the obtained ER2 value to the second RM cell process unit 17a.

The second RM cell process unit 17a outputs to the multiplexing/demultiplexing unit 18 the user data cells other than the RM cells input from the common buffer memory 15. On the other hand, when an RM cell is input, the second RM cell process unit 17a compares the value of the ER2 indicated by the computed ER value information 30 corresponding to the RM cell input from the ER computation unit 16a with the value of the ER set in the ER field of the RM cell, and sets the smaller value in the ER field of the RM cell. If the ER value set in the ER field is smaller, then the ER field can be prevented from being rewritten. This holds true with the embodiments described later.

The multiplexing/demultiplexing unit 18 receives a cell stored in the common buffer memory 15 through the second RM cell process unit 17a, refers to the CCR information 24 input from the address management unit 14, and outputs the cell to the output path 19 corresponding to the output path information contained in the CCR information 24.

An example of the operation flow of the switch communications path unit 1 shown in FIG. 4 is described below mainly about the ER operation according to the flowchart shown in FIG. 5.

In step S11, when the multiplexing line unit 11 receives a cell from the input path 10, it outputs the output path information set in the routing tag of the cell, and the write address information 22 having a QCP class number and the storage address of the common buffer memory 15 of the cell input from the control unit to the load observation unit 13 corresponding to the output path information. Furthermore, the multiplexing line unit 11 outputs the received cell to the first RM cell process unit 12. The first RM cell process unit 12 extracts an RM cell, and outputs the CCR information 24 indicating the CCR value set in the CCR field of the RM cell to the ER computation unit 16a. The load observation unit 13 computes the values of the BWI_QCP(i) and BWI_ALL for each predetermined observation period, and outputs the load information 26 including the values of the BWI_QCP (i) and BWI_ALL to the ER computation unit 16a. The ER computation unit 16a computes the value of the CCR_QCP (i) of the quality class buffer 14a (QCP(i)) storing the write address information 22 of the RM cell using the value of the CCR set in the CCR field of the RM cell indicated by the CCR information 24, and computes the value of the CCR_ALL of the address management unit 14 (link) accommodating the quality class buffer 14a (QCP(i)). Furthermore, the ER computation unit 16a computes the values of the OLF1_QCP(i) by the equation (3), the OLF2_QCP(i) by the equation (4), the OLF1_ALL by the equation (5), and the OLF2_ALL by the equation (6). Furthermore, the ER computation unit 16a computes the values of the MACR_

QCP(i)_NEW by the equation (7), and the MACR_ALL_ NEW by the equation (8).

In step S12, the ER computation unit 16a determines whether or not the number of stored cells indicated by the threshold information 28 of the quality class buffer QCP(i) input from the address management unit 14 is equal to or larger than the THA (congestion or non-congestion).

If it is determined in step S12 that the buffer is in the congestion state (the number of cells is equal to or larger than the THA), then the ER computation unit 16a computes the value of the ER1 using the function (11), and computes the value of the ER2 using the function (12) in step S13. The ER computation unit 16a outputs the computed ER value information 30 including the value of the ER2 to the second RM cell process unit 17a.

On the other hand, if it is determined in step S12 that the buffer is in the non-congestion state (the number of cells is smaller than the THA), then the ER computation unit 16a computes the value of the ER1 using the function (9), and computes the value of the ER2 using the function (10) in step S14. The ER computation unit 16a outputs the computed ER value information 30 including the value of the ER2 to the second RM cell process unit 17a.

After the computed ER value information 30 is output to the second RM cell process unit 17a in step S13 or S14, the second RM cell process unit 17a computes the value of the ER based on the function (13) in step S15, writes the value of the ER to the ER field of the RM cell in step S16, and outputs the RM cell to the multiplexing/demultiplexing unit 18.

When the LBERC system according to the above described first embodiment is executed, the ER obtained for the target quality class buffer QCP(i) or the ER obtained for the link accommodating the quality class i, whichever is larger, is used in the non-congestion state, thereby efficiently utilizing the network resources. In the non-congestion state, there is strong probability of OLF1_ALL<OLF1_QCP(i), and strong probability of MACR_ALL_NEW>MACR_ QCP(i)_NEW. As a result, there is strong probability that MACR_ALL_NEW/OLF1_ALL is selected as the ER1, and the target quality class i can use the band assigned to other quality classes than the link accommodating the quality class i.

The ER obtained for the target quality class buffer QCP(i) or the ER obtained for the link accommodating the quality class i, whichever is larger, is used in the congestion state, thereby guaranteeing the communications quality of the target quality class i. In the congestion state, there is strong probability of OLF1_ALL>OLF2_QCP(i), and strong probability of MACR_NEW<MACR_QCP(i)_NEW. As a result, there is strong probability that MACR_QCP(i)_ NEW/OLF2_QCP(i) is selected as the ER1, and the target quality class i is assigned a preliminarily assigned minimum band.

When a service of a certain quality class is rarely used, services of other quality classes can use the unused band of the service of the quality class, thereby utilizing the network resources and guaranteeing the communications quality of the service of each quality class.

Described below in detail is the second embodiment of the present invention to which the LBERC system is applied.

[1] Non-congestion is determined when the number of stored cells in the quality class buffer QCP(i) for storing the cells of the ABR connection of the quality class i is smaller than the threshold THA. Congestion is determined when the number of stored cells is equal to or larger than THA.

[2] The input cell rate to the quality class buffer QCP(i) observed at each predetermined observation period is computed as the first observation input rate (BWI_QCP(i)). In the non-congestion state, the load factor (OLF1_QCP(i)) in the non-congestion state, which is the ratio of the BWI_ QCP(i) to the predetermined target output band (BWO1_ QCP(i)) of the quality class buffer QCP(i) in the non-congestion state, is computed by the following equation (14). In the congestion state, the load factor (OLF2_QCP(i)) in the congestion state, which is the ratio of the BWI_QCP (i) to the predetermined target output band (BWO2_QCP (i)) of the quality class buffer QCP(i) in the congestion state, is computed by the following equation (15).

$$OLF1\_QCP(i)=BWI\_QCP(i)/BWO1\_QCP(i) \qquad (14)$$

$$OLF2\_QCP(i)=BWI\_QCP(i)/BWO2\_QCP(i) \qquad (15)$$

[3] The input cell rate to the link containing the quality class buffer QCP(i) observed at each predetermined observation period is computed as the second observation input rate (BWI_ALL). In the non-congestion state, the load factor (OLF1_ALL) in the non-congestion state, which is the ratio of the BWI_ALL to the predetermined target output band (BWO1_ALL) of the link in the non-congestion state, is computed by the following equation (16). In the congestion state, the load factor (OLF2_ALL) in the congestion state, which is the ratio of the BWI_ALL to the predetermined target output band (BWO2_ALL) of the link in the congestion state, is computed by the following equation (17).

$$OLF1\_ALL=BWI\_ALL/BWO1\_ALL\_ \qquad (16)$$

$$OLF2\_ALL=BWI\_ALL/BWO2\_ALL \qquad (17)$$

[4] When a forward RM cell arrives, a new average value (MACR_QCP(i)_NEW) of the CCR of the quality class buffer QCP(i) is computed using the following equation (18) when the quality class buffer QCP(i) is in the congestion state, and the CCR value (CCR_QCP(i)) set in the CCR field of the forward RM cell is smaller than the current average value MACR_QCP(i)_OLD of the CCR of the quality class buffer QCP(i), or when the quality class buffer QCP(i) is in the non-congestion state, and the CCR value set in the CCR field of the forward RM cell is larger than the MACR_QCP(i)_OLD. Then, a new average value (MACR_ALL_NEW) of the CCR of the link accommodating the quality class buffer QCP(i) is computed by the following equation (19) using the current average value (MACR_ALL_OLD) of the CCR of the link and the CCR value (CCR_ALL) set in the forward RM cell.

$$MACR\_QCP(i)\_NEW=\alpha(i) \times CCR\_QCP(i)+(1\alpha(i)) \times MACR\_ \\ QCP(i)\_OLD \qquad (18)$$

$$MACR\_ALL\_NEW=\alpha \times CCR\_ALL+(1-\alpha) \times MACR\_ALL\_ \\ OLD \qquad (19)$$

[5.1] When the quality class buffer QCP(i) is in the non-congestion state, the ER1 is computed by operating the following function (20). Then, the ER2 is computed by operating the following function (21). Furthermore, the ER3 is computed using the following function (22). SSP1 and SSP2 are optional constants. This holds true with the subsequent embodiments.

$$ER1=\max(MACR\_QCP(i)\_NEW/OLF1\_QCP(i), MACR\_ \\ ALL\_NEW/OLF1\_ALL) \qquad (20)$$

$$ER2=\min(ER1,MACR\_QCP(i)\_NEW \times SSP1,CCR\_QCP(i) \times \\ SSP2) \qquad (21)$$

$$ER3=\max(ER2, MCR(i)) \qquad (22)$$

[5.2] When the quality class buffer QCP(i) is in the congestion state, the ER1 is computed by operating the following function (23). Then, the ER2 is computed by operating the following function (24), and the ER3 is computed by operating the following function (25). SSP3 and SSP4 are optional constants. This holds true with the subsequent embodiments.

$$ER1=\max(MACR\_QCP(i)\_NEW/OLF2\_QCP(i), MACR\_ALL\_NEW/OLF2\_ALL) \quad (23)$$

$$ER2=\min(ER1, MACR\_QCP(i)\_NEW \times SSP3, CCR\_QCP(i) \times SSP4) \quad (24)$$

$$ER3=\max(ER2, MCR(i)) \quad (25)$$

[6] Based on the following function (26), the value of the ER2 obtained in the above described [5.1] or [5.2] is compared with the ER set in the ER field of the forward and backward RM cell in the above described quality class i. The ER2 or the ER whichever is smaller is selected. The selected value is set in the ER field of the RM cell.

$$ER=\min (ER3, ER\text{ value in RM cell}) \quad (26)$$

Figure 6:
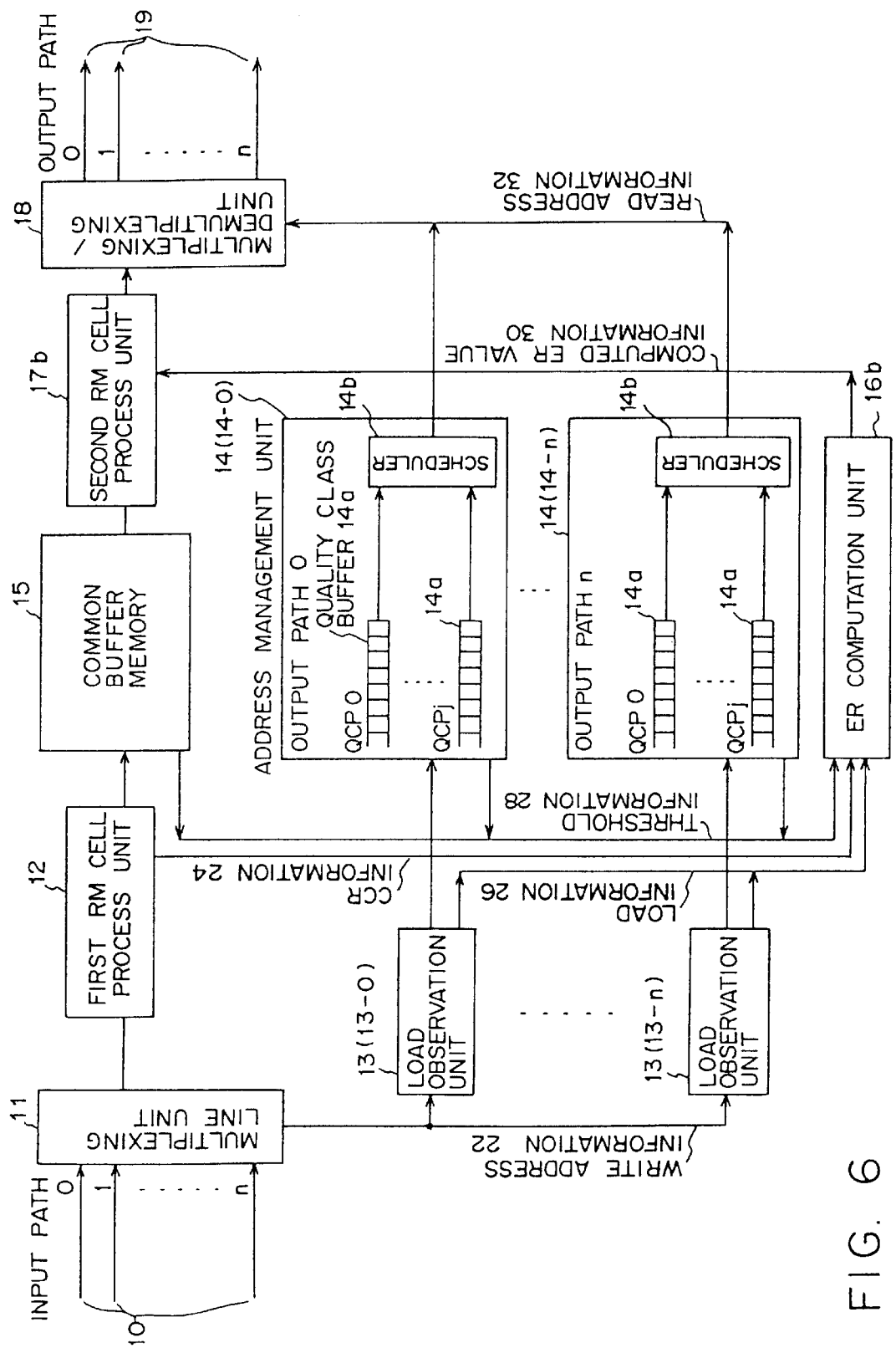
FIG. 6 shows another example of the switch communications path embodying the LBERC system.
Figure 7:
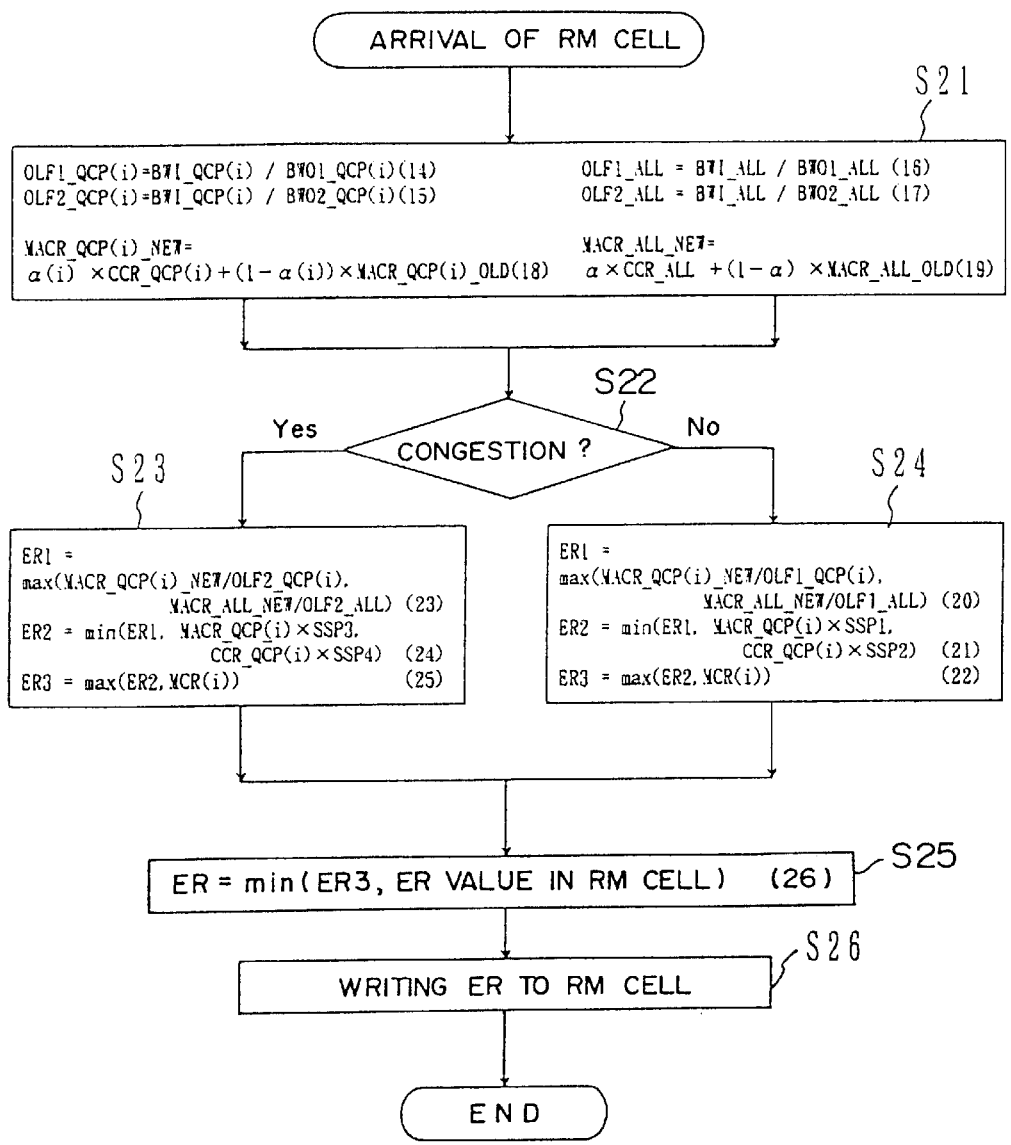
FIG. 7 is a flowchart showing the operations of the switch communications path shown in FIG. 4.

The hardware configuration and the operation flowchart embodying the LBERC system according to the second embodiment of the present invention is described below by referring to FIGS. 6 and 7. FIG. 6 shows an example of the hardware provided in the switch communications path unit 1 in the above described LBERC system. FIG. 7 is a flowchart showing the operations of the hardware in the switch communications path unit 1 shown in FIG. 6.

In FIG. 6, the same components as the component shown in FIG. 4 are assigned the same identification numbers. The detailed explanation is omitted here.

The ER computation unit 16b computes the OLF1_QCP (i) by the equation (14) based on the BWI_QCP(i) contained in the load information 26 input from the load observation unit 13 and the predetermined BWO1_QCP(i), and also computes the value of the OLF2_QCP(i) by the equation (15) based on the BWI_QCP(i) and the predetermined BWO2_QCP(i). Furthermore, the ER computation unit 16b computes the OLF1_ALL by the equation (16) based on the BWI_ALL contained in the load information 26 input from the load observation unit 13 and the predetermined BWO1_ALL, and also computes the value of the OLF2_ALL by the equation (17) based on the BWI_ALL and the predetermined BWO2_ALL. The ER computation unit 16b obtains the CCR_QCP(i) from the CCR value set in the CCR field in the RM cell indicated by the CCR information 24, and obtains the CCR_ALL of the address management unit 14 (link) accommodating the quality class buffer 14a (QCP(i)) from the CCR value set in the CCR field of the RM cell. The ER computation unit 16b computes the value of the MACR_QCP(i)_NEW by the equation (18) based on the CCR_QCP(i) and the MACR_QCP(i)_OLD previously computed (in the previous observation), and computes the value of the MACR_ALL_NEW by the equation (19) based on the CCR_ALL and the MACR_ALL_OLD previously computed (in the previous observation). In the ER computation unit 16b, a threshold (THA) of each quality class buffer QCP(i) is preliminarily set. The ER computation unit 16b determines that the quality class buffer 14a (QCP(i)) is in the non-congestion state if the number of stored cells informed by the threshold information 28 of the quality class buffer 14a (QCP(i)) input through the address management unit 14 is smaller than the THAi, the value of the ER1 of the quality class buffer 14a (QCP(i)) is computed for each address management unit 14 using the function (20), and then the ER2 of the quality class buffer 14a (QCP(i)) is computed using the function (21). Furthermore, using the function (22), the value of the ER3 of the quality class buffer 14a (QCP(i)) is computed. On the other hand, if the number of stored cells is equal to or larger than the THA, then it is determined that the quality class buffer 14a (QCP(i)) is in the congestion state, the value of the ER1 of the quality class buffer 14a (QCP(i)) is computed for each address management unit 14 through the function (23), and then the ET2 of the quality class buffer 14a (QCP(i)) is computed through the function (24). Furthermore, using the function (25), the value of the ER3 of the quality class buffer 14a (QCP(i)) is computed. The ER computation unit 16b outputs computed ER value information 30b indicating the obtained ER3 value to the second RM cell process unit 17b.

The second RM cell process unit 17b outputs to the multiplexing/demultiplexing unit 18 the user data cells other than the RM cells input from the common buffer memory 15. On the other hand, when an RM cell is input, the second RM cell process unit 17b compares the value of the ER3 indicated by the computed ER value information 30b corresponding to the RM cell input from the ER computation unit 16b with the value of the ER set in the ER field of the RM cell, and sets the smaller value in the ER field of the RM cell.

An example of the operation flow of the switch communications path unit 1 shown in FIG. 6 is described below mainly about the ER operation according to the flowchart shown in FIG. 7. The explanation about the same operation flow as that shown in FIG. 5 is omitted here.

In step S21, as in step S11 above, the ER computation unit 16b computes the values of the OLF1_QCP(i), OLF2_QCP (i), OLF1_ALL, and OLF2_ALL, by the equations (14) through (17), and computes the MACR_QCP(i)_NEW, MACR_ALL_NEW by the equations (18) and (19).

In step S22, the ER computation unit 16b determines whether or not the number of stored cells indicated by the threshold information 28 input from the address management unit 14 is equal to or larger than the THA (congestion or non-congestion).

If it is determined in step S22 that the buffer is in the congestion state (the number of cells is equal to or larger than the THA), then the ER computation unit 16b computes the value of the ER1 using the function (23), and computes the value of the ER2 using the function (24), and furthermore, the value of the ER3 is computed using the function (25) in step S23. The ER computation unit 16b outputs the computed ER value information 30 including the value of the ER3 to the second RM cell process unit 17b.

On the other hand, if it is determined in step S22 that the buffer is in the non-congestion state (the number of cells is smaller than the THA), then the ER computation unit 16b computes the value of the ER1 using the function (20), and computes the value of the ER2 using the function (21), and furthermore, the value of the ER3 is computed using the function (22) in step S24. The ER computation unit 16b outputs the computed ER value information 30 including the value of the ER3 to the second RM cell process unit 17b.

After the computed ER value information 30 is output to the second RM cell process unit 17b in step S23 or S24, the second RM cell process unit 17b computes the value of the ER based on the function (26) in step S25, writes the value of the ER to the ER field of the RM cell in step S26, and outputs the RM cell to the multiplexing/demultiplexing unit 18.

Figure 8:
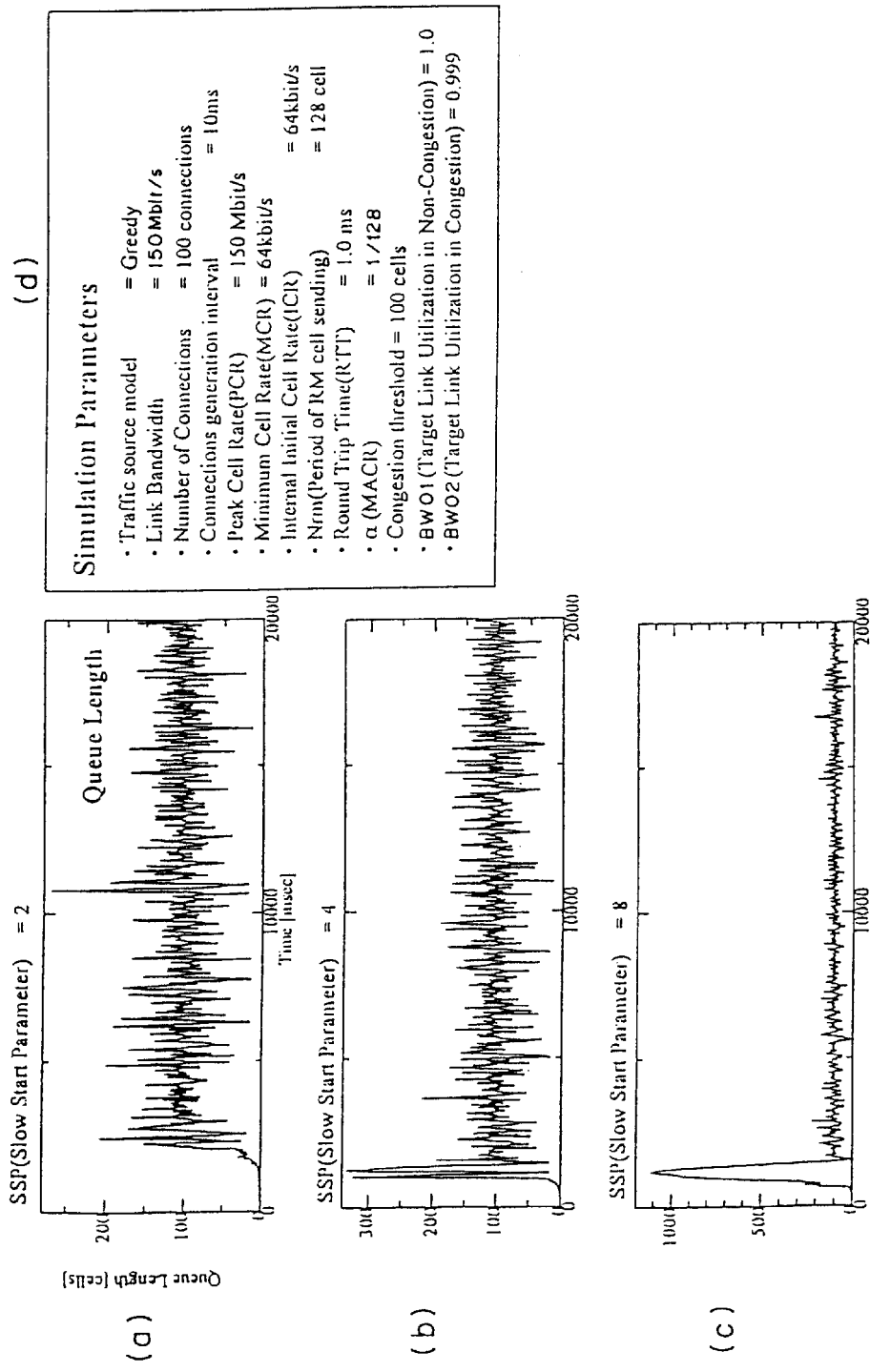
FIG. 8 shows a result of a simulation.

FIG. 8 shows an example of a simulation result of the present embodiment. In the simulation shown in FIG. 8, the same value is assigned to the SSP1, SSP2, SSP3, and SSP4. In FIG. 8, they are represented as an SSP (slow start parameter). The graphs of FIGs. (a), (b), and (c) in FIG. 8 show the simulation results obtained when the values of the SSP are respectively 2, 4, and 8. In each graph, the vertical axis indicates the number of cells contained in the quality class buffer 14a (QCP(i)), and the horizontal axis indicates the time (msec). The smaller the SSP is, the more moderately the number of stored cells changes in the initial state. That is, since the rate of the increase is small, the number of cells stored in the initial state does not fluctuate, thereby reducing the fluctuation of the number of stored cell in the initial state. The graph (d) in FIG. 8 shows the values of various parameters used to obtain the simulation results shown in the graphs (a), (b), and (c) in FIG. 8.

When the LBERC system according to the above described second embodiment is realized, the ER is computed using the function (21) in the non-congestion state, thereby preventing a sudden increase of the ER value. Additionally, since the ER2 is computed using the function (24), a sudden decrease of the ER can also be avoided.

When a service of a certain quality class is rarely used, services of other quality classes can use the unused band of the service of the quality class, thereby utilizing the network resources and guaranteeing the communications quality of the service of each quality class.

Described below in detail is the third embodiment of the present invention to which the LBERC system is applied.

[1] Non-congestion is determined when the number of stored cells in the quality class buffer QCP(i) for storing the cells of the ABR connection of the quality class i is smaller than the threshold THA. Congestion is determined when the number of stored cells is equal to or larger than THA, and smaller than THB. Heavy congestion is determined when the number of stored cells is equal to or larger than THB.

[2] The input cell rate to the quality class buffer QCP(i) observed at each predetermined =observation period is computed as the first observation input rate (BWI_QCP(i)). In the non-congestion state, the load factor (OLF1_QCP(i)) in the non-congestion state, which is the ratio of the BWI_QCP(i) to the predetermined target output band (BWO1_QCP(i)) of the quality class buffer QCP(i) in the non-congestion state, is computed by the following equation (27). In the congestion state (including the heavy congestion state), the load factor (OLF2_QCP(i)) in the congestion state, which is the ratio of the BWI_QCP(i) to the predetermined target output band (BWO2_QCP(i)) of the quality class buffer QCP(i) in the congestion state (including the heavy congestion state), is computed by the following equation (28).

$$OLF1\_QCP(i) = BWI\_QCP(i)/BWO1\_QCP(i) \quad (27)$$

$$OLF2\_QCP(i) = BWI\_QCP(i)/BWO2\_QCP(i) \quad (28)$$

[3] The input cell rate to the link containing the quality class buffer QCP(i) observed at each predetermined observation period is computed as the second observation input rate (BWI_ALL). In the non-congestion state, the load factor (OLF1_ALL) in the non-congestion state, which is the ratio of the BWI_ALL to the predetermined target output band (BWO1_ALL) of the link in the non-congestion state, is computed by the following equation (29). In the congestion state (including heavy congestion state), the load factor (OLF2_ALL) in the congestion state, which is the ratio of the BWI_ALL to the predetermined target output band (BWO2_ALL) of the link in the congestion state, is computed by the following equation (30).

$$OLF1\_ALL = BWI\_ALL/BWO1\_ALL \quad (29)$$

$$OLF2\_ALL = BWI\_ALL/BWO2\_ALL \quad (30)$$

[4] When a forward RM cell arrives, a new average value (MACR_QCP(i)_NEW) of the CCR is computed using the following equation (31) when the quality class buffer QCP(i) is in the congestion state (including heavy congestion state), and the CCR value (CCR_QCP(i)) set in the CCR field of the forward RM cell is smaller than the current average value MACR_QCP(i)_OLD of the CCR of the quality class buffer QCP(i), or when the quality class buffer QCP(i) is in the non-congestion state, and the CCR value set in the CCR field of the forward RM cell is larger than the MACR_QCP(i)_OLD. Then, a new average value (MACR_ALL_NEW) of the CCR of the link accommodating the quality class buffer QCP(i) is computed by the following equation (32) using the current average value (MACR_ALL_OLD) of the CCR of the link and the CCR value (CCR_ALL) set in the forward RM cell.

$$MACR\_QCP(i)\_NEW = \alpha(i) \times CCR\_QCP(i) + (1-\alpha(i)) \times MACR\_QCP(i)\_OLD \quad (31)$$

$$MACR\_ALL\_NEW = \alpha \times CCR\_ALL + (1-\alpha) \times MACR\_ALL\_OLD \quad (32)$$

[5.1] When the quality class buffer QCP(i) is in the non-congestion state, the ER1 is computed by operating the following function (33). Then, the ER2 is computed by operating the following function (34). Furthermore, the ER3 is computed using the following function (35).

$$ER1 = \max(MACR\_QCP(i)\_NEW/OLF1\_QCP(i), MACR\_ALL\_NEW/OLF1\_ALL) \quad (33)$$

$$ER2 = \min(ER1, MACR\_QCP(i)\_NEW \times SSP3, CCR\_QCP(i) \times SSP2) \quad (34)$$

$$ER3 = \max(ER2, MCR(i)) \quad (35)$$

[5.2] When the quality class buffer QCP(i) is in the congestion state, the ER1 is computed by operating the following function (36). Then, the ER2 is computed by operating the following function (37), and the ER3 is computed by operating the following function (38).

$$ER1 = \max(MACR\_QCP(i)\_NEW/OLF2\_QCP(i), MACR\_ALL\_NEW/OLF2\_ALL) \quad (36)$$

$$ER2 = \min(ER1, MACR\_QCP(i)\_NEW \times SSP3, CCR\_QCP(i) \times SSP4) \quad (37)$$

$$ER3 = \max(ER2, MCR(i)) \quad (38)$$

[5.3] When the quality class buffer QCP(i) is in the heavy congestion state, the ER3 is computed by the following equation (39).

$$ER3 = MCR(i) \quad (39)$$

[6] Based on the following function (40), the value of the ER3 obtained in the above described [5.1], [5.2], or [5.3] is compared with the ER set in the ER field of the forward and backward RM cell in the above described quality class i. The ER3 or the ER whichever is smaller is selected. The selected value is set in the ER field of the RM cell.

$$ER = \min(ER3, ER \text{ value in RM cell}) \quad (40)$$

Figure 9:
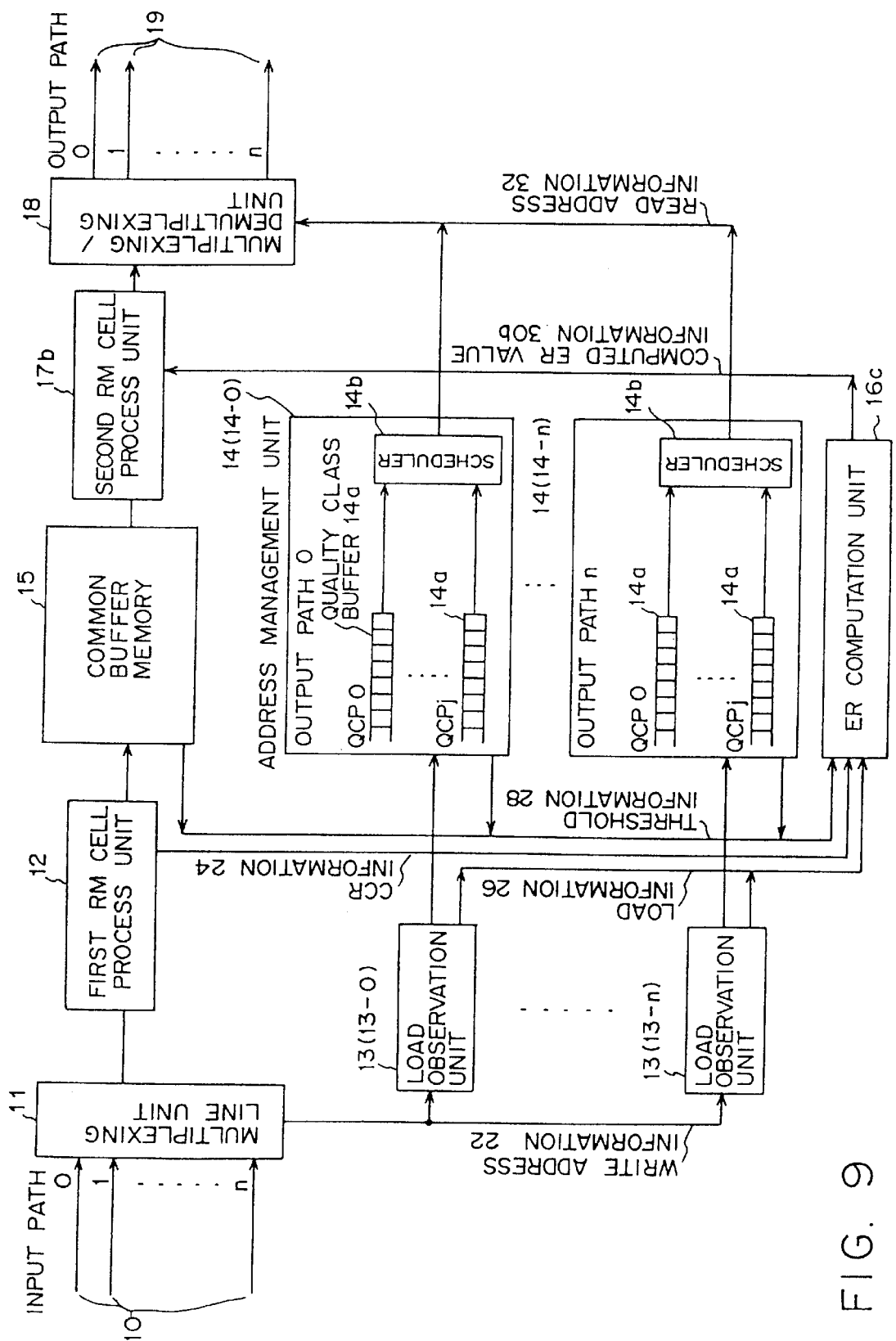
FIG. 9 shows a further example of the switch communications path embodying the LBERC system.
Figure 10:
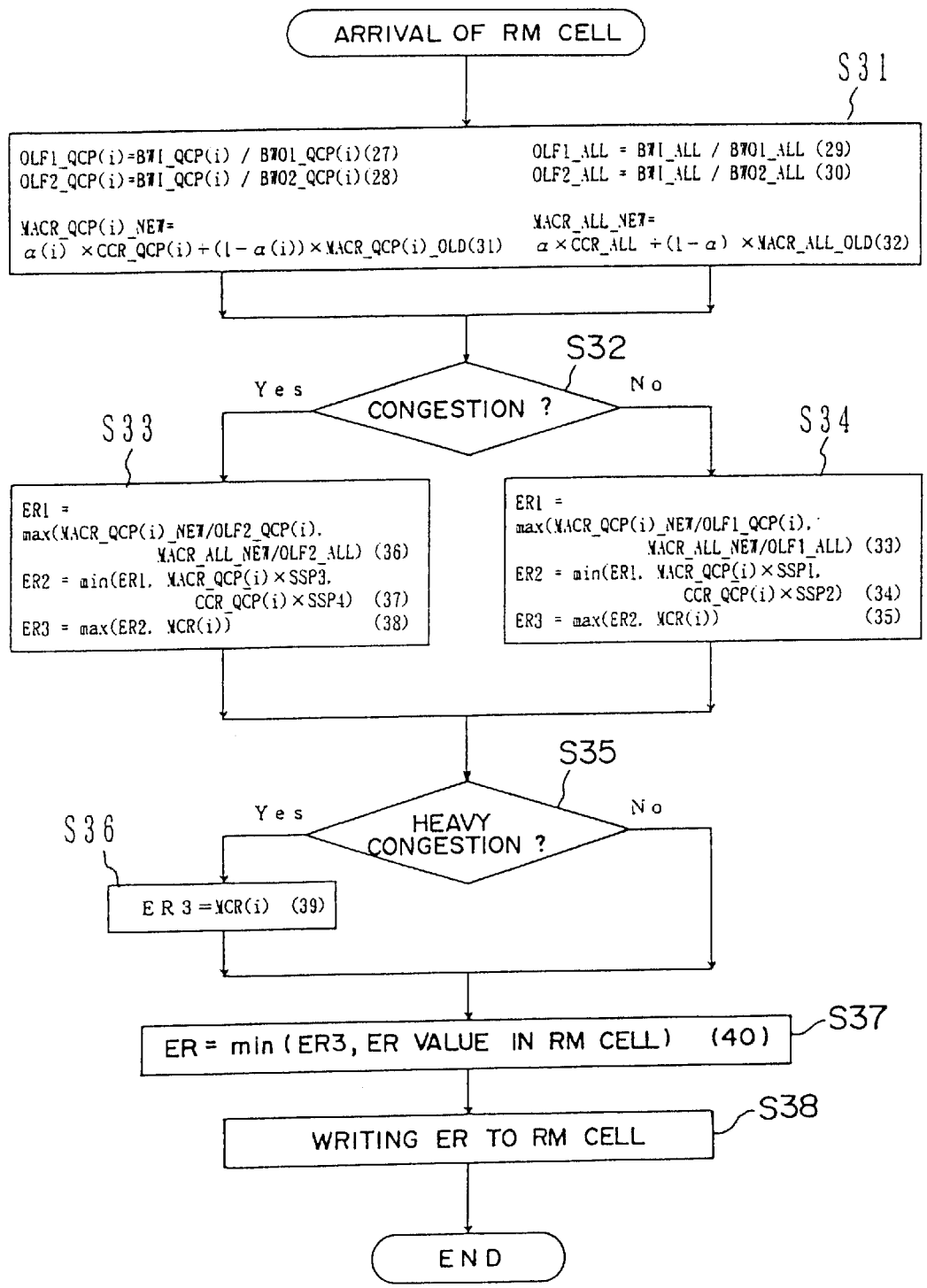
FIG. 10 is a flowchart showing the operations of the switch communications path shown in FIG. 9.

The hardware configuration and the operation flowchart embodying the LBERC system according to the third embodiment of the present invention is described below by referring to FIGS. 9 and 10. FIG. 9 shows an example of the hardware provided in the switch communications path unit 1 in the above described LBERC system. FIG. 10 is a flowchart showing the operations of the hardware in the switch communications path unit 1 shown in FIG. 9. In FIG. 9, the same components as the component shown by each embodiment are assigned the same identification numbers. The detailed explanation is omitted here.

The ER computation unit 16c computes the OLF1_QCP(i) by the equation (27) based on the BWI_QCP(i) contained in the load information 26 input from the load observation unit 13 and the predetermined BWO1_QCP(i), and also computes the value of the OLF2_QCP(i) by the equation (28) based on the BWI_QCP(i) and the predetermined BWO2_QCP(i). Furthermore, the ER computation unit 16c computes the OLF1_ALL by the equation (29) based on the BWI_ALL contained in the load information 26 input from the load observation unit 13 and the predetermined BWOL_ALL, and also computes the value of the OLF2_ALL by the equation (30) based on the BWI_ALL and the predetermined BWO2_ALL. The ER computation unit 16c obtains the CCR_QCP(i) from the CCR value set in the CCR field in the RM cell indicated by the CCR information 24, and obtains the CCR_ALL of the address management unit 14 (link) accommodating the quality class buffer 14a (QCP(i)) from the CCR value set in the CCR field of the RM cell. The ER computation unit 16c computes the value of the MACR_QCP(i)_NEW by the equation (31) based on the CCR_QCP(i) and the MACR_QCP(i)_OLD previously computed (in the previous observation), and computes the value of the MACR_ALL_NEW by the equation (32) based on the CCR_ALL and the MACR_ALL_OLD previously computed (in the previous observation). In the ER computation unit 16c, two thresholds (THA and THB: THA<THB) of each quality class buffer QCP(i) are preliminarily set. The ER computation unit 16c determines that the quality class buffer 14a (QCP(i)) is in the non-congestion state if the number of stored cells informed by the threshold information 28 of the quality class buffer 14a (QCP(i)) input through the address management unit 14 is smaller than the THA, the value of the ER1 of the quality class buffer 14a (QCP(i)) is computed for each address management unit 14 using the function (33), and then the ER2 of the quality class buffer 14a (QCP(i)) is computed using the function (34). Furthermore, using the function (35), the value of the ER3 of the quality class buffer 14a (QCP(i)) is computed. On the other hand, if the number of stored cells is equal to or larger than the THA, then it is determined that the quality class buffer 14a (QCP(i)) is in the congestion state, the value of the ER1 of the quality class buffer 14a (QCP(i)) is computed for each address management unit 14 through the function (36), and then the ET2 of the quality class buffer 14a (QCP(i)) is computed through the function (37). Furthermore, using the function (38), the value of the ER3 of the quality class buffer 14a (QCP(i)) is computed. The ER computation unit 16c determines that the quality class buffer 14a (QCP(i)) is in the heavy congestion state if the number of stored cells indicated by the threshold information 28 of each quality class buffer 14a (QCP(i)) input from each address management unit 14 is equal to or larger than the THB. Then, by the above described equation (39), the value of the ER3 of the quality class buffer 14a (QCP(i)) is computed for each address management unit 14. The ER computation unit 16c outputs computed ER value information 30b indicating the value of the ER3 obtained by the equation (38) or (39) to the second RM cell process unit 17b.

An example of the operation flow of the switch communications path unit 1 shown in FIG. 9 is described below mainly about the ER operation according to the flowchart shown in FIG. 10. The explanation about the same operation flow as that shown in FIG. 5 is omitted here.

In step S31, as in step S11 above, the ER computation unit 16b computes the values of the OLF_QCP(i), OLF2_QCP(i), OLF1_ALL, and OLF2_ALL, by the equations (27) through (30), and computes the MACR_QCP(i)_NEW, MACR_ALL_NEW by the equations (31) and (32).

In step S32, the ER computation unit 16c determines whether or not the number of stored cells indicated by the threshold information 28 input from the address management unit 14 is equal to or larger than the THA (congestion or non-congestion).

If it is determined in step S32 that the buffer is in the congestion state (the number of cells is equal to or larger than the THA), then the ER computation unit 16c computes the value of the ER1 using the function (36), and computes the value of the ER2 using the function (37), and furthermore, the value of the ER3 is computed using the function (38) in step S33.

On the other hand, if it is determined in step S32 that the buffer is in the non-congestion state (the number of cells is smaller than the THA), then the ER computation unit 16c computes the value of the ER1 using the function (33), and computes the value of the ER2 using the function (34), and furthermore, the value of the ER3 is computed using the function (35) in step S34.

After computing the value of the ER3 in step S33 or S34, the ER computation unit 16c determines in step S35 whether or not the number of cells indicated by the threshold information 28 input from the address management unit 14 is equal to or larger than the THB (whether or not heavy congestion has occurred).

If it is determined in step S35 that the buffer is in the heavy congestion (the number of stored cells equal to or larger than THB), the ER computation unit 16c computes the value of the ER3 by the equation (39) in step S36, outputs the computed ER value information 30b containing the value of the ER3 to the second RM cell process unit 17b, and the second RM cell process unit 17b computes the value of the ER by the above described function (40) in step S37.

On the other hand, if it is determined in step S35 that the buffer is not in the heavy congestion, the ER computation unit 16c outputs the computed ER value information 30 containing the value of the ER3 obtained in steps 33 or 34 to the second RM cell process unit 17b, and the second RM cell process unit 17b computes the value of the ER by the above described function (40) in step S37.

In step S38, the second RM cell process 17b writes the computed value of the ER to the RM cell, and outputs the RM cell to the multiplexing/demultiplexing unit 18.

When the LBERC system according to the above described third embodiment is realized in an excess congestion (heavy congestion) state, the network can be quickly restored from the excess congestion state by setting the ER3 to the MCR.

When a service of a certain quality class is rarely used, services of other quality classes can use the unused band of the service of the quality class, thereby utilizing the network resources and guaranteeing the communications quality of the service of each quality class.

Described below in detail is the fourth embodiment of the present invention to which the LBERC system is applied.

[1] Non-congestion is determined when the number of stored cells in the quality class buffer QCP(i) for storing the cells of the ABR connection of the quality class i is smaller than the threshold THAi. Congestion is determined when the number of stored cells is equal to or larger than THAi.

[2] Using the current target output band (BWO_QCP(i)_OLD) of the quality class buffer QCP(i), a new target output band (BWO_QCI(i)_NEW) of the quality class buffer QCP(i) is computed by the following equation (41) in the non-congestion state. A newer BWO_QCI(i)_NEW is computed by the following equation (42) in the congestion state. An RDP is short for rate decrease parameter, and an RIP is short for rate increase parameter. They are predetermined positive values.

$$BWO\_QCI(i)\_NEW = BWO\_QCI(i)\_OLD + RIP \quad (41)$$

$$BWO\_QCI(i)\_NEW = BWO\_QCI(i)\_OLD - RDP \quad (42)$$

[3] The input cell rate to the quality class buffer QCP(i) observed at each predetermined observation period is computed as the observation input rate (BWI_QCP(i)). The load factor (OLF1_QCP(i)), which is the ratio of the BWI_QCP(i) to the target output band (BWO_QCI(i)_NEW) of the quality class buffer QCP(i) obtained in [2] above, can be computed by the following equation (43).

$$OLF\_QCP(i) = BWI\_QCP(i)/BWO\_QCP(i)\_NEW \quad (43)$$

[4] When a forward RM cell arrives, a new average value (MACR_QCP(i)_NEW) of the CCR of the quality class buffer QCP(i) is computed using the following equation (44) when the quality class buffer QCP(i) is in the congestion state, and the CCR value (CCR_QCP(i)) set in the CCR field of the forward RM cell is smaller than the current average value MACR_QCP(i)_OLD of the CCR of the quality class buffer QCP(i), or when the quality class buffer QCP(i) is in the non-congestion state, and the CCR value set in the CCR field of the forward RM cell is larger than the MACR_QCP(i)_OLD.

$$MACR\_QCP(i)\_NEW = \alpha(i) \times CCR\_QCP(i) + (1-\alpha(i)) \times MACR\_QCP(i)\_OLD \quad (44)$$

[5] The value of the ER1 is computed by the following equation (45), and the following function (46) is used to compute the value of the ER2.

$$ER1 = MACR\_QCP(i)\_NEW/OLF1\_QCP(i) \quad (45)$$

$$ER2 = \max(ER1, MCR(i)) \quad (46)$$

[6] Based on the following function (47), the value of the ER2 obtained in the above described [5] is compared with the ER set in the ER field of the forward and backward RM cell in the above described quality class i. The ER2 or the ER whichever is smaller is selected. The selected value is set in the ER field of the RM cell.

$$ER = \min(ER2, ER\ value\ in\ RM\ cell) \quad (47)$$

Figure 11:
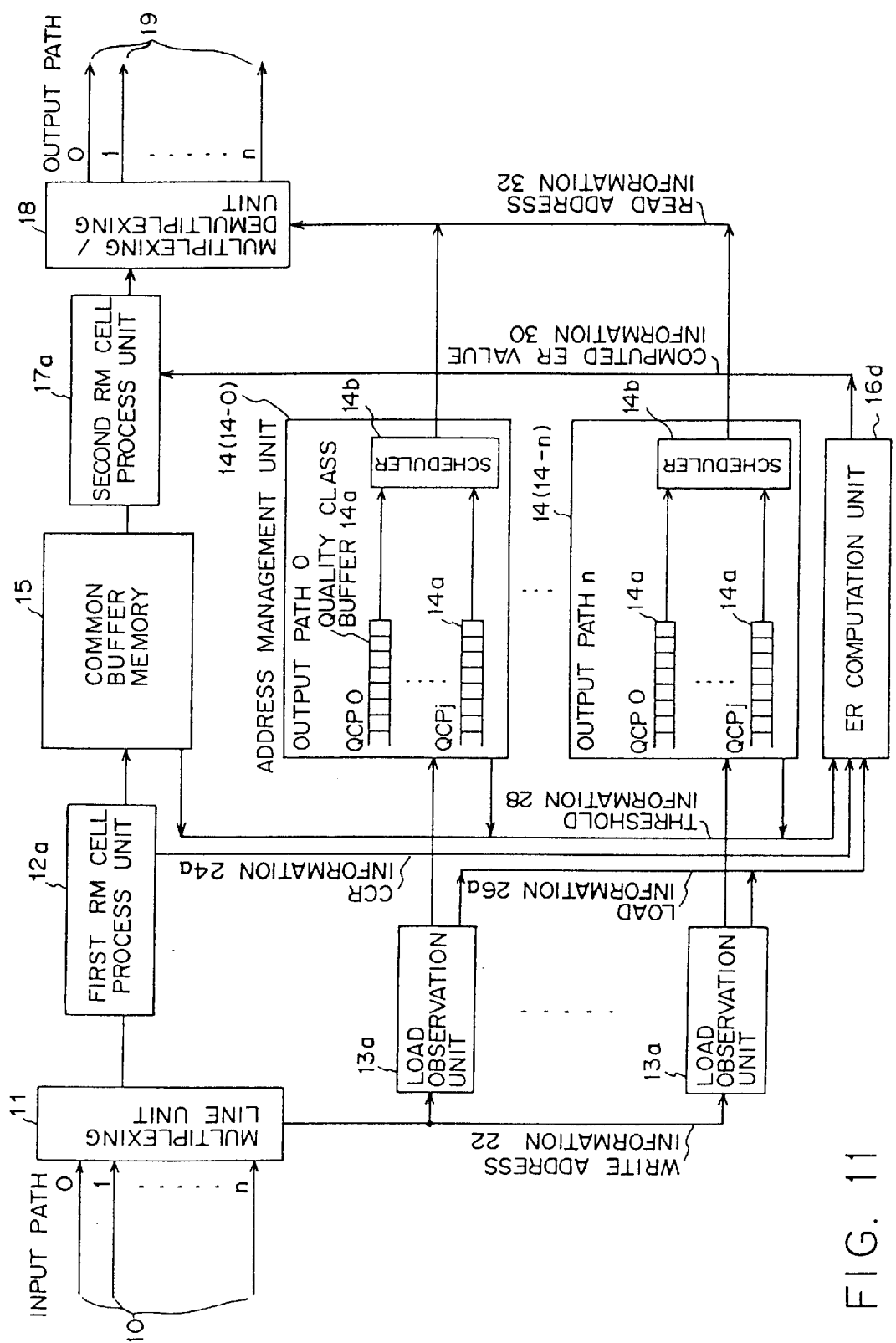
FIG. 11 shows a further example of the switch communications path embodying the LBERC system.
Figure 12:
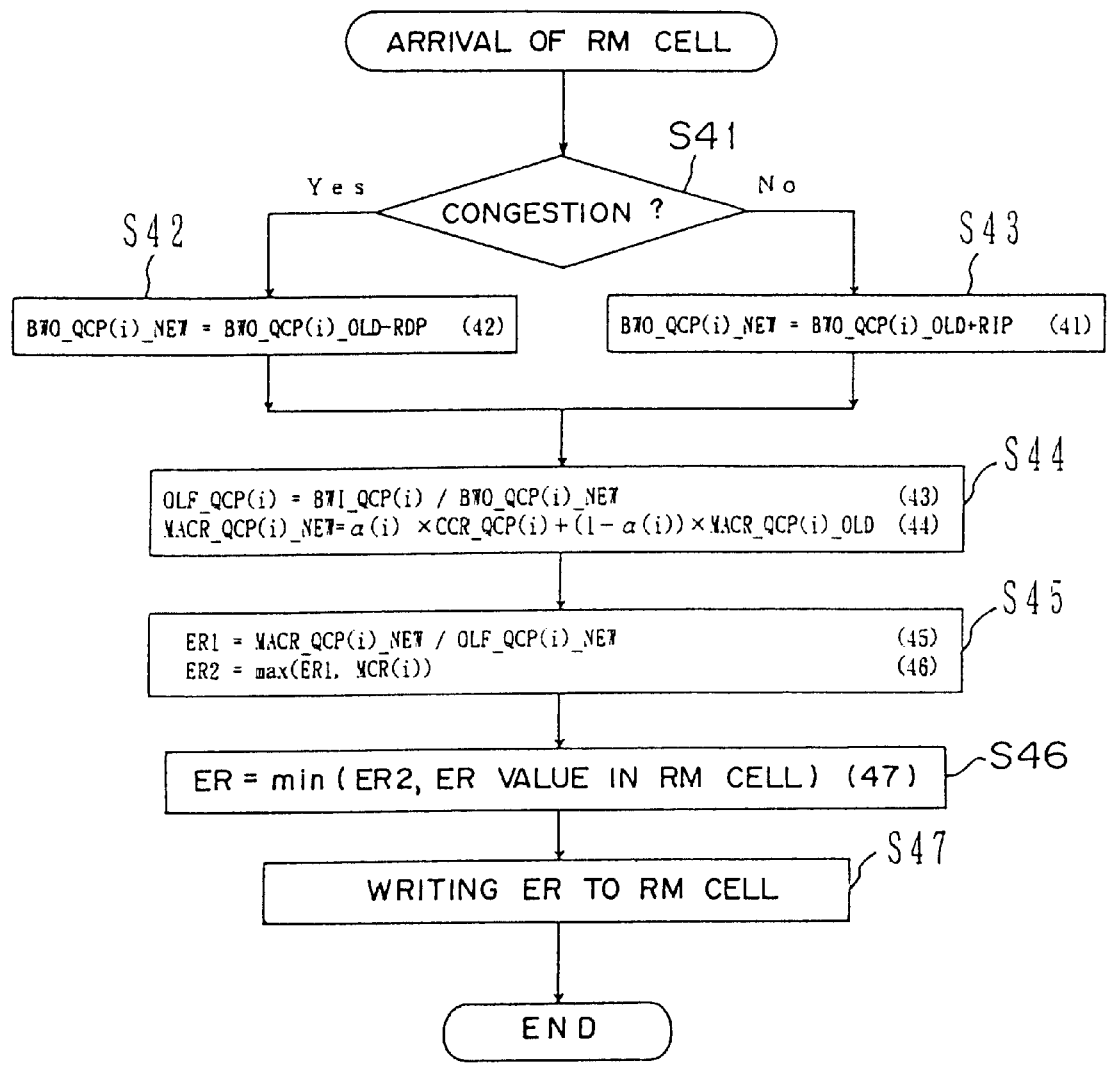
FIG. 12 is a flowchart showing the operations of the switch communications path shown in FIG. 11.

The hardware configuration and the operation flowchart embodying the LBERC system according to the fourth embodiment of the present invention is described below by referring to FIGS. 11 and 12. FIG. 11 shows an example of the hardware provided in the switch communications path unit 1 in the above described LBERC system according to the fourth embodiment of the present invention. FIG. 12 is a flowchart showing the operations of the hardware in the switch communications path unit 1 shown in FIG. 11. In FIG. 11, the same components as the component shown by each embodiment are assigned the same identification numbers. The detailed explanation is omitted here.

The first RM cell process unit 12a extracts an RM cell from the cells input from the multiplexing line unit 11, and outputs as the CCR information 24a the value of the CCR set in the CCR field in the RM cell to the ER computation unit 16d.

The load observation unit 13a refers to the output path information contained in the write address information 22 input from the multiplexing line unit 11, and outputs the write address information to the address management unit 14 corresponding to the write address information. The load observation unit 13a observes (computes) the BWI_QCP(i) based on the input of the write address information, and outputs the BWI_QCP(i) as load information 26a to the ER computation unit 16d.

A threshold (THA) of each quality class buffer QCP(i) is preliminarily set in the ER computation unit 16d. Using the current BWO_QCP(i)_OLD, the ER computation unit 16d computes the value of a new BWO_QCP(i) NEW by the above described equation (41) in the non-congestion state, and by the above described equation (42) in the congestion state. The ER computation unit 16d computes the value of OLF_QCP(i) by the equation (43) above using the BWI_QCP(i) indicated by the load information 26a input from the load observation unit 13a and the BWO_QCP(i)_NEW. Furthermore, the ER computation unit 16d retrieves CCR_QCP(i) from the value of the CCR set in the CCR field of the RM cell indicated by the CCR information 24a, and computes the value of MACR_QCP(i)-NEW by the equation (44) above using the CCR_QCP(i) and the previously computed (at the previous observation) MACR_QCP(i)_OLD. The ER computation unit 16d computes the value of the ER1 of each of the quality class buffers 14a (QCP(i)) by the equation (45) above for each of the address management units 14, and then computes the value of the ER2 of the quality class buffer 14a (QCP(i)) by the equation (46) above. Furthermore, the ER computation unit 16d outputs the computed ER value information 30 indicating the value of the ER2 to the second RM cell process unit 17a.

The operations of the switch communications path unit 1 shown in FIG. 11, especially about the processes on the operations of the ER, are explained by referring to the flowchart shown in FIG. 12. The descriptions about the processes already explained by referring to the flowchart shown in FIG. 5 are omitted here.

In step S41, the ER computation unit 16d determines whether or not the number of stored cells indicated by the threshold information 28 input from the address management unit 14 is equal to or larger than THA (congestion or non-congestion).

If it is determined in step S41 that the quality class buffer QCP(i) is in the congestion state (the number of stored cells is equal to or larger than THA), then the ER computation unit 16d computes the value of BWO_QCP(i)_NEW by the equation (42) in step S42, computes the value of OLF_QCP(i)_NEW by the equation (43) in step S44, and computes the MACR_QCP(i)_NEW by the equation (44).

On the other hand, if it is determined in step S41 that the quality class buffer QCP(i) is in the non-congestion state (the number of stored cells is smaller than THA), then the ER computation unit 16d computes the value of BWO_QCP(i) by the equation (41) above in step S42, computes the value of OLF_QCP(i)_NEW by the equation (43) above in step S44, and then computes the value of MACR_QCP(i)_NEW by the equation 44.

In step S45, the ER computation unit 16d computes the value of the ER1 by the equation (45), computes the value of the ER2 by the function (46), and then outputs the computed ER value information 30 containing the value of the ER2 to the second RM cell process unit 17a.

In step S46, the second RM cell process unit 17a computes the value of the ER by the function (47).

In step S47, the second RM cell process unit 17a writes the computed value of the ER, and outputs the RM cell to the multiplexing/demultiplexing unit 18.

When the LBERC system according to the above described fourth embodiment is adopted, the system is dynamically controlled such that the target output band is decreased in the congestion state of the quality class buffer QCP(i), and the target output band is increased in the non-congestion state of the quality class buffer QCP(i). Therefore, the value of the ER2 reflects the state of the network. As a result, the maximum band allowed to the service of each quality class i can be provided. Additionally, when the values of the RIP and RDP are individually determined for each quality class i, the quality can be discriminated for each quality class i.

When a service of a certain quality class is rarely used, services of other quality classes can use the unused band of the service of the quality class, thereby utilizing the network resources and guaranteeing the communications quality of the service of each quality class.

Described below in detail is the fifth embodiment of the present invention to which the LBERC system is applied.

[1] Non-congestion is determined when the number of stored cells in the quality class buffer QCP(i) for storing the cells of the ABR connection of the quality class i is smaller than the threshold THA. Congestion is determined when the number of stored cells is equal to or larger than THA.

[2] Using the current target output band (BWO QCP(i) OLD) of the quality class buffer QCP(i), a new target output band (BWO_QCI(i)_NEW) of the quality class buffer QCP(i) is computed by the following equation (48) in the non-congestion state. A newer BWO_QCI(i)_NEW is computed by the following equation (49) in the congestion state. An RDP is short for rate decrease parameter, and an RIP is short for rate increase parameter. They are predetermined positive values.

$$BWO\_QCI(i)\_NEW=BWO\_QCI(i)\_OLD+RIP \quad (48)$$

$$BWO\_QCI(i)\_NEW=BWO\_QCI(i)\_OLD-RDP \quad (49)$$

[3] The input cell rate to the quality class buffer QCP(i) observed at each predetermined observation period is computed as the observation input rate (BWI_QCP(i)). The load factor (OLF1_QCP(i)), which is the ratio of the BWI_QCP(i) to the target output band (BWO_QCI(i)_NEW) of the quality class buffer QCP(i) obtained in [2] above, can be computed by the following equation (50).

$$OLF\_QCP(i)=BWI\_QCP(i)/BWO\_QCP(i)\_NEW \quad (50)$$

[4] When a forward RM cell arrives, a new average value (MACR_QCP(i)_NEW) of the CCR of the quality class buffer QCP(i) is computed using the following equation (51) when the quality class buffer QCP(i) is in the congestion state, and the CCR value (CCR_QCP(i)) set in the CCR field of the forward RM cell is smaller than the current average value MACR_QCP(i) OLD of the CCR of the quality class buffer QCP(i), or when the quality class buffer QCP(i) is in the non-congestion state, and the CCR value set in the CCR field of the forward RM cell is larger than the MACR_QCP(i) OLD.

$$MACR\_QCP(i)\_NEW=\alpha(i)\times CCR\_QCP(i)+(1-\alpha(i))\times MACR\_QCP(i)\_OLD \quad (51)$$

[5] The value of the ER1 is computed by the following equation (52), and the following function (53) is used to compute the value of the ER2. Furthermore, the following function (54) is used to compute the value of the ER3.

$$ERI=MACR\_QCP(i)\_NEW/OLF1\_QCP(i) \quad (52)$$

$$ER2=min(ER1, MACR\_QCP(i)\times SSP1, CCR\_QCP(i)\times SSP2) \quad (53)$$

$$ER3=max(ER2, MCR(i)) \quad (54)$$

[6] Based on the following function (55), the value of the ER3 obtained in the above described [5] is compared with the ER set in the ER field of the forward and backward RM cell in the above described quality class i. The ER2 or the ER cell whichever is smaller is selected. The selected value is set in the ER field of the RM cell.

$$ER=min\ (ER2, ER\ value\ in\ RM\ cell) \quad (55)$$

Figure 13:
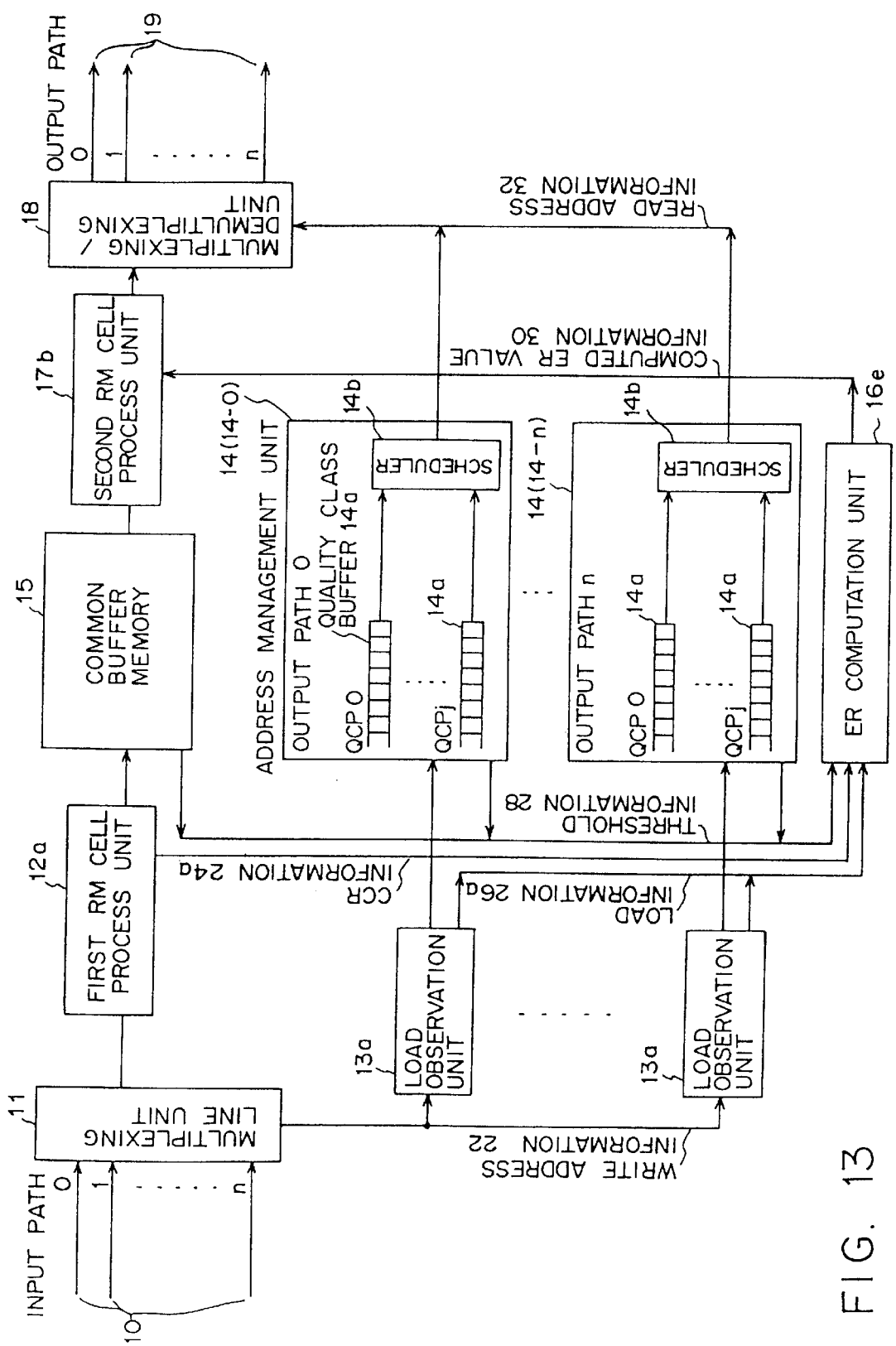
FIG. 13 shows a further example of the switch communications path embodying the LBERC system.
Figure 14:
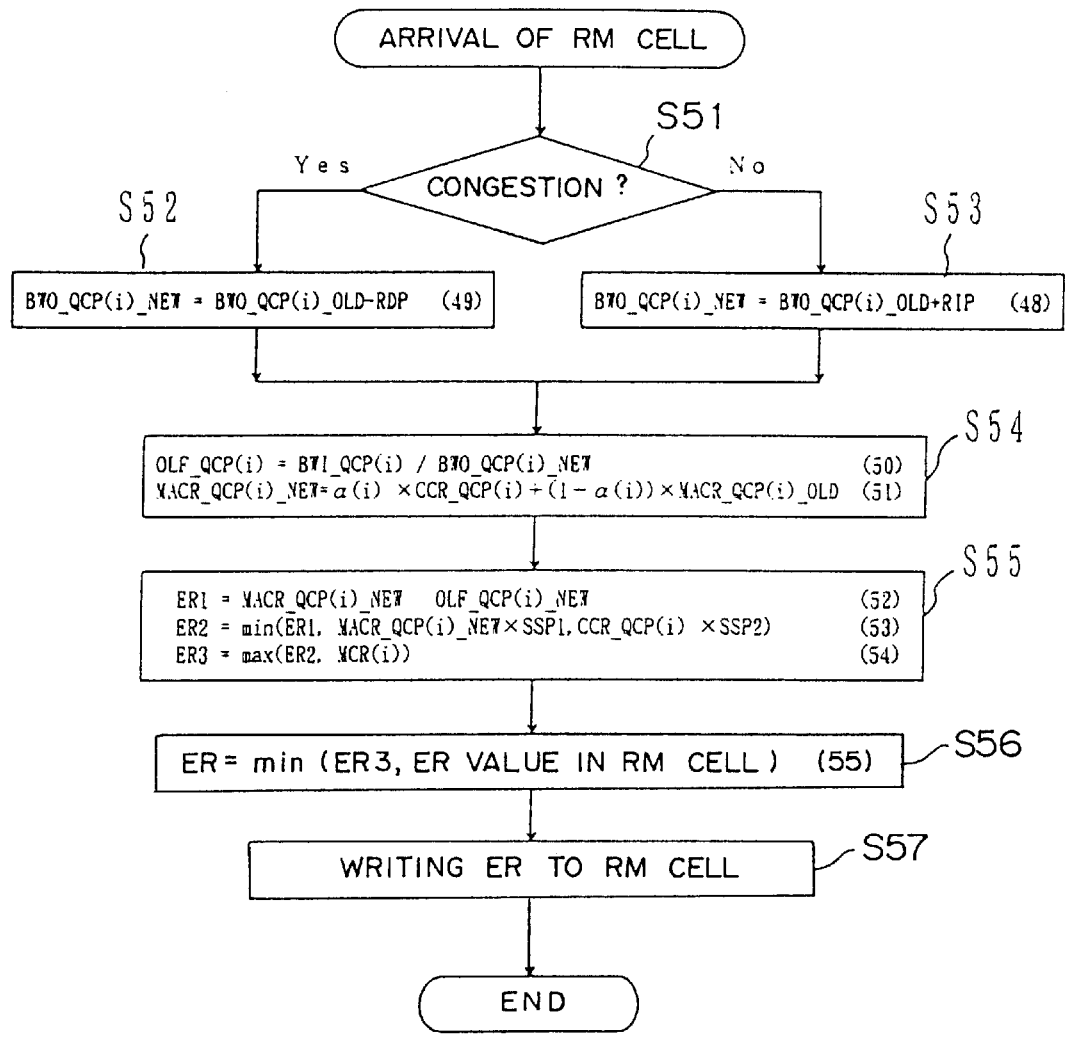
FIG. 14 is a flowchart showing the operations of the switch communications path shown in FIG. 13.

The hardware configuration and the operation flowchart embodying the LBERC system according to the fifth embodiment of the present invention is described below by referring to FIGS. 13 and 14. FIG. 13 shows an example of the hardware provided in the switch communications path unit 1 in the above described LBERC system according to the fifth embodiment of the present invention. FIG. 14 is a flowchart showing the operations of the hardware in the switch communications path unit 1 shown in FIG. 13. In FIG. 13, the same components as the component shown by each embodiment are assigned the same identification numbers. The detailed explanation is omitted here.

A threshold (THA) of each quality class buffer QCP(i) is preliminarily set in the ER computation unit 16e. Using the current BWO_QCP(i)_OLD, the ER computation unit 16e computes the value of a new BWO_QCP(i)_NEW by the above described equation (48) in the non-congestion state, and by the above described equation (49) in the congestion state. The ER computation unit 16e computes the value of OLF_QCP(i) by the equation (50) above using the BWI-QCP(i) indicated by the load information 26a input from the load observation unit 13a and the BWO_QCP(i)_NEW. Furthermore, the ER computation unit 16e retrieves CCR_QCP(i) from the value of the CCR set in the CCR field of the RM cell indicated by the CCR information 24a, and computes the value of MACR_QCP(i)_NEW by the equation (51) above using the CCR_QCP(i) and the previously computed (at the previous observation) MACR_QCP(i)_OLD. The ER computation unit 16e computes the value of the ER1 of each of the quality class buffers 14a (QCP(i)) by the equation (52) above for each of the address management units 14, and then computes the value of the ER2 of the quality class buffer 14a (QCP(i)) by the equation (53) above. Furthermore, the it computes the value of the ER3 of the quality class buffer 14a (QCP(i)) by the function (54). Furthermore, the ER computation unit 16e outputs the computed ER value information 30b indicating the value of the ER3 to the second RM cell process unit 17b.

The operations of the switch communications path unit 1 shown in FIG. 13, especially about the processes on the operations of the ER, are explained by referring to the flowchart shown in FIG. 14. The descriptions about the processes already explained by referring to the flowchart shown in FIG. 5 are omitted here.

In step S51, the ER computation unit 16e determines whether or not the number of stored cells indicated by the threshold information 28 input from the address management unit 14 is equal to or larger than THA (congestion or non-congestion).

If it is determined in step S51 that the quality class buffer QCP(i) is in the congestion state (the number of stored cells is equal to or larger than THA), then the ER computation unit 16e computes the value of BWO_QCP(i)_NEW by the equation (49) in step S52, computes the value of OLF_QCP (i) by the equation (50), and computes the MACR_QCP (i)_NEW by the equation (52) in step S54.

On the other hand, if it is determined in step S51 that the quality class buffer QCP(i) is in the non-congestion state (the number of stored cells is smaller than THA), then the ER computation unit 16e computes the value of BWO_QCP (i)_NEW by the equation (48) above in step S53, computes the value of OLF_QCP(i) by the equation (50), and then computes the value of MACR_QCP(i)_NEW by the equation 51 above in step S54.

In step S55, the ER computation unit 16e computes the value of the ER1 by the equation (52), computes the value of the ER2 by the function (53), computes the value of the ER3 by the function (54), and then outputs the computed ER value information 30b containing the value of the ER3 to the second RM cell process unit 17b.

In step S56, the second RM cell process unit 17b computes the value of the ER by the function (55).

In step S57, the second RM cell process unit 17b writes the computed value to the ER field of the RM cell, and outputs the RM cell to the multiplexing/demultiplexing unit 18.

When the LBERC system according to the above described fourth embodiment is adopted, the ER2 is computed by the function (53). Therefore, a sudden increase of the ER value can be avoided in the non-congestion state, and a sudden decrease of the ER value can be avoided in the congestion state. When the values of the RIP and the RDP are individually set for each quality class i, the quality can be discriminated for each quality class i.

When a service of a certain quality class is rarely used, services of other quality classes can use the unused band of the service of the quality class, thereby utilizing the network resources and guaranteeing the communications quality of the service of each quality class.

Described below in detail is the sixth embodiment of the present invention to which the LBERC system is applied.

[1] Non-congestion is determined when the number of stored cells in the quality class buffer QCP(i) for storing the cells of the ABR connection of the quality class i is smaller than the threshold THA. Congestion is determined when the number of stored cells is equal to or larger than THA, and smaller than THB. Heavy congestion is determined when the number of stored cells is equal to or larger than THB.

[2] Using the current target output band (BWO_QCP(i)_OLD) of the quality class buffer QCP(i), a new target output band (BWO_QCI(i)_NEW) of the quality class buffer QCP(i) is computed by the following equation (56) in the non-congestion state. A newer BWO_QCI(i)_NEW is computed by the following equation (57) in the congestion state (including the heavy congestion).

$$BWO\_QCI(i)\_NEW = BWO\_QCI(i)\_OLD + RIP \quad (56)$$

$$BWO\_QCI(i)\_NEW = BWO\_QCI(i)\_OLD - RDP \quad (57)$$

[3] The input cell rate to the quality class buffer QCP(i) observed at each predetermined observation period is computed as the observation input rate (BWI_QCP(i)). The load factor (OLF1_QCP(i)), which is the ratio of the BWI_QCP (i) to the target output band (BWO QCI(i)_NEW) of the quality class buffer QCP(i) obtained in [2] above, can be computed by the following equation (58).

$$OLF\_QCP(i) = BWI\_QCP(i)/BWO\_QCP(i)\_NEW \quad (58)$$

[4] When a forward RM cell arrives, a new average value (MACR_QCP(i)_NEW) of the CCR of the quality class buffer QCP(i) is computed using the following equation (59) when the quality class buffer QCP(i) is in the congestion state, and the CCR value (CCR_QCP(i)) set in the CCR field of the forward RM cell is smaller than the current average value MACR_QCP(i)_OLD of the CCR of the quality class buffer QCP(i), or when the quality class buffer QCP(i) is in the non-congestion state, and the CCR value set in the CCR field of the forward RM cell is larger than the MACR_QCP(i)_OLD.

$$MACR\_QCP(i)\_NEW = \alpha(i) \times CCR\_QCP(i) + (1-\alpha(i)) \times MACR\_QCP(i)\_OLD \quad (59)$$

[5.1] When the quality class buffer QCP(i) is in the non-congestion or congestion state, the ER1 is computed by the following equation (60). Then, the ER2 is computed by the following function (61). Furthermore, the ER3 is computed using the following function (62).

$$ER1 = MACR\_QCP(i)\_NEW/OLF\_QCP(i) \quad (60)$$

$$ER2 = \min(ER1, MACR\_QCP(i)\_NEW \times SSP1, CCR\_QCP(i) \times SSP2) \quad (61)$$

$$ER3 = \max(ER2, MCR(i)) \quad (62)$$

[5.2] When the quality class buffer QCP(i) is in the heavy congestion state, the ER3 is computed by operating the following function (63).

$$ER3 = MCR(i) \quad (63)$$

[6] Based on the following function (64), the value of the ER3 obtained in the above described [5.1] or [5.2] is compared with the ER set in the ER field of the forward and backward RM cell in the above described quality class i. The ER3 or the ER whichever is smaller is selected. The selected value is set in the ER field of the RM cell.

$$ER = \min(ER3, ER \text{ value in RM cell}) \quad (64)$$

Figure 15:
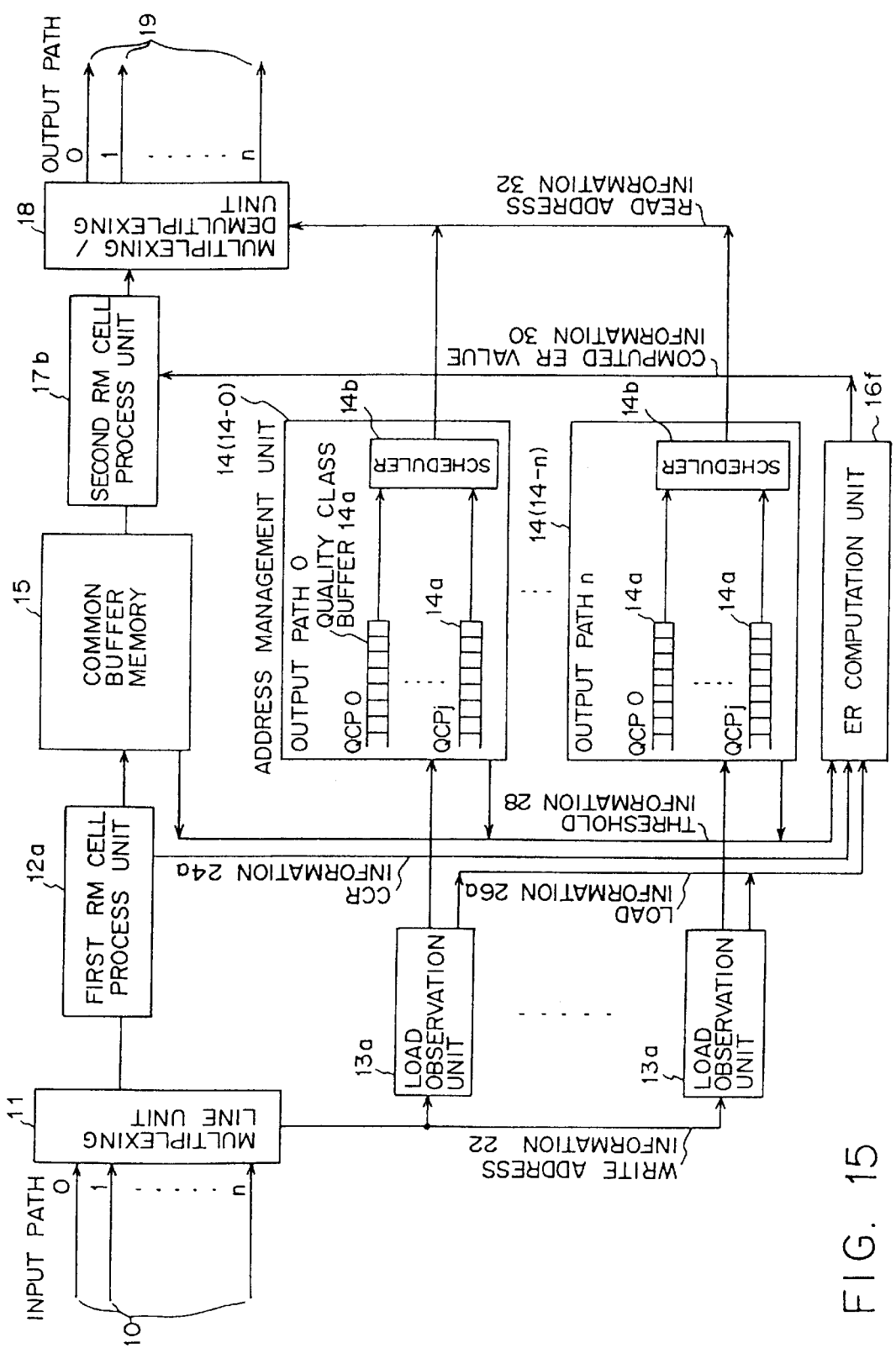
FIG. 15 shows a further example of the switch communications path embodying the LBERC system.
Figure 16:
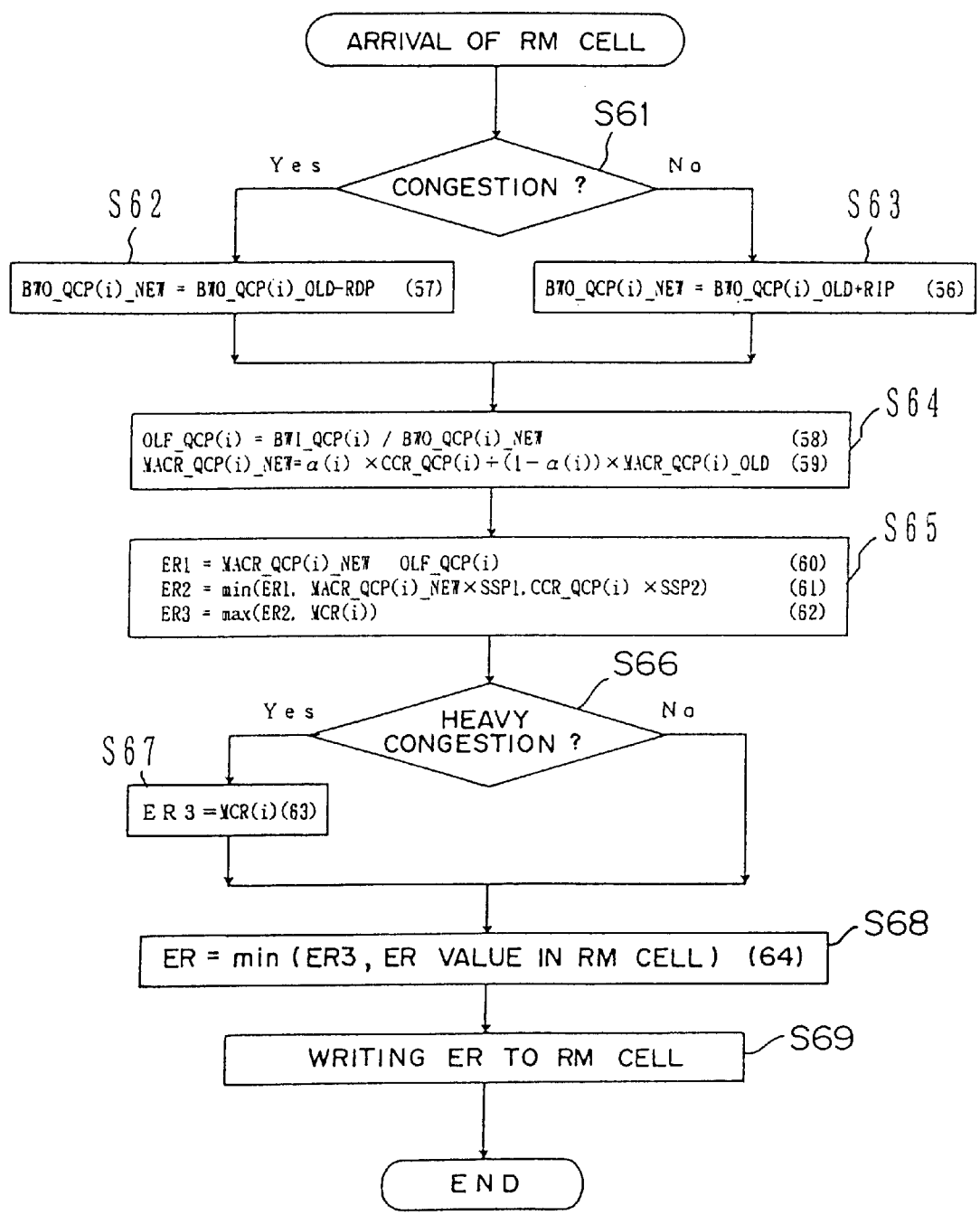
FIG. 16 is a flowchart showing the operations of the switch communications path shown in FIG. 15.

The hardware configuration and the operation flowchart embodying the LBERC system according to the sixth embodiment of the present invention is described below by referring to FIGS. 15 and 16. FIG. 15 shows an example of the hardware configuration provided in the switch communications path unit 1 according to the sixth embodiment of the above described LBERC system. FIG. 16 is a flowchart showing the operations of the hardware in the switch communications path unit 1 shown in FIG. 15. In FIG. 15, the same components as the component shown by each embodiment are assigned the same identification numbers. The detailed explanation is omitted here.

Two thresholds (THA and THB: THB>THA) of each quality class buffer QCP(i) are set in the ER computation unit 16f. The ER computation unit 16f computes the value of new BWO_QCP(i)_NEW using the current BWO_QCP (i)_OLD by the equation (56) above in the non-congestion state, and by the equation (57) in the congestion state. The ER computation unit 16f computes the value of OLF_QCP (i) by the equation (58) above using the BWI_QCP(i) indicated by the load information 26a input from the load observation unit 13a and the BWO1_QCP(i)_NEW. Furthermore, the ER computation unit 16f retrieves CCR_QCP(i) from the value of the CCR set in the CCR field of the RM cell indicated by the CCR information 24a, and computes the value of MACR_QCP(i)_NEW by the equation (59) above using the CCR_QCP(i) and the previously computed (at the previous observation) MACR_QCP(i)_OLD. In the congestion or non-congestion state, the ER computation unit 16*f* computes the value of the ER1 of each of the quality class buffers 14*a* (QCP(i)) by the equation (60) above for each of the address management units 14, and then computes the value of the ER2 of the quality class buffer 14*a* (QCP(i)) by the equation (61) above. Furthermore, the it computes the value of the ER3 of the quality class buffer 14*a* (QCP(i)) by the function (62). In the heavy congestion state, the ER computation unit 16*f* computes the value of the ER3 of each of the quality class buffers 14*a* (QCP(i)) by the equation (63) above for each of the address management units 14*a*, and then the ER computation unit 16*f* outputs the computed ER value information 30*b* indicating the value of the ER3 obtained by the function (62) or the equation (63) to the second RM cell process unit 17*b*.

An example of the operation flow of the switch communications path unit 1 shown in FIG. 15 is described below mainly about the ER operation according to the flowchart shown in FIG. 16. The explanation about the same operation flow as that shown in FIG. 5 is omitted here.

In step S61, the ER computation unit 16*f* determines whether or not the number of stored cells indicated by the threshold information 30 input from the address management unit 14 is equal to or larger than the THA (congestion or not).

If it is determined in step S61 that the buffer is in the congestion state (the number of stored cells is equal to or larger than the THA), then the ER computation unit 16*f* computes the value of BWO_QCP(i)_NEW by the equation (57) in step S62. In step S64, it computes the value of OLF_QCP(i) by the equation (58), and computes the value of MACR_QCP(i)_NEW by the equation (59).

On the other hand, if it is determined in step S61 that the buffer is in the non-congestion state (the number of stored cells is smaller than THA), then the ER computation unit 16*f* computes the value of BWO_QCP(i)_NEW by the equation (56) in step S63. In step S64, it computes the value of OLF_QCP(i) by the equation (58), and computes the value of MACR_QCP(i)_NEW by the equation (59).

In step S65, the ER computation unit 16*f* computes the value of ER1 by the equation (60), the value of ER2 by the function &61), and the value of ER3 by the function (62).

In step S66, the ER computation unit 16*f* determines whether or not the number of stored cells indicated by the threshold information 28 input from the address management unit 14 is equal to or larger than the THB (heavy congestion or not).

If it is determined in step S66 that the buffer is in the heavy congestion (the number of stored cells equal to or larger than THB), the ER computation unit 16*f* computes the value of the ER3 by the equation (63) in step S67, outputs the computed ER value information 30*b* containing the value of the ER3 to the second RM cell process unit 17*b*, and the second RM cell process unit 17*b* computes the value of the ER by the above described function (64).

On the other hand, if it is determined in step S66 that the buffer is not in the heavy congestion, the ER computation unit 16*f* outputs the computed ER value information 30*b* containing the value of the ER3 obtained in step S65 to the second RM cell process unit 17*b*, and the second RM cell process unit 17*b* computes the value of the ER by the above described function (64) in step S68.

In step S69, the second RM cell process 17*b* writes the computed value of the ER to the RM cell, and outputs the RM cell to the multiplexing/demultiplexing unit 18.

When the LBERC system according to the above described sixth embodiment is realized in an excess congestion (heavy congestion) state, the network can be quickly restored from the excess congestion state by setting the ER3 to the MCR.

When a service of a certain quality class is rarely used, services of other quality classes can use the unused band of the service of the quality class, thereby utilizing the network resources and guaranteeing the communications quality of the service of each quality class.

Described below in detail is the seventh embodiment of the present invention to which the LBERC system is applied.

[1] Non-congestion is determined when the number of stored cells in the quality class buffer QCP(i) for storing the cells of the ABR connection of the quality class i is smaller than the threshold THA. Congestion is determined when the number of stored cells is equal to or larger than THA, and smaller than THB. Heavy congestion is determined when the number of stored cells is equal to or larger than THB.

[2.1] When the number of connections which transmit cells within a predetermined period (the number of active connections) exceeds a predetermined value, the new target output band (BWO1_QCI(i)_NEW) of the quality class buffer QCP(i) in the non-congestion state is computed by the following equation (65) using the current target output band (BWO1_QCI(i)-OLD) of the quality class buffer QCP(i), and the new target output band (BWO2_QCI(i)_NEW) of the quality class buffer QCP(i) in the congestion state is computed by the following equation (66) using the current target output band (BWO2_QCI(i)_OLD) of the quality class buffer QCP(i). The new target output band (BWO1_ALL_NEW) of the link accommodating the quality class buffer QCP(i) in the non-congestion state is computed using the current target output band (BWO1_ALL_OLD) of the link by the following equation (67). The new target output band (BWO2_ALL_NEW) of the link accommodating the quality class buffer QCP(i) in the congestion state is computed using the current target output band (BWO2_ALL_OLD) of the link by the following equation (68). N1, N2, N3, and N4 are optional constants.

$$BWO1\_QCP(i)\_NEW = BWO1\_QCP(i)\_OLD - N1 \quad (65)$$

$$BWO2\_QCP(i)\_NEW = BWO2\_QCP(i)\_OLD - N2 \quad (66)$$

$$BWO1\_ALL\_NEW = BWO1\_ALL\_OLD - N3 \quad (67)$$

$$BWO2\_ALL\_NEW = BWO2\_ALL\_OLD - N4 \quad (68)$$

[2.2] When the number of active connections which transmit cells within a predetermined period is equal to or smaller than a predetermined value, the new target output band (BWO1_QCI(i)_NEW) of the quality class buffer QCP(i) in the non-congestion state is computed by the following equation (69) using the current target output band (BWO1_QCI(i)_OLD) of the quality class buffer QCP(i), and the new target output band (BWO2_QCI(i)_NEW) of the quality class buffer QCP(i) in the congestion state is computed by the following equation (70) using the current target output band (BWO2_QCI(i)_OLD) of the quality class buffer QCP(i). The new target output band (BWO1_ALL_NEW) of the link accommodating the quality class buffer QCP(i) in the non-congestion state is computed using the current target output band (BWO1_ALL_OLD) of the link by the following equation (71). The new target output band (BWO2_ALL_NEW) of the link accommodating the quality class buffer QCP(i) in the congestion state is computed using the current target output band (BWO2_ALL_OLD) of the link by the following equation (72). N5, N6, N7, and N8 are optional constants.

$$BWO1\_QCP(i)\_NEW=BWO1\_QCP(i)\_OLD+N5 \quad (69)$$

$$BWO2\_QCP(i)\_NEW=BWO2\_QCP(i)\_OLD+N6 \quad (70)$$

$$BWO1\_ALL\_NEW=BWO1\_ALL\_OLD+N7 \quad (71)$$

$$BWO2\_ALL\_NEW=BWO2\_ALL\_OLD+N8 \quad (72)$$

[3] The input cell rate to the quality class buffer QCP(i) observed at each predetermined observation period is computed as the first observation input rate (BWI_QCP(i)). In the non-congestion state, the load factor (OLF1_QCP(i)) in the non-congestion state, which is the ratio of the BWI_QCP(i) to the BWO1_QCP(i)_NEW obtained in [2.1] or [2.2] above is computed by the following equation (73). In the congestion state (including the heavy congestion state), the load factor (OLF2_QCP(i)) in the congestion state, which is the ratio of the BWI_QCP(i) to the BWO2_QCP(i)_NEW obtained in the [2.1] or [2.2] above, is computed by the following equation (74).

$$OLF1\_QCP(i)=BWI\_QCP(i)/BWO1\_QCP(i)\_NEW \quad (73)$$

$$OLF2\_QCP(i)=BWI\_QCP(i)/BWO2\_QCP(i)\_NEW \quad (74)$$

[4] The input cell rate to the link containing the quality class buffer QCP(i) observed at each predetermined observation period is computed as the second observation input rate (BWI_ALL). In the non-congestion state, the load factor (OLF1_ALL) in the non-congestion state, which is the ratio of the BWI_ALL to the BWO1_ALL_NEW obtained in [2.1] or [2.2] above is computed by the following equation (75). In the congestion state (including the heavy congestion state), the load factor (OLF2_ALL) in the congestion state, which is the ratio of the BWI_ALL to the BWO2_ALL-NEW obtained in the [2.1] or [2.2] above, is computed by the following equation (76).

$$OLF1\_ALL=BWI\_ALL/BWO1\_ALL\_NEW \quad (75)$$

$$OLF2\_ALL=BWI\_ALL/BWO2\_ALL\_NEW \quad (76)$$

[5] When a forward RM cell arrives, a new average value (MACR_QCP(i)_NEW) of the CCR of the quality class buffer QCP(i) is computed using the following equation (77) when the quality class buffer QCP(i) is in the congestion state (including heavy congestion state), and the CCR value (CCR_QCP(i)) set in the CCR field of the forward RM cell is smaller than the current average value MACR_QCP(i)_OLD of the CCR of the quality class buffer QCP(i), or when the quality class buffer QCP(i) is in the non-congestion state, and the CCR value set in the CCR field of the forward RM cell is larger than the MACR_QCP(i)_OLD. Then, a new average value (MACR_QCP(i)_NEW) of the CCR of the link accommodating the quality class buffer QCP(i) is computed by the following equation (78) using the current average value (MACR_ALL_OLD) of the current CCR of the link and the CCR value (CCR_ALL) set in the forward RM cell.

$$MACR\_QCP(i)\_NEW=\alpha(i)\times CCR\_QCP(i)+(1-\alpha a(i))\times MACR\_QCP(i)\_OLD \quad (77)$$

$$MACR\_ALL\_NEW=\alpha \times CCR\_ALL+(1-\alpha)\times MACR\_ALL\_OLD \quad (78)$$

[6.1] When the quality class buffer QCP(i) is in the non-congestion state, the ER1 is computed by operating the following function (79). Then, the ER2 is computed by operating the following function (80). Furthermore, the ER3 is computed using the following function (81).

$$ER1=\max(MACR\_QCP(i)\_NEW/OLF1\_QCP(i), MACR\_ALL\_NEW/OLF1\_ALL) \quad (79)$$

$$ER2=\min(ER1, MACR\_QCP(i)\_NEW\times SSP1, CCR\_QCP(i)\times SSP2) \quad (80)$$

$$ER3=\max(ER2, MCR(i)) \quad (81)$$

[6.2] When the quality class buffer QCP(i) is in the heavy congestion state, the ER1 is computed by the following equation (82), the ER2 is computed by the following function (83), and the ER3 is computed by the following function (84).

$$ER1=\max(MACR\_QCP(i)\_NEW/OLF2\_QCP(i), MACR\_ALL\_NEW/OLF2\_ALL) \quad (82)$$

$$ER2=\min(ER1, MACR\_QCP(i)\_NEW\times SSP3, CCR\_QCP(i)\times SSP4) \quad (83)$$

$$ER3=\max(ER2, MCR(i)) \quad (84)$$

[6.3] When the quality class buffer QCP(i) is in the heavy congestion state, the ER3 is computed by the following equation (85).

$$ER3=MCR(i) \quad (85)$$

[6] Based on the following function (86), the value of the ER3 obtained in the above described [6.1], [6.2], or [6.3] is compared with the ER set in the ER field of the forward and backward RM cell in the above described quality class i. The ER3 or the ER whichever is smaller is selected. The selected value is set in the ER field of the RM cell.

$$ER=\min(ER3, ER \text{ value in RM cell}) \quad (86)$$

The method according to the seventh embodiment can be added to the above described first through the sixth embodiments of the present invention.

Figure 17:
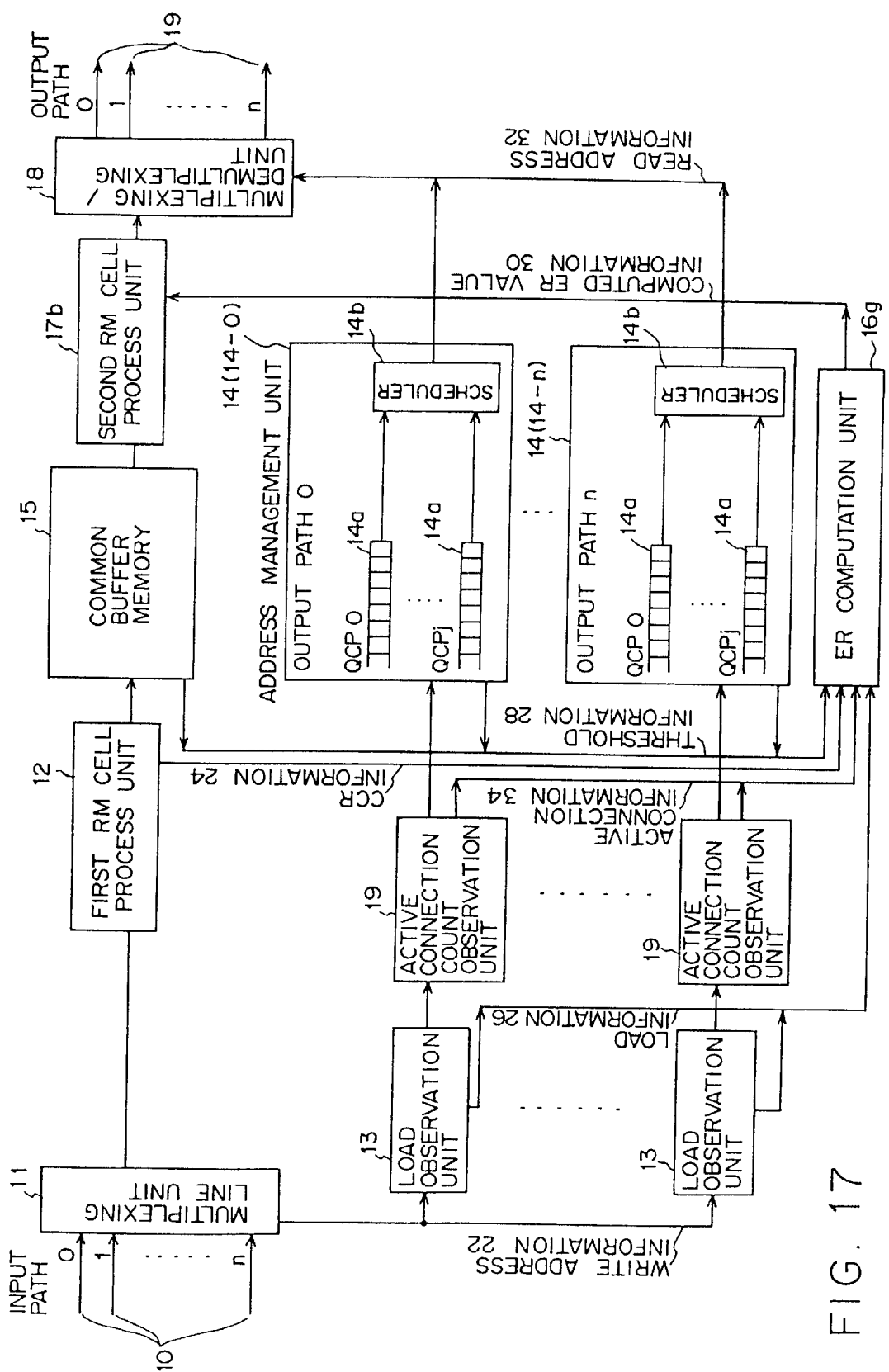
FIG. 17 shows a further example of the switch communications path embodying the LBERC system.
Figure 18:
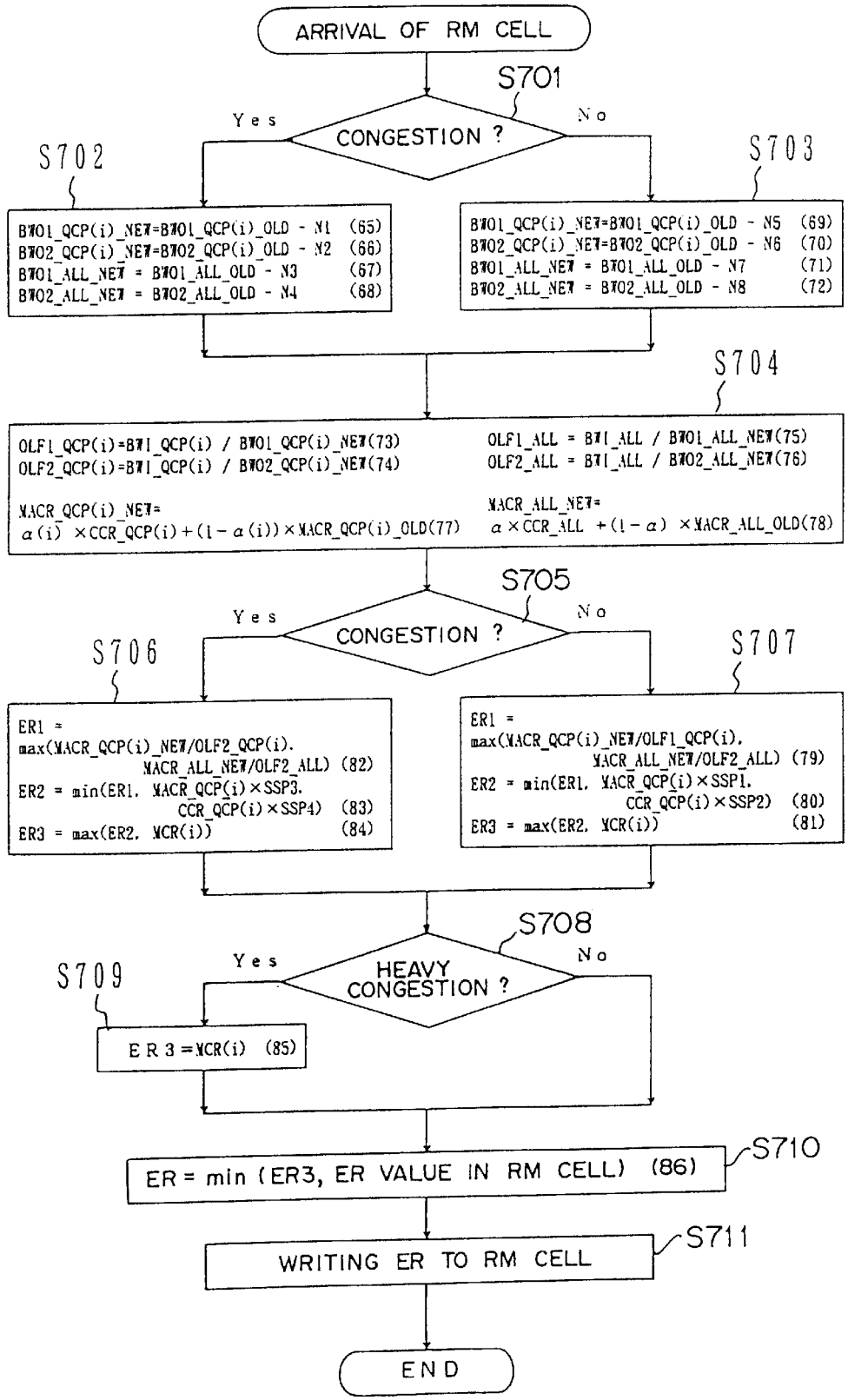
FIG. 18 is a flowchart showing the operations of the switch communications path shown in FIG. 17.

The hardware configuration and the operation flowchart embodying the LBERC system according to the seventh embodiment of the present invention is described below by referring to FIGS. 17 and 18. FIG. 17 shows an example of the hardware configuration provided in the switch communications path unit 1 according to the seventh embodiment of the above described LBERC system. FIG. 18 is a flowchart showing the operations of the hardware in the switch communications path unit 1 shown in FIG. 17. In FIG. 17, the same components as the component shown by each embodiment are assigned the same identification numbers. The detailed explanation is omitted here.

m+1 active connection count observation units 19 are provided between m+1 load observation units 13 and m+1 address management units 14 for each of them. The active connection count observation unit 19 refers to the QCP class number contained in the write address information 26 input from the load observation unit 13, counts the number of active connections for each quality class buffer 14a (QCP(i)), and outputs the active connection information 34 indicating the number of counted active connections to the ER computation unit 16g.

When the number of active connections (number of active VCs) exceeds a predetermined value (NVC), the ER computation unit 16g computes BWO1_QCP(i)_NEW of the quality class buffer QCP(i) in the non-congestion state by the equation (65) above, computes BWO2_QCP(i)_NEW of the quality class buffer QCP(i) in the congestion state by the equation (66) above, computes BWOL_ALL_NEW of the link storing the quality class buffer 14a in the non-congestion state by the equation (67) above, and computes BWO2_ALL_NEW of the link storing the quality class buffer 14*a* in the congestion state by the equation (68) above. On the other hand, when the number of active connections is equal to or smaller than a predetermined value, the ER computation unit 16*g* computes BWO1_QCP(i)_NEW of the quality class buffer QCP(i) in the non-congestion state by the equation (69) above, computes BWO2_QCP(i)_NEW of the quality class buffer QCP(i) in the congestion state by the equation (70) above, computes BWO1_ALL_NEW of the link storing the quality class buffer 14*a* in the non-congestion state by the equation (71) above, and computes BWO2_ALL_NEW of the link storing the quality class buffer 14*a* in the congestion state by the equation (72) above. Furthermore, the ER computation unit 16*g* computes by the equation (73) the value of OLF1_QCP(i) using the BWI_QCP(i) contained in the load information 26 input from the load observation unit 13 and the BWO1_QCP(i)_NEW computed by the equation (65) or (69), computes by the equation (74) the value of OLF2_QCP(i) using the BWI_QCP(i) and BWO2_QCP(i)_NEW computed by the equation (66) or (70), computes by the equation (75) the value of OLF1_ALL using BLI_ALL contained in the load information 26 input from the load observation unit 13 and BWO1_ALL_NEW computed by the equation (67) or (71), and computes by the equation (76) the value of OLF2_ALL using BWI_ALL and the BWO2_ALL computed by the equation (68) or (72). Furthermore, the ER computation unit 16*g* computes CCR_QCP(i) using the value of the CCR set in the CCR field of the RM cell indicated by the CCR information 24*a*, and then obtains CCR_ALL of the address management unit 14 (link) accommodating the quality class buffer 14*a* (QCP(i)) using the value of the CCR set in the CCR field of the RM cell. The ER computation unit 16*g* computes by the equation (77) the value of MACR_QCP(i)_NEW using the CCR_QCP(i) and the computed (at the previous observation) MACR_QCP(i)_OLD, and computes by the equation (78) the value of MACR_ALL_NEW using the CCR_ALL and the computed (at the previous observation) MACR_ALL_OLD. Two thresholds (THA and THB: THB>THA) for each quality class buffer QCP(i) are set in the ER computation unit 16*g*, and the ER computation unit 16*g* determines that the quality class buffer 14*a* (QCP(i)) is in the non-congestion state if the number of stored cells indicated by the threshold information 28 input from the address management unit 14 is smaller than the THA, computes the value of the ER1 using the function (79), computes the value of the ER2 using the function (80), and then computes the value of the ER3 using the function (81). On the other hand, the ER computation unit 16*g* determines that the quality class buffer 14*a* (QCP(i)) is in the congestion state if the number of stored cells is equal to or larger than the THA, computes the value of the ER1 using the function (82), computes the value of the ER2 using the function (83), and computes the value of the ER3 using the function (84). Furthermore, the ER computation unit 16*g* determines that the quality class buffer 14*a* (QCP(i)) is in the heavy congestion state if the number of stored cells is equal to or larger than the THB, and computes the value of the ER3 by the equation (85). The ER computation unit 16*g* outputs to the second RM cell process unit 17*b* the computed ER value information 30*b* containing the value of the ER3 obtained by the function (81) or (84), or the equation (85).

The flow of the operations, especially about the operation of the ER, performed by the switch communications path unit 1 shown in FIG. 17 is described below by referring to the flowchart shown in FIG. 18. The explanation about the process in the flow of the operations shown in FIG. 5 is omitted here.

In step S701, the ER computation unit 16*g* determines whether or not the number of active connections (the number of active VCs) indicated by the active connection information 34 input from the active connection count observation unit 19 exceeds a predetermined value (NVC).

If it is determined in step S701 that the number of active connections (the number of active VCs) exceeds a predetermined value (NVC), then the ER computation unit 16*g* computes by the equations (65) through (68) the values of BWO1_QCP(i)_NEW, BWO2_QCP(i)_NEW, BWO1_ALL_NEW, and BWO2_ALL_NEW respectively in step S702.

On the other hand, if it is determined in step S701 that the number of active connections (the number of active VCs) is equal to or smaller than a predetermined value (NVC), then the ER computation unit 16*g* computes by the equations (69) through (72) the values of BWO1_QCP(i)_NEW, BWO2_QCP(i)_NEW, BWO1_ALL_NEW, and BWO2_ALL_NEW respectively in step S703.

After the values of BWO1_QCP(i)_NEW, BWO2_QCP(i)_NEW, BWO1_ALL_NEW, and BWO2_ALL_NEW have been computed in step S702 or S703, the ER computation unit 16*g* computes the values of OLF1_QCP(i)_NEW, OLF2_QCP(i)_NEW, OLF1_ALL_NEW, and OLF2_ALL_NEW respectively by the equations (73) through (76) in step S704, and then computes the values of MACR_QCP(i)_NEW and MACR_ALL_NEW respectively by the equations (77) and (78).

The ER computation unit 16*g* determines in step S705 whether or not the number of stored cells indicated by the threshold information 28 input from the address management unit 14 is equal to or larger than the THA (congestion or not).

If it is determined in step S705 that the buffer is in the congestion state (the number of stored cells is equal to or larger than the THA), then the ER computation unit 16*g* computes the value of the ER1 using the function (82), the value of the ER2 using the function (83), and the value of the ER3 using the function (84) in step S706.

On the other hand, if it is determined in step S705 that the buffer is in the non-congestion state (the number of stored cells is smaller than the THA), then the ER computation unit 16*g* computes the value of the ER1 using the function (79), the value of the ER2 using the function (80), and the value of the ER3 using the function (81) in step S707.

After the value of the ER3 has been computed in step S706 or S707, the ER computation unit 16*g* determines in step S708 whether or not the number of stored cells indicated by the threshold information 28 input from the address management unit 14 is equal to or larger than the THB (heavy congestion or not).

If it is determined in step S708 that the buffer is in the multiple congestion state (the number of stored cells is equal to or larger than the THB), then the ER computation unit 16*g* computes the value of the ER3 by the equation (85) in step S709, outputs the computed ER value information 30*b* containing the value of the ER3 to the second RM cell process unit 17*a*, and computes the ER using the function (86) in step S710.

On the other hand, if it is determined in step S708 that the buffer is not in the non-congestion state, the ER computation unit 16*g* outputs to the second RM cell process unit 17*b* the computed ER value information 30*b* containing the value of the ER3 obtained in step S706 or S707, and the second RM cell process unit 17*b* computes the value of the ER by the equation (85).

In step S711, the second RM cell process unit 17*b* writes the computed value of the ER to the RM cell, and outputs the RM cell to the multiplexing/demultiplexing unit 18.

When the LBERC system is adopted in the seventh embodiment of the present invention, the ER is computed with the number of active connections taken into account. Therefore, the ER can be computed with the use of the network resources reflected, and the value of the ER set to an appropriate value. Furthermore, since the ER3 is set to the MCR, thereby recovering from the excess congestion in the network when the network is in the excess congestion (or heavy congestion) state.

Furthermore, when the LBERC system is adopted in the seventh embodiment of the present invention, the function (80) or the function (83) is computed to obtain the ER2. Therefore, a sudden increase of the ER value can be avoided in the non-congestion state, and a sudden decrease of the ER value can be avoided in the congestion state.

When a service of a certain quality class is rarely used, services of other quality classes can use the unused band of the service of the quality class, thereby utilizing the network resources and guaranteeing the communications quality of the service of each quality class.

In each of the above described embodiments of the present invention, by providing a BWI_ALL selection table 50 in the load observation unit 13 as shown in FIG. 19 as an example, the load observation unit refers to the selection table 50 and selects the quality class i to be observed when an input rate (BWI_ALL) of a link is obtained. The selection table 50 has a field 51 storing a flag indicating to each of 5 quality classes 1 through 5 whether or not the quality classes 1 through 5 is a quality class to be observed. If the field 51 is set to 0, it means that a cell of a quality class corresponding to the field as a load of BWI_ALL is not counted. If the field 51 is set to 1, it means that a cell of a quality class corresponding to the field as a load of BWI_ALL is counted.

In the above described embodiments, it is assumed that the quality class buffer QCP(i) is provided for the ABR connection, and the ATM switch shown in FIG. 2 has the internal VS/VD functions. Therefore, for example, the internal VS/VD functions can rate-control the cells based on the ER value using the RM cell closed in the switch. In this case, the quality class buffer QCP(i) can also be provided for the UBR connection.

The thresholds (THAi and THBi) for the number of stored cells are individually set in each quality class buffer QCP(i) so that it can be determined individually for the thresholds whether the buffer is in the non-congestion or congestion state, or whether the buffer is in the non-congestion, congestion, or heavy congestion state.

Figure 20:
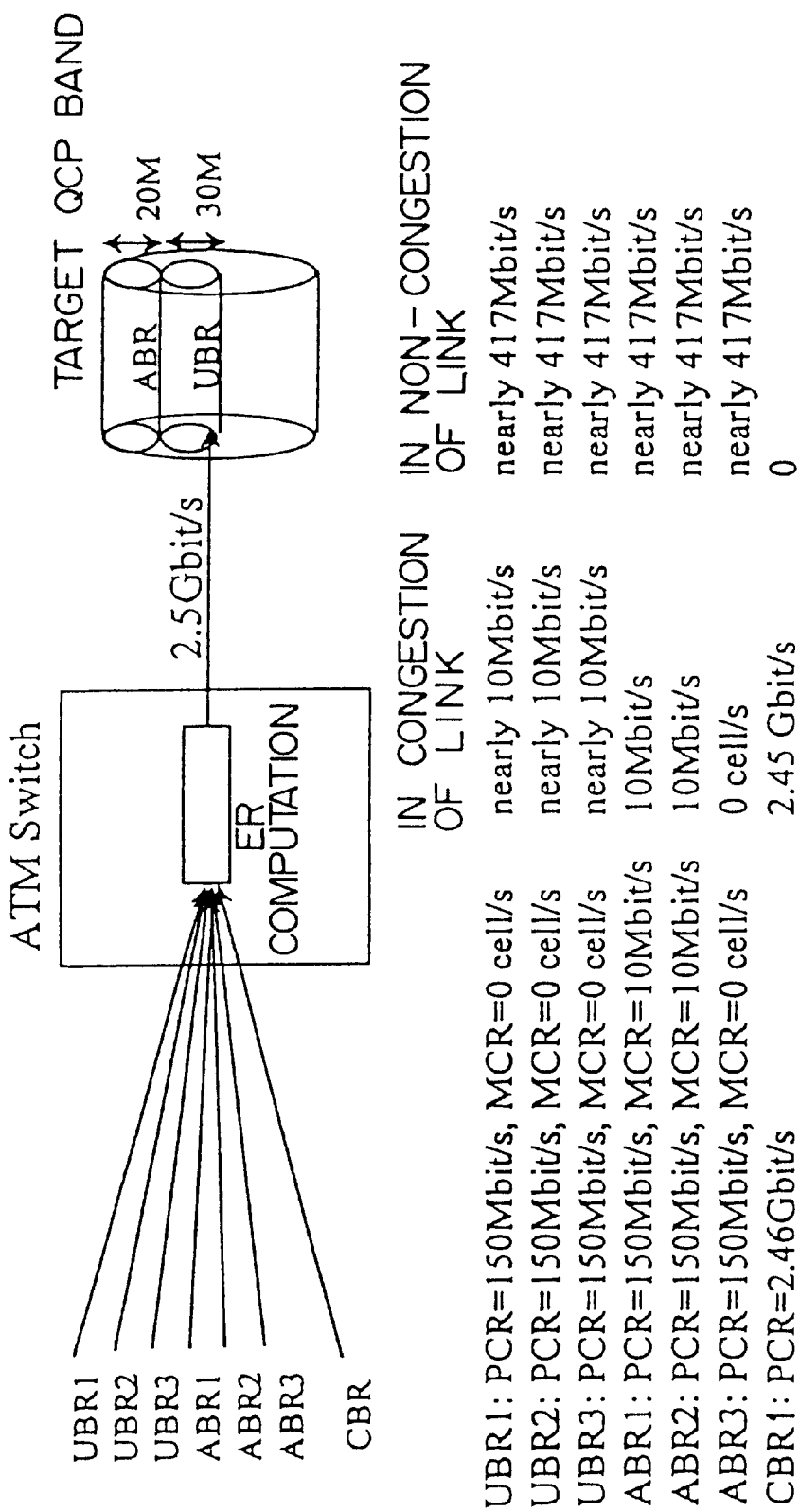
FIG. 20 shows an example of operations of the LBERC system according to the embodiment of the present invention.

FIG. 20 shows an example of the operation of the LBERC according to the above described embodiment of the present invention.

Described below is the case where the speed of the link of an ATM switch (link band) having each component shown in FIG. 2 is 2.5 Gbit/s. This link has three UBR connections, two ABR connections, and one CBR connection. It is assumed that the UBR service and the ABR service are rate-controlled through internal flow control by the VS-I 2 and the VD-I 3. The MCR set when a UBR connection UBR1, UBR2, and UBR3 are set is 0 cell/s. The MCR set when an ABR connection ABR1 and ABR2 are set is 10 Mbit/s. The MCR set when an ABR connection ABR3 is set is 0 cell/s. The PCR set when a UBR connection UBR1, UBR2, and UBR3 are set is 150 Mbits/s. The PCR set when an ABR connection ABR1, ABR2, and ABR3 are set is 150 Mbits/s. The PCR set when a CBR connection CBR1 is set is 1.46 Gbit/s.

When cells flow through the CBR connection CBR1 at the 2.45 Gbit/s, the ER computation is performed in the QCP band at UBR=20 Mbit/s and ABR=30 Mbit/s respectively in the UBR service and the ABR service if the link is busy (in the congestion state). In the UBR service, the entire QCP band is 30 Mbit/s and the number of currently set connections is three. Therefore, the band assigned to each of the UBR connections UBR1, UBR2, and UBR3 is 30M/3=10 Mbit/s. On the other hand, since the ABR service has a total QCP band of 20 Mbit/s, a total of the MCRs of the ABR connections ABR1 and ABR2 occupies the band of 20 Mbit/s, thereby assigning a band of 0 Mbit/s to the ABR connection ABR3. In this case, the minimum cell rate is reserved for the above described connection.

When the link is not busy (in the non-congestion state), that is, when the cells stop flowing through the CBR connection CBR1, the ER computation result in the link (MACR_ALL/OLF1_ALL) becomes larger than the ER computation result for each QCP (MACR_QCP(i)/OLF1_QCP(i)), and the value of the ER computation result in the link is assigned as a band of each connection. In the example shown in FIG. 20, since a total of six connections UBR1, UBR2, UBR3, ABR1, ABR2, and ABR3 transmit cells to the link band (BWO_ALL) at 2.5 Gbit/s, the value obtained by dividing 2.5 Gbit/s by 6, that is, about 417 Mbit/s is assigned as the value of the ER to each of the connections UBR1, UBR2, UBR3, ABR1, ABR2, and ABR3.

The present invention is not limited to the above described embodiments, but can be applied to other ATM switches such as an ATM cross-connector, and so on. The LBERC system according to the above described embodiments is not limited to an ATM switch having the internal VS/VD functions, but can be applied to an ATM switch having only common VS/VD functions and a common ATM switch not having the VS/VD functions.

Figure 21:
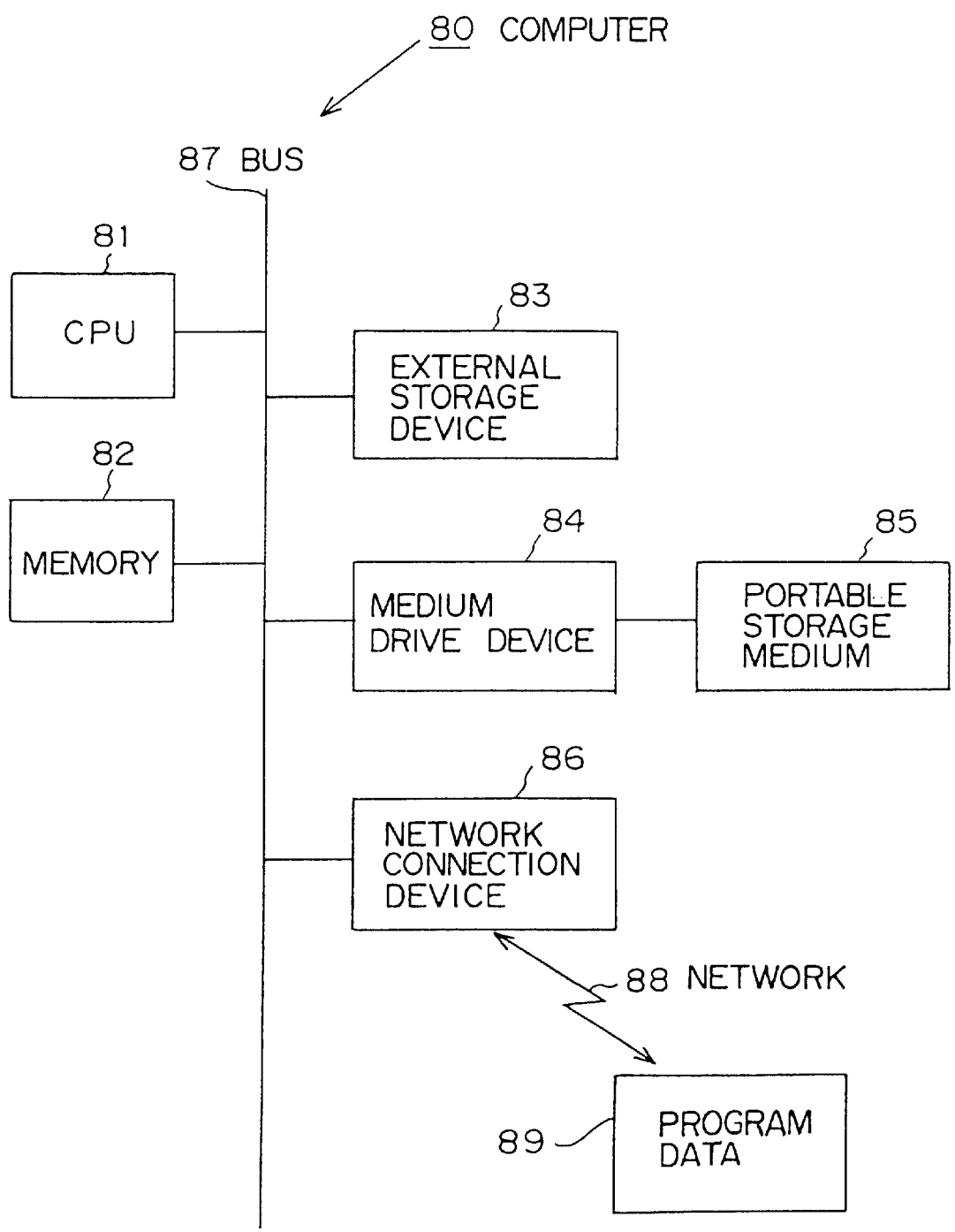
FIG. 21 shows an example of the configuration of the computer for realizing the LBERC system according to the embodiment of the present invention.

FIG. 21 shows an example of the configuration of a computer 80 which realizes the LBERC system according to the above described embodiments of the present invention. The computer 80 comprises a CPU 81 connected to a bus 87; memory 82 such as ROM, RAM, and so on; an external storage device 83; a medium drive device 84; a portable storage medium 85; and a network connection device 86 which is a network interface connected to a network 88.

A program data 89 to which a program code of the software for realizing the above described embodiments of the present invention is written is stored in the external storage device 83 or the portable storage medium 85. That is, for example, it is downloaded to the external storage device 83 through the network 88 and the network connection device 86, and can be furthermore downloaded to the portable storage medium 85 through the medium drive device 84.

The CPU 81 executes the program data 89 read from the external storage device 83 or the portable storage medium 85 through the medium drive device 84 and loaded to the memory 82, and executes the algorithm of the LBERC system according to the above described embodiments of the present invention to compute the ER of each quality class i.

Instead of downloading the program data 89 to the external storage device 83 or the portable storage medium 85 through the network 88 as described above, the program data 89 can be preliminarily stored in the external storage device 83 or the portable storage medium 85.

In this case, the program data 89 itself realizes a new function according to the above described embodiments of the present invention, and the memory 82, the external storage device 83, the portable storage medium 85, etc. form part of the embodiments of the present invention.

The portable storage medium 85 can be, for example, a floppy disk, a hard disk, an optical disk, a magneto-optical disk, CD-ROM, CD-R, DVD, a magnetic tape, a non-volatile memory card, a ROM card, and so on.

What is claimed is:

1. A cell transfer rate control apparatus, comprising:

a plurality of quality class buffers QCP(i) provided for each quality class i (i=1, 2, . . . , n) to guarantee communications quality declared by a user;

congestion determination means for determining whether a quality class buffer QCP(i) is in a congestion state or in a non-congestion state based on a predetermined first threshold set in the quality class buffer QCP(i);

input rate observation means for observing an input cell rate (BWI_QCP(i)) of each quality class buffer QCP (i), and an input cell rate (BWI_ALL) of a link accommodating the quality class buffer QCP(i) in each predetermined observation period;

first load factor computation means for computing, depending on a determination result from said congestion determination means, a load factor (OLF1_QCP (i)) of the quality class buffer QCP(i) in the non-congestion state based on OLF1_QCP(i)=BWI_QCP(i)/BWO1_QCP(i), which is a ratio of the BWI_QCP(i) of the quality class buffer QCP(i) observed by said input rate observation means to a target output band (BWO1_QCP(i)) in the non-congestion state predetermined for the quality class buffer QCP(i), when the quality class buffer QCP(i) is in the non-congestion state, and for computing a load factor (OLF2_QCP(i)) of the quality class buffer QCP(i) in the congestion state based on OLF2_QCP(i)=BWI_QCP(i)/BWO2_QCP(i), which is an input cell rate (BWI_QCP(i)) of the quality class buffer QCP(i) observed by said input rate observation means to a target output band (BWO2_QCP(i)) in the congestion state predetermined for the quality class buffer QCP(i) when the quality class buffer QCP(i) is in the congestion state;

second load factor computation means for computing, depending on a determination result from said congestion determination means, a load factor (OLF1_ALL) of a link accommodating the quality class buffer QCP(i) in the non-congestion state based on OLF1_ALL=BWI_ALL/BWO1_ALL, which is a ratio of an input cell rate (BWI_ALL) of a link observed by said input rate observation means to a target output band (BWO1_ALL) in the non-congestion state predetermined for the link, when the quality class buffer QCP(i) is in the non-congestion state, and for computing a load factor (OLF2_ALL) of the link in the congestion state based on OLF2_ALL=BWI_ALL/BWO2_ALL, which is an input cell rate (BWI_ALL) of the link observed by said input rate observation means to a target output band (BWO2_ALL) in the congestion state predetermined for the link when the quality class buffer QCP(i) is in the congestion state;

average cell rate computation means for computing, when a forward RM cell arrives, a new average value (MACR_QCP(i)_NEW) of a CCR of the quality class buffer QCP(i) using CCR_QCP(i) and MACR_QCP(i)_OLD when the quality class buffer QCP(i) E is in the congestion state, and a CCR value (CCR_QCP(i)) set in a CCR field of the forward RM cell is smaller than the MACR_QCP(i)_OLD, which is an average value of the CCR computed through a predetermined algorithm set in the CCR field of the forward RM cell which previously arrived at the above described quality class buffer QCP(i), or when the quality class buffer QCP(i) is in the non-congestion state, and the CCR value set in the CCR field of the forward RM cell is larger than the MACR_QCP(i)_OLD, and also for computing a new average value (MACR_QCP(i)_NEW) of the CCR of the link accommodating the above described quality class buffer QCP(i) based on the CCR value (CCR_ALL) set in the CCR field of the forward RM cell which arrives at the link, and the MACR_ALL_OLD, which is an average value of the CCR computed through a predetermined algorithm set in the CCR field of the forward RM cell which previously arrived at the link; and ER computation means for setting a first explicit cell rate (ER1) to a value obtained by dividing the MACR_QCP(i)_NEW obtained by said average cell rate computation means by the OLF1_QCP(i) obtained by said first load factor computation means, or to a value obtained by dividing the MACR_ALL_NEW obtained by said average cell rate computation means by the OLF_ALL obtained by said second load factor computation means whichever is larger when the quality class buffer QCP(i) is in the non-congestion state, for setting, when the quality class buffer QCP(i) is in the congestion state, a first explicit cell rate (ER1) to a value obtained by dividing the MACR_QCP(i)_NEW obtained by said average cell rate computation means by the OLF2_QCP(i) obtained by said first load factor computation means, or to a value obtained by dividing the MACR_ALL_NEW obtained by said average cell rate computation mens by the OLF_ALL obtained by said second load factor computation means whichever is larger when the quality class buffer QCP(i) is in the non-congestion state, and for setting, depending on a determination result of said congestion determination means, a second explicit cell rate (ER2) to the first explicit cell rate (ER1) or a minimum cell rate set in a connection of the quality class buffer QCP(i), whichever is larger.

2. A cell transfer rate control apparatus, comprising:

a plurality of quality class buffers QCP(i) provided for each quality class i (i=1, 2, . . . , n) to guarantee communications quality declared by a user;

congestion determination means for determining whether a quality class buffer QCP(i) is in a congestion state or in a non-congestion state based on a predetermined first threshold set in the quality class buffer QCP(i);

target output band computation means for computing, depending on a determination result from said congestion determination means, a new target output band (BWO_QCP(i)_NEW) of the quality class buffer QCP(i) by increasing a current target output band (BWO_QCP(i)_OLD) of the quality class buffer QCP (i) when the quality class buffer QCP(i) is in the non-congestion state, for computing a new target output band (BWO_QCP(i)_NEW) of the quality class buffer QCP(i) by decreasing a current target output band (BWO_QCP(i)_OLD) of the quality class buffer QCP(i) when the quality class buffer QCP(i) is in the congestion state;

input rate observation means for observing an input cell rate (BWI_QCP(i)) of each quality class buffer QCP(i) for each predetermined observation period;

load factor computation means for computing, for the quality class buffer QCP(i), a load factor (OFL QCP(i)) of the quality class buffer QCP(i) based on OLF_QCP(i) BWI_QCP(i)/BWO_QCP(i)_NEW, which is a ratio of the input cell rate (BWI_QCP(i)) of the quality class buffer QCP(i) observed by said input rate observation means to the target output band (BWO_QCP(i)_NEW) obtained by said target output band computation means;

average cell rate computation means for computing, when a forward RM cell arrives, a new average value (MACR_QCP(i)_NEW) of a CCR of the quality class buffer QCP(i) using a CCR_QCP(i) and an MACR_QCP(i)_OLD when the quality class buffer QCP(i) is in the congestion state, and a CCR value (CCR_QCP(i)) set in a CCR field of the forward RM cell is smaller than the MACR_QCP(i)_OLD, which is an average value of the CCR computed through a predetermined algorithm set in the CCR field of the forward RM cell which previously arrived at the quality class buffer QCP(i), or when the quality class buffer QCP(i) is in the non-congestion state, and the CCR value set in the CCR field of the forward RM cell is larger than the MACR_QCP(i)_OLD; and ER computation means for computing a first explicit cell rate (ER1) of the quality class buffer QCP(i) as a ratio of the MACR_QCP(i)_NEW of the quality class buffer QCP(i) obtained by said average cell rate computation means to the OLF QCP(i) of the quality class buffer QCP(i) obtained by said load factor computation means, and setting a second explicit cell rate (ER2) to the first explicit cell rate (ER1) or a minimum cell rate set for a connection of the quality class buffer QCP(i), whichever is larger.

3. The apparatus according to claim 1, further comprising:

ER setting means for comparing a value of a second explicit cell rate (ER2) obtained by said ER computation means with a value of a third explicit cell rate (ER) set in an ER field of a forward and backward RM cell in the quality class i of the quality class buffer QCP(i), and for setting a smaller value in the ER field of the RM cell.

4. The apparatus according to claim 2, further comprising:

ER setting means for comparing a value of a second explicit cell rate (ER2) obtained by said ER computation means with a value of a third explicit cell rate (ER) set in an ER field of a forward and backward RM cell in the quality class i of the quality class buffer QCP(i), and for setting a smaller value in the ER field of the RM cell.

5. The apparatus according to claim 1 wherein:

said average cell rate computation means computes a new average value (MACR_QCP(i)_NEW) of a CCR by performing an operation for MACR_QCP(i)_NEW= $\alpha(i) \times CCR\_QCP(i)+(1-\alpha(i)) \times MACR\_QCP(i)\_OLD$, and computes a new average value (MACR_ALL_NEW) of the CCR of a link accommodating the quality class buffer QCP(i) by performing an operation for MACR_ALL_NEW=$\alpha \times CCR\_ALL+(1-\alpha) \times MACR\_ALL\_OLD$ where $\alpha(i)$ is an average factor set in the quality class buffer QCP(i), and $\alpha$ is an average factor set in the link.

6. The apparatus according to claim 2 wherein:

said average cell rate computation means computes a new average value (MACR_QCP(i)_NEW) of a CCR by performing an operation for MACR_QCP(i)_NEW= $\alpha(i) \times CCR\_QCP(i)+(1-\alpha(i)) \times MACR\_QCP(i)\_OLD$ where $\Delta(i)$ is an average factor set in the quality class buffer QCP(i).

7. The apparatus according to claim 1 wherein:

said first threshold is individually set for each quality class buffer QCP(i).

8. The apparatus according to claim 2 wherein:

said first threshold is individually set for each quality class buffer QCP(i).

9. The apparatus according to claim 1 wherein:

said first threshold indicates a number of target cells arriving at the quality class buffer QCP(i).

10. The apparatus according to claim 1 wherein:

said first threshold indicates a number of cells stored in the quality class buffer QCP(i).

11. The apparatus according to claim 2 wherein:

said first threshold indicates a number of target cells arriving at the quality class buffer QCP(i).

12. The apparatus according to claim 1 wherein:

in the non-congestion state, said ER computation means defines as a new first explicit cell rate (ER1) a value obtained by multiplying the first explicit cell rate (ER1) obtained for the quality class buffer QCP(i) by a first value in the MACR_QCP(i)_NEW of the quality class buffer QCP(i) obtained by said average rate computation means or by a second value in the CCR_QCP(i) of the quality class buffer QCP(i) whichever is smaller.

13. The apparatus according to claim 2 wherein:

in the non-congestion state, said ER computation means defines as a new first explicit cell rate (ER1) a value obtained by multiplying the first explicit cell rate (ERI) obtained for the quality class buffer QCP(i) by a first value in the MACR_QCP(i)_NEW of the quality class buffer QCP(i) obtained by said average rate computation means or by a second value in the CCR_QCP(i) of the quality class buffer QCP(i) whichever is smaller.

14. The apparatus according to claim 1 wherein:

in the non-congestion state, said ER computation means defines as a new first explicit cell rate (ER1) a value obtained by multiplying the first explicit cell rate (ER1) obtained for the quality class buffer QCP(i) by a third value in the MACR_QCP(i)_NEW of the quality class buffer QCP(i) obtained by said average rate computation means or by a fourth value in the CCR_QCP(i) of the quality class buffer QCP(i) whichever is smaller.

15. The apparatus according to claim 2 wherein:

in the non-congestion state, said ER computation means defines as a new first explicit cell rate (ER1) a value obtained by multiplying the first explicit cell rate (ERI) obtained for the quality class buffer QCP(i) by a third value in the MACR_QCP(i)_NEW of the quality class buffer QCP(i) obtained by said average rate computation means or by a fourth value in the CCR_QCP(i) of the quality class buffer QCP(i) whichever is smaller.

16. The apparatus according to claim 1, further comprising:

active connection count means for counting a number of active connections at which cells arrive within a predetermined period for each quality class buffer QCP(i); and target output band computation means for decreasing the target output band (BWO1_QCP(i)) and the target output band (BWO2_QCP(i)) of the quality class buffer QCP(i) if the number of active connections of the quality class buffer QCP(i) counted by said active connection count means is equal to or larger than a predetermined value, and for increasing the target output band (BWO1_QCP(i)) and the target output band (BWO2_QCP(i)) of the quality class buffer QCP(i) if the number of active connections is smaller than a predetermined value.

17. The apparatus according to claim 2, further comprising:

active connection count means for counting a number of active connections at which cells arrive within a predetermined period for each quality class buffer QCP(i); and target output band computation means for decreasing the target output band (BWO_QCP(i)) of the quality class buffer QCP(i) if the number of active connections of the quality class buffer QCP(i) counted by said active connection count means is equal to or larger than a predetermined value, and for increasing the target output band (BWO_QCP(i)) of the quality class buffer QCP(i) if the number of active connections is smaller than a predetermined value.

18. The apparatus according to claim 1, further comprising:

active connection count means for counting a number of active connections at which cells arrive within a predetermined period for each quality class buffer QCP(i); and target output band computation means for decreasing the target output band (BWO1_ALL) and the target output band (BWO2_ALL) of a link accommodating the quality class buffer QCP(i) if the number of active connections of the quality class buffer QCP(i) counted by said active connection count means is equal to or larger than a predetermined value, and for increasing the target output band (BWO1_ALL) and the target output band (BWO2_ALL) of the link if the number of active connections is smaller than a predetermined value.

19. The apparatus according to claim 3 wherein:

a second threshold larger than the first threshold is additionally set for the quality class buffer QCP(i); and when a number of cells stored in the quality class buffer QCP(i) is equal to or larger than the second threshold, said ER setting means sets in an ER field of a forward or backward RM cell a smallest cell rate set in a connection of the quality class buffer QCP(i).

20. The apparatus according to claim 3 wherein:

a second threshold larger than the first threshold is additionally set for the quality class buffer QCP(i); and when a number of cells arriving at the quality class buffer QCP(i) is equal to or larger than the second threshold, said ER setting means sets in an ER field of a forward or backward RM cell a smallest cell rate set in a connection of the quality class buffer QCP(i).

21. The apparatus according to claim 4 wherein:

a second threshold larger than the first threshold is additionally set for the quality class buffer QCP(i); and when a number of cells stored in the quality class buffer QCP(i) is equal to or larger than the second threshold, said ER setting means sets in an ER field of a forward or backward RM cell a smallest cell rate set in a connection of the quality class buffer QCP(i).

22. The apparatus according to claim 1 wherein:

said input rate observation means comprises selection information storage means for storing information required in selecting a quality class i used in computing the input cell rate (BWI_ALL); and said input rate observation means computes the input cell rate (BWI_ALL) according to the selection information stored in said selection information storage means.

23. A cell transfer rate control method, comprising:

a congestion determining step for determining whether a quality class buffer QCP(i) is in a congestion state or in a non-congestion state based on a predetermined first threshold set in the quality class buffer QCP(i) when a plurality of quality class buffers QCP(i) are provided for each quality class i (i=1, 2, . . . , n) to guarantee communications quality declared by a user;

an input rate observing step for observing an input cell rate (BWI_QCP(i)) of each quality class buffer QCP(i), and an input cell rate (BWI_ALL) of a link accommodating the quality class buffer QCP(i) in each predetermined observation period;

a first load factor computing step for computing, depending on a determination result from said congestion determining step, a load factor (OLF1_QCP(i)) of the quality class buffer QCP(i) in the non-congestion state based on OLF1_QCP(i)=BWI_QCP(i)/BWO1_QCP(i), which is a ratio of the BWI_QCP(i) of the quality class buffer QCP(i) observed by said input rate observation step to a target output band (BWO1_QCP(i)) in the non-congestion state predetermined for the quality class buffer QCP(i), when the quality class buffer QCP(i) is in the non-congestion state, and for computing a load factor (OLF2_QCP(i)) of the quality class buffer QCP(i) in the congestion state based on OLF2_QCP(i)=BWI_QCP(i)/BWO2_QCP(i), which is an input cell rate (BWI_QCP(i)) of the quality class buffer QCP(i) observed by said input rate observation step to a target output band (BWO2_QCP(i)) in the congestion state predetermined for the quality class buffer QCP(i) when the quality class buffer QCP(i) is in the congestion state;

a second load factor computing step for computing, depending on a determination result from said congestion determining step, a load factor (OLF1_ALL) of a link accommodating the quality class buffer QCP(i) in the non-congestion state based on OLF1_ALL=BWI_ALL/BWO1_ALL, which is a ratio of an input cell rate (BWI_ALL) of a link observed by said input rate observing step to a target output band (BWO1_ALL) in the non-congestion state predetermined for the link, when the quality class buffer QCP(i) is in the non-congestion state, and for computing a load factor (OLF2_ALL) of the link in the congestion state based on OLF2_ALL=BWI_ALL/BWO2_ALL, which is an input cell rate (BWI_ALL) of the link observed by said input rate observing step to a target output band (BWO2_ALL) in the congestion state predetermined for the link when the quality class buffer QCP(i) is in the congestion state;

an average cell rate computing step for computing, when a forward RM cell arrives, a new average value (MACR_QCP(i)_NEW) of a CCR of the quality class buffer QCP(i) using CCR_QCP(i) and MACR_QCP(i)_OLD when the quality class buffer QCP(i) is in the congestion state, and a CCR value (CCR_QCP(i)) set in a CCR field of the forward RM cell is smaller than the MACR_QCP(i)_OLD, which is an average value of the CCR computed through a predetermined algorithm set in the CCR field of the forward RM cell which previously arrived at the above described quality class buffer QCP(i), or when the quality class buffer QCP(i) is in the non-congestion state, and the CCR value set in the CCR field of the forward RM cell is larger than the MACR_QCP(i)_OLD, and also for computing a new average value (MACR_QCP(i)_NEW) of the CCR of the link accommodating the above described quality class buffer QCP(i) based on the CCR value (CCR_ALL) set in the CCR field of the forward RM cell which arrives at the link, and the MACR_ALL_OLD, which is an average value of the CCR computed through a predetermined algorithm set in the CCR field of the forward RM cell which previously arrived at the link; and an ER computing step for setting a first explicit cell rate (ER1) to a value obtained by dividing the MACR_QCP(i)_NEW obtained by said average cell rate computing step by the OLF1_QCP(i) obtained by said first load factor computing step, or to a value obtained by dividing the MACR_ALL_NEW obtained by said average cell rate computing step by the OLF_ALL obtained by said second load factor computing step whichever is larger when the quality class buffer QCP(i) is in the non-congestion state, for setting, when the quality class buffer QCP(i) is in the congestion state, a first explicit cell rate (ERI) to a value obtained by dividing the MACR_QCP(i)_NEW obtained by said average cell rate computing step by the OLF2_QCP(i) obtained by said first load factor computing step, or to a value obtained by dividing the MACR_ALL_NEW obtained by said average cell rate computation mens by the OLF_ALL obtained by said second load factor computing step whichever is larger when the quality class buffer QCP(i) is in the non-congestion state, and for setting, depending on a determination result of said congestion determining step, a second explicit cell rate (ER2) to the first explicit cell rate (ER1) or a minimum cell rate set in a connection of the quality class buffer QCP(i), whichever is larger.

24. A cell transfer rate control method, comprising:

a congestion determining step for determining whether a quality class buffer QCP(i) is in a congestion state or in a non-congestion state based on a predetermined first threshold set in the quality class buffer QCP(i) when a plurality of quality class buffers QCP(i) are provided for each quality class i (i=1, 2, . . . , n) to guarantee communications quality declared by a user;

a target output band computing step for computing, depending on a determination result from said congestion determining step, a new target output band (BWO_QCP(i)_NEW) of the quality class buffer QCP(i) by increasing a current target output band (BWO_QCP(i)_OLD) of the quality class buffer QCP(i) when the quality class buffer QCP(i) is in the non-congestion state, for computing a new target output band (BWO_QCP(i)_NEW) of the quality class buffer QCP(i) by decreasing a current target output band (BWO_QCP(i)_OLD) of the quality class buffer QCP(i) when the quality class buffer QCP(i) is in the congestion state;

an input rate observing step for observing an input cell rate (BWI_QCP(i)) of each quality class buffer QCP(i) for each predetermined observation period;

a load factor computing step for computing, for the quality class buffer QCP(i), a load factor (OFL_QCP(i)) of the quality class buffer QCP(i) based on OLF_QCP(i)=BWI_QCP(i)/BWO_QCP(i)_NEW, which is a ratio of the input cell rate (BWI_QCP(i)) of the quality class buffer QCP(i) observed by said input rate observing step to the target output band (BWO_QCP(i)_NEW) obtained by said target output band computing step;

an average cell rate computing step for computing, when a forward RM cell arrives, a new average value (MACR_QCP(i)_NEW) of a CCR of the quality class buffer QCP(i) using a CCR_QCP(i) and an MACR_QCP(i)_OLD when the quality class buffer QCP(i) is in the congestion state, and a CCR value (CCR_QCP(i)) set in a CCR field of the forward RM cell is smaller than the MACR_QCP(i)_OLD, which is an average value of the CCR computed through a predetermined algorithm set in the CCR field of the forward RM cell which previously arrived at the quality class buffer QCP(i), or when the quality class buffer QCP(i) is in the non-congestion state, and the CCR value set in the CCR field of the forward RM cell is larger than the MACR_QCP(i)_OLD; and an ER computing step for computing a first explicit cell rate (ER1) of the quality class buffer QCP(i) as a ratio of the MACR_QCP(i)_NEW of the quality class buffer QCP(i) obtained by said average cell rate computing step to the OLF_QCP(i) of the quality class buffer QCP(i) obtained by said load factor computing step, and setting a second explicit cell rate (ER2) to the first explicit cell rate (ERI) or a minimum cell rate set for a connection of the quality class buffer QCP(i), whichever is larger.

25. The method according to claim 23, further comprising:

an ER setting step for comparing a value of a second explicit cell rate (ER2) obtained by said ER computing step with a value of a third explicit cell rate (ER) set in an ER field of a forward and backward RM cell in the quality class I of the quality class buffer QCP(i), and for setting a smaller value in the ER field of the RM cell.

26. The method according to claim 24, further comprising:

an ER setting step for comparing a value of a second explicit cell rate (ER2) obtained by said ER computing step with a value of a third explicit cell rate (ER) set in an ER field of a forward and backward RM cell in the quality class I of the quality class buffer QCP(i), and for setting a smaller value in the ER field of the RM cell.

27. The method according to claim 23 wherein:

said average cell rate computing step computes a new average value (MACR_QCP(i)_NEW) of a CCR by performing an operation for MACR_QCP(i)_NEW= $\alpha(i) \times CCR\_QCP(i)+(1-\alpha(i)) \times MACR\_QCP(i)\_OLD$, and computes a new average value (MACR_ALL_NEW) of the CCR of a link accommodating the quality class buffer QCP(i) by performing an operation for MACR_ALL_NEW=$\alpha \times CCR\_ALL+(1-\alpha) \times MACR\_ALL\_OLD$ where $\alpha(i)$ is an average factor set in the quality class buffer QCP(i), and a is an average factor set in the link.

28. The method according to claim 24 wherein:

said average cell rate computing step computes a new average value (MACR_QCP(i)_NEW) of a CCR by performing an operation for MACR_QCP(i)_NEW= $\alpha(i) \times CCR\_QCP(i)+(1-\alpha(i)) \times MACR\_QCP(i)\_OLD$ where $\alpha(i)$ is an average factor set in the quality class buffer QCP(i).

29. The method according to claim 23 wherein:

said first threshold is individually set for each quality class buffer QCP(i).

30. The method according to claim 24 wherein:

said first threshold is individually set for each quality class buffer QCP(i).

31. The method according to claim 23 wherein:
said first threshold indicates a number of target cells arriving at the quality class buffer QCP(i).

32. The method according to claim 23 wherein:
said first threshold indicates a number of cells stored in the quality class buffer QCP(i).

33. The method according to claim 24 wherein:
said first threshold indicates a number of target cells arriving at the quality class buffer QCP(i).

34. The method according to claim 23 wherein:
in the non-congestion state, said ER computing step defines as a new first explicit cell rate (ER1) a value obtained by multiplying the first explicit cell rate (ER1) obtained for the quality class buffer QCP(i) by a first value in the MACR_QCP(i)_NEW of the quality class buffer QCP(i) obtained by said average rate computing step or by a second value in the CCR_QCP(i) of the quality class buffer QCP(i) whichever is smaller.

35. The method according to claim 24 wherein:
in the non-congestion state, said ER computing step defines as a new first explicit cell rate (ER1) a value obtained by multiplying the first explicit cell rate (ERI) obtained for the quality class buffer QCP(i) by a first value in the MACR_QCP(i)_NEW of the quality class buffer QCP(i) obtained by said average rate computing step or by a second value in the CCR_QCP(i) of the quality class buffer QCP(i) whichever is smaller.

36. The method according to claim 23 wherein:
in the non-congestion state, said ER computing step defines as a new first explicit cell rate (ER1) a value obtained by multiplying the first explicit cell rate (ER1) obtained for the quality class buffer QCP(i) by a third value in the MACR_QCP(i)_NEW of the quality class buffer QCP(i) obtained by said average rate computing step or by a fourth value in the CCR_QCP(i) of the quality class buffer QCP(i) whichever is smaller.

37. The method according to claim 24 wherein:
in the non-congestion state, said ER computing step defines as a new first explicit cell rate (ER1) a value obtained by multiplying the first explicit cell rate (ER1) obtained for the quality class buffer QCP(i) by a third value in the MACR_QCP(i)_NEW of the quality class buffer QCP(i) obtained by said average rate computing step or by a fourth value in the CCR_QCP(i) of the quality class buffer QCP(i) whichever is smaller.

38. The method according to claim 23, further comprising:
an active connection counting step for counting a number of active connections at which cells arrive within a predetermined period for each quality class buffer QCP(i); and
a target output band computing step for decreasing the target output band (BWO1_QCP(i)) and the target output band (BWO2_QCP(i)) of the quality class buffer QCP(i) if the number of active connections of the quality class buffer QCP(i) counted by said active connection counting step is equal to or larger than a predetermined value, and for increasing the target output band (BWO1_QCP(i)) and the target output band (BWO2_QCP(i)) of the quality class buffer QCP(i) if the number of active connections is smaller than a predetermined value.

39. The method according to claim 24, further comprising:
an active connection counting step for counting a number of active connections at which cells arrive within a predetermined period for each quality class buffer QCP(i); and
a target output band computing step for decreasing the target output band (BWO_QCP(i)) of the quality class buffer QCP(i) if the number of active connections of the quality class buffer QCP(i) counted by said active connection counting step is equal to or larger than a predetermined value, and for increasing the target output band (BWO_QCP(i)) of the quality class buffer QCP(i) if the number of active connections is smaller than a predetermined value.

40. The method according to claim 23, further comprising:
an active connection counting step for counting a number of active connections at which cells arrive within a predetermined period for each quality class buffer QCP(i); and
a target output band computing step for decreasing the target output band (BWO1_ALL) and the target output band (BWO2_ALL) of a link accommodating the quality class buffer QCP(i) if the number of active connections of the quality class buffer QCP(i) counted by said active connection counting step is equal to or larger than a predetermined value, and for increasing the target output band (BWO1_ALL) and the target output band (BWO2_ALL) of the link if the number of active connections is smaller than a predetermined value.

41. The method according to claim 25 wherein:
a second threshold larger than the first threshold is additionally set for the quality class buffer QCP(i); and
when a number of cells stored in the quality class buffer QCP(i) is equal to or larger than the second threshold, said ER setting step sets in an ER field of a forward or backward RM cell a smallest cell rate set in a connection of the quality class buffer QCP(i).

42. The method according to claim 25 wherein:
a second threshold larger than the first threshold is additionally set for the quality class buffer QCP(i); and
when a number of cells arriving at the quality class buffer QCP(i) is equal to or larger than the second threshold, said ER setting step sets in an ER field of a forward or backward RM cell a smallest cell rate set in a connection of the quality class buffer QCP(i).

43. The method according to claim 26 wherein:
a second threshold larger than the first threshold is additionally set for the quality class buffer QCP(i); and
when a number of cells stored in the quality class buffer QCP(i) is equal to or larger than the second threshold, said ER setting step sets in an ER field of a forward or backward RM cell a smallest cell rate set in a connection of the quality class buffer QCP(i).

44. The method according to claim 23 wherein:
said input rate observing step computes the input cell rate (BWI_ALL) according to information required in selecting a quality class i used in computing the input cell rate (BWI_ALL).

45. A computer-readable storage medium storing a program used to direct a computer to perform:
a congestion determining step for determining whether a quality class buffer QCP(i) is in a congestion state or in a non-congestion state based on a predetermined first threshold set in the quality class buffer QCP(i) when a plurality of quality class buffers QCP(i) are provided for each quality class i (i=1, 2, . . . , n) to guarantee communications quality declared by a user;
an input rate observing step for observing an input cell rate (BWI_QCP(i)) of each quality class buffer QCP (i), and an input cell rate (BWI_ALL) of a link accommodating the quality class buffer QCP(i) in each predetermined observation period;

a first load factor computing step for computing, depending on a determination result from said congestion determining step, a load factor (OLF1_QCP(i)) of the quality class buffer QCP(i) in the non-congestion state based on OLF1_QCP(i)=BWI_QCP(i)/BWO1_QCP(i), which is a ratio of the BWI_QCP(i) of the quality class buffer QCP(i) observed by said input rate observation step to a target output band (BWO1_QCP(i)) in the non-congestion state predetermined for the quality class buffer QCP(i), when the quality class buffer QCP(i) is in the non-congestion state, and for computing a load factor (OLF2_QCP(i)) of the quality class buffer QCP(i) in the congestion state based on OLF2_QCP(i)=BWI_QCP(i)/BWO2_QCP(i), which is an input cell rate (BWI_QCP(i)) of the quality class buffer QCP(i) observed by said input rate observation step to a target output band (BWO2_QCP(i)) in the congestion state predetermined for the quality class buffer QCP(i) when the quality class buffer QCP(i) is in the congestion state;

a second load factor computing step for computing, depending on a determination result from said congestion determining step, a load factor (OLF1_ALL) of a link accommodating the quality class buffer QCP(i) in the non-congestion state based on OLF1_ALL=BWI_ALL/BWO1_ALL, which is a ratio of an input cell rate (BWI_ALL) of a link observed by said input rate observing step to a target output band (BWO1_ALL) in the non-congestion state predetermined for the link, when the quality class buffer QCP(i) is in the non-congestion state, and for computing a load factor (OLF2_ALL) of the link in the congestion state based on OLF2_ALL=BWI_ALL/BWO2_ALL, which is an input cell rate (BWI_ALL) of the link observed by said input rate observing step to a target output band (BWO2_ALL) in the congestion state predetermined for the link when the quality class buffer QCP(i) is in the congestion state;

an average cell rate computing step for computing, when a forward RM cell arrives, a new average value (MACR_QCP(i)_NEW) of a CCR of the quality class buffer QCP(i) using CCR_QCP(i) and MACR_QCP(i) OLD when the quality class buffer QCP(i) is in the congestion state, and a CCR value (CCR_QCP(i)) set in a CCR field of the forward RM cell is smaller than the MACR_QCP(i)_OLD, which is an average value of the CCR computed through a predetermined algorithm set in the CCR field of the forward RM cell which previously arrived at the above described quality class buffer QCP(i), or when the quality class buffer QCP(i) is in the non-congestion state, and the CCR value set in the CCR field of the forward RM cell is larger than the MACR_QCP(i)_OLD, and also for computing a new average value (MACR_QCP(i)_NEW) of the CCR of the link accommodating the above described quality class buffer QCP(i) based on the CCR value (CCR_ALL) set in the CCR field of the forward RM cell which arrives at the link, and the MACR_ALL_OLD, which is an average value of the CCR computed through a predetermined algorithm set in the CCR field of the forward RM cell which previously arrived at the link; and an ER computing step for setting a first explicit cell rate (ERI) to a value obtained by dividing the MACR_QCP(i)_NEW obtained by said average cell rate computing step by the OLF1_QCP(i) obtained by said first load factor computing step, or to a value obtained by dividing the MACR_ALL_NEW obtained by said average cell rate computing step by the OLF_ALL obtained by said second load factor computing step whichever is larger when the quality class buffer QCP(i) is in the non-congestion state, for setting, when the quality class buffer QCP(i) is in the congestion state, a first explicit cell rate (ER1) to a value obtained by dividing the MACR_QCP(i)_NEW obtained by said average cell rate computing step by the OLF2_QCP(i) obtained by said first load factor computing step, or to a value obtained by dividing the MACR_ALL_NEW obtained by said average cell rate computation mens by the OLF_ALL obtained by said second load factor computing step whichever is larger when the quality class buffer QCP(i) is in the non-congestion state, and for setting, depending on a determination result of said congestion determining step, a second explicit cell rate (ER2) to the first explicit cell rate (ER1) or a minimum cell rate set in a connection of the quality class buffer QCP(i), whichever is larger.

46. A computer-readable storage medium storing a program used to direct a computer to perform:

a congestion determining step for determining whether a quality class buffer QCP(i) is in a congestion state or in a non-congestion state based on a predetermined first threshold set in the quality class buffer QCP(i) when a plurality of quality class buffers QCP(i) are provided for each quality class i (i=1, 2, . . . , n) to guarantee communications quality declared by a user;

a target output band computing step for computing, depending on a determination result from said congestion determining step, a new target output band (BWO_QCP(i)_NEW) of the quality class buffer QCP(i) by increasing a current target output band (BWO_QCP(i)_OLD) of the quality class buffer QCP(i) when the quality class buffer QCP(i) is in the non-congestion state, for computing a new target output band (BWO_QCP(i)_NEW) of the quality class buffer QCP(i) by decreasing a current target output band (BWO_QCP(i)_OLD) of the quality class buffer QCP(i) when the quality class buffer QCP(i) is in the congestion state;

an input rate observing step for observing an input cell rate (BWI_QCP(i)) of each quality class buffer QCP(i) for each predetermined observation period;

a load factor computing step for computing, for the quality class buffer QCP(i), a load factor (OFL_QCP(i)) of the quality class buffer QCP(i) based on OLF_QCP(i)=BWI_QCP(i)/BWO_QCP(i)_NEW, which is a ratio of the input cell rate (BWI_QCP(i)) of the quality class buffer QCP(i) observed by said input rate observing step to the target output band (BWO_QCP(i)_NEW) obtained by said target output band computing step;

an average cell rate computing step for computing, when a forward RM cell arrives, a new average value (MACR_QCP(i)_NEW) of a CCR of the quality class buffer QCP(i) using a CCR_QCP(i) and an MACR_QCP(i)_OLD when the quality class buffer QCP(i) is in the congestion state, and a CCR value (CCR_QCP(i)) set in a CCR field of the forward RM cell is smaller than the MACR_QCP(i)_OLD, which is an average value of the CCR computed through a predetermined algorithm set in the CCR field of the forward RM cell which previously arrived at the quality class buffer QCP(i), or when the quality class buffer QCP(i) is in the non-congestion state, and the CCR value set in the CCR field of the forward RM cell is larger than the MACR_QCP(i)_OLD; and an ER computing step for computing a first explicit cell rate (ER1) of the quality class buffer QCP(i) as a ratio of the MACR_QCP(i)_NEW of the quality class buffer QCP(i) obtained by said average cell rate computing step to the OLF_QCP(i) of the quality class buffer QCP(i) obtained by said load factor computing step, and setting a second explicit cell rate (ER2) to the first explicit cell rate (ER1) or a minimum cell rate set for a connection of the quality class buffer QCP(i), whichever is larger.

47. The medium according to claim 45, further comprising:

an ER setting step for comparing a value of a second explicit cell rate (ER2) obtained by said ER computing step with a value of a third explicit cell rate (ER) set in an ER field of a forward and backward RM cell in the quality class I of the quality class buffer QCP(i), and for setting a smaller value in the ER field of the RM cell.

48. The medium according to claim 46, further comprising:

an ER setting step for comparing a value of a second explicit cell rate (ER2) obtained by said ER computing step with a value of a third explicit cell rate (ER) set in an ER field of a forward and backward RM cell in the quality class I of the quality class buffer QCP(i), and for setting a smaller value in the ER field of the RM cell.

49. The medium according to claim 45 wherein:

said average cell rate computing step computes a new average value (MACR_QCP(i)_NEW) of a CCR by performing an operation for MACR_QCP(i)_NEW= $\alpha(i) \times$ CCR_QCP(i)+(1−$\alpha(i)$)$\times$MACR_QCP(i)_OLD, and computes a new average value (MACR_ALL_NEW) of the CCR of a link accommodating the quality class buffer QCP(i) by performing an operation for MACR_ALL_NEW=$\alpha \times$ CCR_ALL+(1−$\alpha$)$\times$MACR_ALL_OLD where $\alpha(i)$ is an average factor set in the quality class buffer QCP(i), and $\alpha$ is an average factor set in the link.

50. The medium according to claim 46 wherein:

said average cell rate computing step computes a new average value (MACR_QCP(i)_NEW) of a CCR by performing an operation for MACR_QCP(i)_NEW= $\alpha(i) \times$ CCR_QCP(i)+(1−$\alpha(i)$)$\times$MACR_QCP(i)_OLD where $\alpha(i)$ is an average factor set in the quality class buffer QCP(i).

51. The medium according to claim 45 wherein:
said first threshold is individually set for each quality class buffer QCP(i).

52. The medium according to claim 46 wherein:
said first threshold is individually set for each quality class buffer QCP(i).

53. The medium according to claim 45 wherein:
said first threshold indicates a number of target cells arriving at the quality class buffer QCP(i).

54. The medium according to claim 45 wherein:
said first threshold indicates a number of cells stored in the quality class buffer QCP(i).

55. The medium according to claim 46 wherein:
said first threshold indicates a number of target cells arriving at the quality class buffer QCP(i).

56. The medium according to claim 45 wherein:

in the non-congestion state, said ER computing step defines as a new first explicit cell rate (ER1) a value obtained by multiplying the first explicit cell rate (ER1) obtained for the quality class buffer QCP(i) by a first value in the MACR_QCP(i)_NEW of the quality class buffer QCP(i) obtained by said average rate computing step or by a second value in the CCR_QCP(i) of the quality class buffer QCP(i) whichever is smaller.

57. The medium according to claim 46 wherein:

in the non-congestion state, said ER computing step defines as a new first explicit cell rate (ER1) a value obtained by multiplying the first explicit cell rate (ER1) obtained for the quality class buffer QCP(i) by a first value in the MACR_QCP(i)_NEW of the quality class buffer QCP(i) obtained by said average rate computing step or by a second value in the CCR_QCP(i) of the quality class buffer QCP(i) whichever is smaller.

58. The medium according to claim 45 wherein:

in the non-congestion state, said ER computing step defines as a new first explicit cell rate (ER1) a value obtained by multiplying the first explicit cell rate (ER1) obtained for the quality class buffer QCP(i) by a third value in the MACR_QCP(i)_NEW of the quality class buffer QCP(i) obtained by said average rate computing step or by a fourth value in the CCR_QCP(i) of the quality class buffer QCP(i) whichever is smaller.

59. The medium according to claim 46 wherein:

in the non-congestion state, said ER computing step defines as a new first explicit cell rate (ER1) a value obtained by multiplying the first explicit cell rate (ER1) obtained for the quality class buffer QCP(i) by a third value in the MACR_QCP(i)_NEW of the quality class buffer QCP(i) obtained by said average rate computing step or by a fourth value in the CCR_QCP(i) of the quality class buffer QCP(i) whichever is smaller.

60. The medium according to claim 45, further comprising:

an active connection counting step for counting a number of active connections at which cells arrive within a predetermined period for each quality class buffer QCP(i); and a target output band computing step for decreasing the target output band (BWO1_QCP(i)) and the target output band (BWO2_QCP(i)) of the quality class buffer QCP(i) if the number of active connections of the quality class buffer QCP(i) counted by said active connection counting step is equal to or larger than a predetermined value, and for increasing the target output band (BWO1_QCP(i)) and the target output band (BWO2_QCP(i)) of the quality class buffer QCP(i) if the number of active connections is smaller than a predetermined value.

61. The medium according to claim 46, further comprising:

an active connection counting step for counting a number of active connections at which cells arrive within a predetermined period for each quality class buffer QCP(i); and a target output band computing step for decreasing the target output band (BWO_QCP(i)) of the quality class buffer QCP(i) if the number of active connections of the quality class buffer QCP(i) counted by said active connection counting step is equal to or larger than a predetermined value, and for increasing the target output band (BWO_QCP(i)) of the quality class buffer QCP(i) if the number of active connections is smaller than a predetermined value.

62. The medium according to claim 45, further comprising:
an active connection counting step for counting a number of active connections at which cells arrive within a predetermined period for each quality class buffer QCP(i); and
a target output band computing step for decreasing the target output band (BWO1_ALL) and the target output band (BWO2_ALL) of a link accommodating the quality class buffer QCP(i) if the number of active connections of the quality class buffer QCP(i) counted by said active connection counting step is equal to or larger than a predetermined value, and for increasing the target output band (BWO1_ALL) and the target output band (BWO2_ALL) of the link if the number of active connections is smaller than a predetermined value.

63. The medium according to claim 47 wherein:
a second threshold larger than the first threshold is additionally set for the quality class buffer QCP(i); and
when a number of cells stored in the quality class buffer QCP(i) is equal to or larger than the second threshold, said ER setting step sets in an ER field of a forward or backward RM cell a smallest cell rate set in a connection of the quality class buffer QCP(i).

64. The medium according to claim 47 wherein:
a second threshold larger than the first threshold is additionally set for the quality class buffer QCP(i); and
when a number of cells arriving at the quality class buffer QCP(i) is equal to or larger than the second threshold, said ER setting step sets in an ER field of a forward or backward RM cell a smallest cell rate set in a connection of the quality class buffer QCP(i).

65. The medium according to claim 48 wherein:
a second threshold larger than the first threshold is additionally set for the quality class buffer QCP(i); and
when a number of cells stored in the quality class buffer QCP(i) is equal to or larger than the second threshold, said ER setting step sets in an ER field of a forward or backward RM cell a smallest cell rate set in a connection of the quality class buffer QCP(i).

66. The medium according to claim 45 wherein:
said input rate observing step computes the input cell rate (BWI_ALL) according to information required in selecting a quality class i used in computing the input cell rate (BWI_ALL).

67. A cell transfer rate control apparatus for controlling a cell transfer rate in an ATM network accommodating a plurality of services, comprising:
a plurality of storage means for storing cells;
determination means for determining a congestion state if a number of cells stored in said storage means is equal to or larger than a predetermined value, or a non-congestion state if it is smaller than a predetermined threshold;
observation means for observing an input cell rate of said storage means and a link input cell rate in an ATM switch accommodating said storage means;
load factor computation means for computing a load factor of said storage means, which is a ratio of the input cell rate of said storage means observed by said observation means to a target output band of said storage means, in each of the congestion state and the non-congestion state determined by said determination means;
link load factor computation means for computing a link load factor of a link, which is a ratio of the link input cell rate of the link observed by said observation means to a link target output band of the link, in each of the congestion state and the non-congestion state determined by said determination means;
average cell rate computation means for computing an average value of a current cell rate of a resource management cell in said storage means and the link if said determination means determines a congestion state when a forward resource management cell arrives, and the current cell rate of the resource management cell is smaller than an average value, or if said determination means determines a non-congestion state, and the current cell rate of the resource management cell is larger than the average value; and
explicit cell rate computation means for computing as a first explicit cell rate a value, when said determination means determines a non-congestion, by dividing the average value of the current cell rate computed by said average cell rate computation means and stored in said storage means by the load factor computed by said load factor computation means, or a value obtained by dividing the average value of the current cell rate computed by said average cell rate computation means and stored in the link by the link load factor computed by said link load factor computation means, whichever is larger.

68. A cell transfer rate control apparatus for controlling a cell transfer rate in an ATM network accommodating a plurality of services, comprising:
a plurality of storage means for storing cells;
determination means for determining a congestion state if a number of cells stored in said storage means is equal to or larger than a predetermined value, or a non-congestion state if it is smaller than a predetermined threshold;
target output band computation means for computing a target output band by increasing a target output band of said storage means when said determination means determines a non-congestion state, or the target output band by decreasing the target output band of said storage means when said determination means determines a congestion state;
observation means for observing an input cell rate of said storage means;
load factor computation means for computing a load factor of said storage means, which is a ratio of the input cell rate observed by said observation means and stored in said storage means to the target output band computed by said target output band computation means;
average cell rate computation means for computing an average value of a current cell rate of a resource management cell when said determination means determines a congestion state and the current cell rate of the resource management cell is smaller than an average value, or when said determination means determines a non-congestion state and the current cell rate of the resource management cell is larger than the average value; and
explicit cell rate computation means for computing as a first explicit cell rate a value by dividing the average value of the current cell rate computed by said average cell rate computation means by the load factor computed by said load factor computation means, and computing as a second explicit cell rate the first explicit cell rate or a minimum cell rate in said storage means, whichever is larger.

69. A cell transfer rate control method for controlling a cell transfer rate in an ATM network accommodating a plurality of services, comprising the steps of:

storing cells in memory;

determining a congestion state if a number of cells stored in said memory is equal to or larger than a predetermined value, or a non-congestion state if it is smaller than a predetermined threshold;

observing an input cell rate of said memory and a link input cell rate in an ATM switch accommodating said memory;

computing a load factor of said memory, which is a ratio of the input cell rate of said memory observed in said observing step to a target output band of said memory, in each of the congestion state and the non-congestion state determined in said determining step;

computing a link load factor of a link, which is a ratio of the link input cell rate of the link observed in said observing step to a link target output band of the link, in each of the congestion state and the non-congestion state determined in said determining step;

computing an average value of a current cell rate of a resource management cell in said memory and the link if a congestion is determined in said determining step when a forward resource management cell arrives, and the current cell rate of the resource management cell is smaller than an average value, or if a non-congestion state is determined in said determining step, and the current cell rate of the resource management cell is larger than the average value; and computing as a first explicit cell rate a value, when a non-congestion is determined in said determining step, by dividing the average value of the current cell rate computed in said average cell rate computing step and stored in said memory by the load factor computed in said load factor computing step, or a value obtained by dividing the average value of the current cell rate computed in said average cell rate computing step and stored in the link by the link load factor computed in said link load factor computing step, whichever is larger.

70. A cell transfer rate control method for controlling a cell transfer rate in an ATM network accommodating a plurality of services, comprising the steps of:

storing cells in memory;

determining a congestion state if a number of cells stored in said memory is equal to or larger than a predetermined value, or a non-congestion state if it is smaller than a predetermined threshold;

computing a target output band by increasing a target output band of said memory when a non-congestion state is determined in said determining step, or by decreasing the target output band of said memory when a congestion state is determined in said determining step;

observing an input cell rate of said memory;

computing a load factor of said memory, which is a ratio of the input cell rate observed in said observing step and stored in said memory to the target output band computed in said target output band computing step;

computing an average value of a current cell rate of a resource management cell when a congestion state is determined in said determining step and the current cell rate of the resource management cell is smaller than an average value, or when a non-congestion state is determined in said determining step and the current cell rate of the resource management cell is larger than the average value; and computing as a first explicit cell rate a value by dividing the average value of the current cell rate computed in said average cell rate computing step by the load factor computed in said load factor computing step, and computing as a second explicit cell rate the first explicit cell rate or a minimum cell rate in said memory, whichever is larger.

71. A computer-readable storage medium which stores a transfer rate control program used to direct a computer to control a cell transfer rate in an ATM network accommodating a plurality of services, and to perform the processes of:

storing cells in memory;

determining a congestion state if a number of cells stored in said memory is equal to or larger than a predetermined value, or a non-congestion state if it is smaller than a predetermined threshold;

observing an input cell rate of said memory and a link input cell rate in an ATM switch accommodating said memory;

computing a load factor of said memory, which is a ratio of the input cell rate of said memory observed in said observing step to a target output band of said memory, in each of the congestion state and the non-congestion state determined in said determining step;

computing a link load factor of a link, which is a ratio of the link input cell rate of the link observed in said observing step to a link target output band of the link, in each of the congestion state and the non-congestion state determined in said determining step;

computing an average value of a current cell rate of a resource management cell in said memory and the link if a congestion is determined in said determining step when a forward resource management cell arrives, and the current cell rate of the resource management cell is smaller than an average value, or if a non-congestion state is determined in said determining step, and the current cell rate of the resource management cell is larger than the average value; and computing as a first explicit cell rate a value, when a non-congestion is determined in said determining step, by dividing the average value of the current cell rate computed in said average cell rate computing step and stored in said memory by the load factor computed in said load factor computing step, or a value obtained by dividing the average value of the current cell rate computed in said average cell rate computing step and stored in the link by the link load factor computed in said link load factor computing step, whichever is larger.

72. A computer-readable storage medium which stores a transfer rate control program used to direct a computer to control a cell transfer rate in an ATM network accommodating a plurality of services, and to perform the processes of:

storing cells in memory;

determining a congestion state if a number of cells stored in said memory is equal to or larger than a predetermined value, or a non-congestion state if it is smaller than a predetermined threshold;

computing a target output band by increasing a target output band of said memory when a non-congestion state is determined in said determining step, or by decreasing the target output band of said memory when a congestion state is determined in said determining step;

observing an input cell rate of said memory;

computing a load factor of said memory, which is a ratio of the input cell rate observed in said observing step and stored in said memory to the target output band computed in said target output band computing step;

computing an average value of a current cell rate of a resource management cell when a congestion state is determined in said determining step and the current cell rate of the resource management cell is smaller than an average value, or when a non-congestion state is determined in said determining step and the current cell rate of the resource management cell is larger than the average value; and computing as a first explicit cell rate a value by dividing the average value of the current cell rate computed in said average cell rate computing step by the load factor computed in said load factor computing step, and computing as a second explicit cell rate the first explicit cell rate or a minimum cell rate in said memory, whichever is larger.

73. A cell transfer rate control apparatus for controlling a cell transfer rate in an ATM network accommodating a plurality of services, comprising:

a plurality of storage means for storing cells;

determination means for determining a congestion state or a non-congestion state based on a number of cells stored in said storage means;

observation means for observing an input cell rate and a link input cell rate;

load factor computation means for computing a load factor of said storage means;

link load factor computation means for computing a link load factor of a link;

average cell rate computation means for computing an average value of a current cell rate of a resource management cell; and explicit cell rate computation means for computing as a first explicit cell rate a value, when said determination means determines a non-congestion, by dividing the average value of the current cell rate computed by said average cell rate computation means and stored in said storage means by the load factor computed by said load factor computation means, or a value obtained by dividing the average value of the current cell rate computed by said average cell rate computation means and stored in the link by the link load factor computed by said link load factor computation means, whichever is larger.

74. A cell transfer rate control method for controlling a cell transfer rate in an ATM network accommodating a plurality of services, comprising the steps of:

storing cells in memory;

determining a congestion state or a non-congestion state based on a number of cells stored in said memory;

observing an input cell rate and a link input cell rate;

computing a load factor of said memory;

computing a link load factor of a link;

computing an average value of a current cell rate of a resource management cell; and computing as a first explicit cell rate a value, when a non-congestion is determined in said determining step, by dividing the average value of the current cell rate computed in said average cell rate computing step and stored in said memory by the load factor computed in said load factor computing step, or a value obtained by dividing the average value of the current cell rate computed in said average cell rate computing step and stored in the link by the link load factor computed in said link load factor computing step, whichever is larger.

* * * * *